(12) United States Patent
Condo et al.

(10) Patent No.: US 12,319,794 B2
(45) Date of Patent: *Jun. 3, 2025

(54) NANOCOMPOSITES

(71) Applicant: 3M INNOVATIVE PROPERTIES COMPANY, St. Paul, MN (US)

(72) Inventors: Peter D. Condo, Lake Elmo, MN (US); David Scott Thompson, Bayport, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/310,826

(22) Filed: May 2, 2023

(65) Prior Publication Data
US 2023/0265248 A1    Aug. 24, 2023

Related U.S. Application Data

(63) Continuation of application No. 17/795,712, filed as application No. PCT/IB2021/050676 on Jan. 28, 2021, now Pat. No. 11,674,003.

(Continued)

(51) Int. Cl.
*C08J 3/215* (2006.01)
*C08J 5/18* (2006.01)
(Continued)

(52) U.S. Cl.
CPC ............ *C08J 3/215* (2013.01); *C08J 5/18* (2013.01); *C08K 3/36* (2013.01); *C08K 9/06* (2013.01);
(Continued)

(58) Field of Classification Search
None
See application file for complete search history.

(56) References Cited

U.S. PATENT DOCUMENTS

| 3,799,901 A | 3/1974 | Louch et al. |
| 5,387,635 A | 2/1995 | Rowland et al. |

(Continued)

FOREIGN PATENT DOCUMENTS

| CN | 106398522 A | * 2/2017 |
| JP | 2000289361 A | 10/2000 |

(Continued)

OTHER PUBLICATIONS 4-page brochure for Dow Nucrel 960 Ethylene-Methacrylic Acid Copolymer Resin by Songhan Plastic Technology Co., Ltd., Downloaed on Jul. 3, 2024.*

(Continued)

*Primary Examiner* — Tae H Yoon
(74) *Attorney, Agent, or Firm* — Clifton F. Richardson

(57) ABSTRACT

A nanocomposite includes at least one polymer and metal oxide nanoparticles dispersed in the at least one polymer. Each polymer can have a number average molecular weight of at least 10000 grams/mole. The at least one polymer includes a first polymer including (meth)acrylic acid monomer units. The metal oxide nanoparticles are surface modified with a carboxylic acid silane surface modifying agent. An aqueous dispersion that can be used to make the nanocomposite and a method of making the nanocomposite is described.

23 Claims, 7 Drawing Sheets

Related U.S. Application Data

(60) Provisional application No. 62/967,198, filed on Jan. 29, 2020.

(51) Int. Cl.
  C08K 3/36 (2006.01)
  C08K 9/06 (2006.01)
  C08L 23/08 (2025.01)
  C08L 23/0876 (2025.01)

(52) U.S. Cl.
  CPC ....... *C08L 23/0876* (2013.01); *C08J 2323/08* (2013.01); *C08K 2201/011* (2013.01)

(56) References Cited

U.S. PATENT DOCUMENTS

| | | | |
|---|---|---|---|
| 6,472,055 | B1 | 10/2002 | Tashiro et al. |
| 6,818,163 | B1 | 11/2004 | Fibiger et al. |
| 6,852,792 | B1 | 2/2005 | Capendale et al. |
| 7,279,513 | B2 | 10/2007 | Zhang et al. |
| 7,980,910 | B2 | 7/2011 | Padiyath et al. |
| 8,592,013 | B2 | 11/2013 | Kainz et al. |
| 8,637,152 | B2 | 1/2014 | Shiba et al. |
| 8,859,485 | B2 | 10/2014 | Yue et al. |
| 8,916,640 | B2 | 12/2014 | Vansumeren et al. |
| 8,987,369 | B2 | 3/2015 | Bekiarian et al. |
| 9,404,006 | B2 | 8/2016 | Li |
| 11,674,003 | B2 * | 6/2023 | Condo ............... C08K 3/36 524/493 |
| 2003/0203210 | A1 | 10/2003 | Graff et al. |
| 2011/0319521 | A1 | 12/2011 | Lundgard et al. |
| 2014/0005313 | A1 | 1/2014 | Bekiarian et al. |
| 2015/0330597 | A2 | 11/2015 | Schaffer et al. |
| 2016/0145806 | A1 | 5/2016 | Rhee |
| 2017/0115498 | A1 | 4/2017 | Sitter et al. |

FOREIGN PATENT DOCUMENTS

| | | | |
|---|---|---|---|
| JP | 2007204739 | A | 8/2007 |
| JP | 2007206061 | A | 8/2007 |
| JP | 4022107 | B2 | 12/2007 |
| JP | 4596122 | B2 | 12/2010 |
| JP | 5187583 | B2 | 4/2013 |
| JP | 2018526490 | A | 9/2018 |
| WO | WO 03/014896 | A1 * | 2/2003 |
| WO | 2014092422 | A1 | 6/2014 |
| WO | 2017015885 | A1 | 2/2017 |
| WO | 2020026085 | A1 | 2/2020 |
| WO | 2020026113 | A1 | 2/2020 |

OTHER PUBLICATIONS 2-page brochure of Nucrel 960 Acid Copolymer by Dow, Downloaed on Jul. 3, 2024.*

7-page brochure of Surlyn ionomers by Dow, Downloaded on Jul. 3, 2024.*

6-page brochure of Kapton by Wikipedia, downloaded on Oct. 16, 2024.*

Cui, "Polymer Nanocomposites from Organoclays: Structure and Properties", Macromolecular Symposia, 2011, vol. 301, No. 01, pp. 09-15.

International Search Report for PCT International Application No. PCT/IB2021/050676, mailed on Mar. 23, 2021, 4 pages.

Lertngim, "Preparation of Surlyn Films Reinforced with Cellulose Nanofibres and Feasibility of Applying the Transparent Composite Films for Organic Photovoltaic Encapsulation", Royal Society Open Science, 2017, vol. 4 Issue 10, 170792, pp. 1-9.

Ni, "A Review On Colorless And Optically Transparent Polyimide Films: Chemistry, Process And Engineering Applications", Journal Of Industrial And Engineering Chemistry, 2015, vol. 28, pp. 16-27.

Shah, "Blown Films of Nanocomposites Prepared from Low Density Polyethylene and a Sodium Ionomer of Poly (Ethylene-Co-Methacrylic Acid)", Polymer, 2006, vol. 47, No. 17, pp. 6187-6201.

Shah, "Comparison of Nanocomposites Prepared from Sodium, Zinc, and Lithium Ionomers of Ethylene/Methacrylic Acid Copolymers", Macromolecules, 2006, vol. 39, No. 09, pp. 3327-3336.

Shah, "Morphology and Properties of Nanocomposites Formed from Ethylene/methacrylic Acid Copolymers and Organoclays", Polymer, 2007, vol. 48, No. 04, pp. 1047-1057.

Shah, "Nanocomposites from Poly(Ethylene-Co-methacrylic Acid) Ionomers: Effect of Surfactant Structure on Morphology and Properties", Polymer, 2005, vol. 46, No. 08, pp. 2646-2662.

Spencer, "Effects of Acid Neutralization on The Morphology and Properties of Organoclay Nanocomposites Formed From K+ and Na+ Poly(Ethylene-co-methacrylic Acid) Ionomers", 2012, Polymer, vol. 53, No. 2, pp. 555-568.

Yoo, "Fracture Behavior of Nanocomposites Based on Poly(Ethylene-Co-Methacrylic Acid) Ionomers", Polymer, 2007, vol. 48, No. 16, pp. 4867-4873.

* cited by examiner

NANOCOMPOSITES

CROSS REFERENCE TO RELATED APPLICATIONS

This application is a continuation of application Ser. No. 17/795,712, filed Jul. 27, 2022 and issued as U.S. Pat. No. 11,674,003 on Jun. 13, 2023, which is a national stage filing under 35 U.S.C. 371 of PCT/IB2021/050676, filed Jan. 28, 2021, which claims the benefit of Provisional Application No. 62/967,198, filed Jan. 29, 2020, the disclosures of which are incorporated by reference in their entirety herein.

BACKGROUND

Flexible displays and electronic devices can be curved, bent, or folded. These device architectures may include flexible organic light emitting diodes (OLEDs) or plastic liquid crystal displays (LCDs), for example. In order to realize such flexible displays and protect elements in the displays, a flexible cover sheet or flexible window film can replace a conventional glass cover sheet.

SUMMARY

The present disclosure relates generally to nanocomposites including a polymer or a polymer blend and surface-modified nanoparticles dispersed in the polymer or polymer blend. Aqueous dispersions that can be used in making the nanocomposites and methods of making the nanocomposite are provided. Coatings, such as optical coatings, that include nanocomposite materials described herein are also provided. Films (e.g., an optical film) and articles (e.g., a display device including an optical film) prepared with the nanocomposites are also provided. A nanocomposite layer of an optical film, for example, can be a transparent elastomeric nanocomposite layer that may be applied as a coating, for example. Melt processed articles formed from nanocomposite materials described herein are also provided. In some embodiments, the nanocomposite is transparent, with high transmission and low haze up to very high nanoparticle loading. In some embodiments, the nanocomposites also exhibit improved mechanical properties such as improved impact resistance and/or tensile modulus.

In some aspects, the present disclosure provides a nanocomposite including at least one polymer and metal oxide nanoparticles dispersed in the at least one polymer of the nanocomposite. Each polymer can have a number average molecular weight of at least 10000 grams/mole. The at least one polymer of the nanocomposite includes a first polymer including (meth)acrylic acid monomer units (acrylic acid monomer units, methacrylic acid monomer units, or both acrylic acid and methacrylic acid monomer units). The metal oxide nanoparticles are surface modified with a surface modifying agent including a carboxylic acid silane of Formula 1:

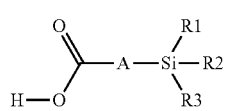

Formula 1 where R1 is a $C_1$ to $C_{10}$ alkoxy group; R2 and R3 are independently selected from the group consisting of $C_1$ to $C_{10}$ alkyl and $C_1$ to $C_{10}$ alkoxy groups; and A is a linker group selected from the group consisting of $C_1$ to $C_{10}$ alkylene or arylene groups, $C_1$ to $C_{10}$ aralkylene groups, $C_2$ to $C_{16}$ heteroalkylene or heteroarylene groups, and $C_2$ to $C_{16}$ amide containing groups.

In some aspects, the present disclosure provides an aqueous dispersion including water, at least one polymer dispersed in the water, and metal oxide nanoparticles dispersed in the water. The at least one polymer includes a first polymer including (meth)acrylic acid monomer units and having a number average molecular weight of at least 10000 grams/mole, where the first polymer is at least partially neutralized. The metal oxide nanoparticles are surface modified with a carboxylic acid silane surface modifying agent.

In some aspects, the present disclosure provides a method of making a nanocomposite. The method includes providing a nanoparticle dispersion including metal oxide nanoparticles dispersed in water, providing a polymer dispersion including at least one polymer dispersed in water, forming an aqueous dispersion including a mixture of the nanoparticle dispersion and the polymer dispersion, and concentrating the aqueous dispersion. The metal oxide nanoparticles are surface modified with a carboxylic acid silane surface modifying agent. The at least one polymer includes a first polymer including (meth)acrylic acid monomer units and having a number average molecular weight of at least 10000 grams/mole.

These and other aspects will be apparent from the following detailed description. In no event, however, should this brief summary be construed to limit the claimable subject matter.

DETAILED DESCRIPTION

Figure 1:
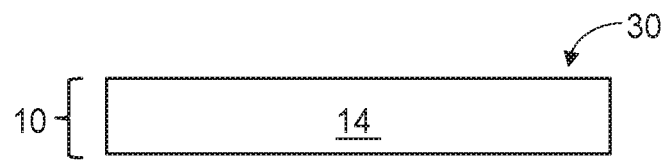
FIGS. 1-4 are schematic cross-sectional views of illustrative flexible optical film articles.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

A wide variety of substrates are used in optical articles that are relatively rigid. Among these substrates are materials like glass plates and polymeric plates such as polycarbonate and polymethylmethacrylate plates. While these rigid substrates can have desirable optical transparency, because they are rigid, they are not flexible enough for use in new emerging optical devices.

Emerging display technologies promise flexible displays that are bendable, rollable, and even foldable for which the rigid glass solution of today's flat panel display electronics is not viable. A flexible display device can utilize a flexible cover sheet or flexible window film in place of a conventional glass cover sheet. This flexible cover sheet typically has a number of desired attributes such as high visible light transmission, low haze, excellent scratch resistance and puncture resistance, in order to protect the elements included in the display devices. In some cases, it may be desired that the flexible cover sheet be able to withstand thousands of folding events around a tight bend radius (about 5 mm or less) without showing visible damage. In some cases, it may be desired that the flexible cover sheet be able to unfold without leaving a crease after being bent at elevated temperature and humidity. Displays are also emerging with three dimensional shapes amenable to molding. While plastics are moldable, rigid glass is not. New display materials are desired to realize these evolutions in display technology.

New display materials preferably provide the historical benefits of glass such as high visible light transmission and low haze, abrasion resistance, impact resistance, chemical resistance, as well as satisfying the new demands of flexibility such as folding around a tight bend radius, and ability to withstand hundreds of thousands of folding events without deterioration of properties. Conventional ionic elastomers possess some of the desired properties such as high visible transmission and low haze, chemical resistance, and flexibility. Being a plastic, ionic elastomers also possess the added advantage over glass of being moldable into three dimensional shapes. However, these ionic elastomeric polymers lack the desired mechanical features or abrasion resistance, impact resistance, tensile modulus, for example.

Particulate fillers have been incorporated into polymers to improve mechanical properties. However, the vast majority of commercially available filled polymers are opaque and thus are unsuitable for use in optical articles. Additionally, rigid particulate fillers can adversely affect the flexibility properties of the polymers with which they are combined.

One technique for providing modified properties is to blend polymeric materials. This approach can be problematic as the preparation of blends to improve one property, such as flexibility, can adversely affect other properties, such as optical properties. This is especially true for optical properties, since the vast majority of polymer blends have at least some degree of immiscibility. A lack of miscibility can dramatically affect optical properties such as visible light transmission, haze and clarity. Even polymers that have the same or similar monomeric composition can be immiscible, if, for example, the polymers have differing degrees of branching. Thus, modification of a polymeric composition by blending the polymeric composition with another polymer, even a seemingly similar polymer, is not a trivial undertaking, especially when the blended composition has desired optical properties. It has been unexpectedly found that blends of different polymers including similar content of (meth)acrylic acid monomer units provide improved mechanical properties while maintaining desired optical properties (e.g., high optical transparency and/or low optical haze).

The nanocomposites of the present disclosure achieve the contradictory goals of flexibility, optical transparency and improved mechanical properties. The nanocomposites of the present disclosure typically include a polymeric matrix and a surface-modified nanoparticle filler. The polymeric matrix, which may also be referred to as a polymeric phase, includes at least one polymer (e.g., a polymer or a blend of polymers).

The nanocomposites of the present disclosure utilize metal oxide nanoparticles, which are particles with an average diameter that is in the nanometer range. These particles give improved mechanical properties to the nanocomposites, and because of their small size, according to some embodiments, the nanoparticles do not appreciably scatter visible light. The nanoparticles can be surface modified to achieve compatibility with the at least one polymer to avoid agglomeration or aggregation of the nanoparticles in the nanocomposite which would lead to inferior optical properties. The surface modifying agent is typically a carboxylic acid-functional silane. While not wishing to be bound by theory, it is believed that the acid-functional groups on the surface modifying agent improve the compatibility of the particles with the acid-functional (meth)acrylic polymer(s) of the at least one polymer. Some of the acid-functional groups on the surface-modified nanoparticles may also be neutralized like at least some of the acid-functional groups on the (meth)acrylic polymer(s). Acid-functional groups in the surface modifying agent are preferred for dispersibility of the nanoparticles in water. The acid groups of the acid silane, when added to the basic surface unmodified nanoparticle solution (for example, NACLO 2327), are at least partially neutralized which renders the silane soluble in the aqueous phase such that the surface of the silica can be modified readily. Furthermore, it has been found that in the coating and melt processing of the ionic elastomer nanocomposite materials that the acid silane on the surface of the particles can allow for interaction of the NPs with the ionic groups of the elastic ionomer polymers leading to excellent compatibility of the nanoparticles in the host polymer matrix.

Disclosed herein are nanocomposites that are in many cases optically transparent and have low optical haze. The nanocomposites can be derived from coatings of aqueous dispersions and/or can be melt processible. The nanocomposites can be used to form a wide range of articles. Also disclosed are methods for preparing and using these nanocomposites. Further disclosed are aqueous dispersions that are useful in forming the nanocomposites, according to some embodiments. The aqueous dispersion can include one or more polymers and can also include nanoparticles. Methods of making the nanocomposite can include one or more of concentrating the dispersion, coating the dispersion on a substrate, or melt processing a concentrated or dried dispersion. In some embodiments, a dried coating on a substrate is a desired optical film article. In some embodiments, a dried coating is removed from a substrate and melt processed to produce a desired nanocomposite article.

In some embodiments, the nanocomposites include at least one polymer and surface-modified metal oxide nanoparticles, where the at least one polymer includes a first polymer including (meth)acrylic acid monomer units (acrylic acid monomer units, methacrylic acid monomer units, or both acrylic acid and methacrylic acid monomer units), and where the surface-modified metal oxide nanoparticles are surface modified with a carboxylic acid-functional silane surface modifying agent. In some embodiments, the at least one polymer is at least partially neutralized. In some embodiments, the at least one polymer includes two or more miscible polymers.

The terms "room temperature" and "ambient temperature" are used interchangeably and have their conventional meaning, that is to say a temperature of from 20 to 25° C.

The terms "(meth)acrylic" and "(meth)acrylate" refer to polymers and monomers of acrylic or methacrylic acid and the alcohol esters of acrylic or methacrylic acid. Acrylate and methacrylate monomers and polymers are referred to collectively herein as "(meth)acrylates" or "(meth)acrylic". Polymers and copolymers described herein as (meth)acrylics or (meth)acrylates may contain additional ethylenically unsaturated monomers.

The terms "free radically polymerizable" and "ethylenically unsaturated" are used interchangeably and refer to a reactive group which contains a carbon-carbon double bond which is able to be polymerized via a free radical polymerization mechanism.

The term "polymer" is used herein consistent with the common usage in chemistry. Polymers are macromolecules composed of many repeated subunits. The term polymer encompasses homopolymers, i.e., polymers formed from one type of monomer, and copolymers where the polymer is formed from two or more co-polymerizable monomers.

The terms "miscible" or "miscibility" refer to at least two polymers that are compatible with each other such that blends of the at least two polymers do not phase separate so as to form phase separated microdomains that are large enough to produce significant scattering of visible light (wavelengths of about 400 to about 700 nm).

The terms "immiscible" or "immiscibility" refer to at least two polymers that are incompatible with each other such that blends of the at least two polymers phase separate so as to form phase separated microdomains that are large enough to produce significant scattering of visible light (wavelengths of about 400 to about 700 nm) resulting in unacceptable haze.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "alkoxy" refers to a monovalent group of the type —OR, where R is an alkyl group.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "heteroalkylene" refers to a divalent group that includes at least two alkylene groups connected by a thio, oxy, or —NR— where R is alkyl. The heteroalkylene can be linear, branched, cyclic, substituted with alkyl groups, or combinations thereof some heteroalkylenes are polyoxyalkylenes where the heteroatom is oxygen such as for example,

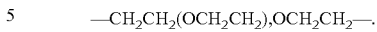

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "heteroarylene" refers to a divalent group that is carbocyclic and aromatic and contains heteroatoms such as sulfur, oxygen, nitrogen or halogens such as fluorine, chlorine, bromine or iodine.

The term "aralkylene" refers to a divalent group of formula —$R^a$—$Ar^a$— where $R^a$ is an alkylene and $Ar^a$ is an arylene (i.e., an alkylene is bonded to an arylene).

The term "alkaryl" refers to a monovalent group of formula —$R^a$—$Ar^a$ where $R^a$ is an alkylene and $Ar^a$ is an aryl (i.e., an alkylene is bonded to an aryl).

Unless otherwise indicated, "optically transparent" refers to a layer, film, or article that has a high light transmittance over at least a portion of the visible light spectrum (about 400 to about 700 nm). Typically, optically transparent layers, films, or articles have a luminous transmittance of at least 80% and a haze value of 10% or less.

Unless otherwise indicated, "optically clear" refers to a layer, film, or article that has a high light transmittance over at least a portion of the visible light spectrum (about 400 to about 700 nm), and that exhibits low haze. Typically, optically clear layers, films, or articles have visible light transmittance values of at least 80%, often at least 90%, and optical haze values of 5% or less, 4% or less, often 3% or less. Luminous transmittance and haze can be determined according to ASTM D1003-13 "Standard Test Method for Haze and Luminous Transmittance of Transparent Plastics".

As used herein, the term "nominally colorless" refers to compositions that are generally color neutral on the yellow index with b* values being no more than 5 or no more than 3.

As used herein, "nanodispersion" refers to a liquid colloidal dispersion of nanoparticles (e.g., metal oxide nanoparticles), where the liquid medium is water, organic solvent, or combination thereof, and where the nanodispersion may or may not include one or more (meth)acrylic acid polymers.

As used herein, "nanocomposite" refers to compositions that include a polymeric matrix with nanoparticles dispersed therein. The polymeric matrix can include at least one polymer that includes a first polymer including (meth) acrylic acid monomer units. The nanoparticles can be metal oxide nanoparticles dispersed in the at least one polymer.

As used herein, "surface unmodified nanoparticle" refers to a nanoparticle (e.g., a metal oxide nanoparticle) with a surface that has not been altered chemically. In the case of colloidal silica, the unmodified nanoparticle surface is predominantly silanol groups, Si—OH.

As used herein, "surface-modified nanoparticle" refers to a nanoparticle (e.g., a metal oxide nanoparticle) with a surface that has been altered chemically or surface modified.

As used herein, "silica" refers to amorphous silicon dioxide.

As used herein, "adhesive" refers to polymeric compositions useful to adhere together two adherends. Examples of adhesives are pressure sensitive adhesives and heat activated adhesives.

Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

Heat activated adhesives are non-tacky at room temperature but become tacky and capable of bonding to a substrate at elevated temperatures. These adhesives usually have a Tg or Tm above room temperature. When the temperature is elevated above the Tg or Tm, the storage modulus usually decreases and the adhesive become tacky.

Disclosed herein are nanocomposites that include at least one (meth)acrylic polymer (e.g., one (meth)acrylic polymer or two or more miscible (meth)acrylic polymers) and surface-modified metal oxide nanoparticles, where the surface-modified metal oxide nanoparticles are surface modified with an acid-functional silane surface modifying agent, and where the (meth)acrylic polymer(s) are at least partially neutralized. Typically, the nanocomposites are melt processable and are optically transparent. By melt processable it is meant that the nanocomposites are able to be melt processed, that is to say that the nanocomposites can be heated and made to flow without causing degradation. Melt processable does not mean that the nanocomposite has been melt processed and in no way indicates a processing step.

A wide range of (meth)acrylic polymers are suitable for use in the nanocomposites of this disclosure. The (meth)acrylic polymer(s) include (meth)acrylic acid monomers units (i.e., acrylic acid monomer units, methacrylic acid monomer units, or both acrylic acid monomer units and methacrylic acid monomer units). In some embodiments, the (meth)acrylic polymers are homopolymers of acrylic acid or methacrylic acid. In other embodiments, the (meth)acrylic polymers are copolymers of at least one (meth)acrylic monomer unit that is acid-functional and at least one monomer that is a (meth)acrylate that is not acid-functional. Additionally, the (meth)acrylic polymers can contain other non-(meth)acrylate monomers that are co-polymerizable with the (meth)acrylic and (meth)acrylate monomers. The copolymers can be formed by the polymerization or copolymerization using free radical polymerization techniques. In some embodiments, the at least one (meth)acrylic polymer includes a copolymer containing (meth)acrylic acid and at least one co-monomer. A wide range of co-monomers are suitable. Suitable co-monomers include ethylene, propylene, alkyl(meth)acrylates, aryl(meth)acrylates, alkaryl(meth)acrylates, acrylonitrile, and carbon monoxide.

In some embodiments, a nanocomposite includes at least one polymer and metal oxide nanoparticles dispersed in the at least one polymer of the nanocomposite. Each polymer can have a number average molecular weight of at least 10000 grams/mole. The at least one polymer of the nanocomposite includes a first polymer including (meth)acrylic acid monomer units (monomer units selected from the group consisting of methacrylic acid monomer units and acrylic acid monomer units). The metal oxide nanoparticles are surface modified with a surface modifying agent including a carboxylic acid silane of Formula 1 described elsewhere herein.

In some embodiments, the first polymer has a number average molecular weight of at least 12000 grams/mole or at least 15000 grams/mole. In some embodiments, each polymer of the at least one polymer has a number average molecular weight of at least 12000 grams/mole or at least 15000 grams/mole. For example, the at least one polymer can be a blend of first and second polymers, and each of the first and second polymers can have a number average molecular weight of at least 12000 grams/mole or at least 15000 grams/mole. The number average molecular mass of a polymer can be determined by gel permeation chromatography (GPC). Polymer characterization by GPC systems is well known. An example of such a system is the Viscotek TDAmax (Malvern Panalytical, a part of Spectris plc). This system is equipped with multiple detectors for determination of molecular weight. Absolute molecular weight of small polymers can be measured using a right angle light scattering detector, direct output of absolute molecular weight of polymers without extrapolation can be obtained using low angle light scattering. Additional detectors can be used to assess information concerning polymer structure, for example branching using intrinsic viscosity detector and information concerning copolymer composition can be investigated using a photodiode array UV detector when UV absorbing components are present. Further details of this instrument can be found from the supplier. In some embodiments, the first polymer, or each polymer of the at least one polymer, has a number average molecular weight less than 100,000 grams/mole.

In some embodiments, the first polymer further includes at least one monomer unit (e.g., a second type of monomer unit when the (meth)acrylic acid monomer units are a first type of monomer unit) selected from the group consisting of ethylene, propylene, alkyl(meth)acrylates, aryl(meth)acrylates, alkaryl(meth)acrylates, acrylonitrile, and carbon monoxide. In some embodiments, the first polymer includes at least one monomer unit (e.g., a second type of monomer unit) selected from the group consisting of ethylene and propylene. In some such embodiments, the first polymer further includes at least one monomer unit (e.g., a third type of monomer unit) selected from the group consisting of n-butyl acrylate, isobutyl acrylate, isopropyl acrylate, n-propyl acrylate, ethyl acrylate, methyl acrylate, 2-ethylhexyl acrylate, iso-octyl acrylate and methyl methacrylate. The first polymer can be a terpolymer, for example. In some embodiments, the first polymer includes (meth)acrylic acid monomer units; ethylene monomer units, propylene monomer units, or a combination of ethylene and propylene monomer units; and at least one alkyl (meth)acrylate monomer unit. In some embodiments, the first polymer includes (meth)acrylic acid monomer units and ethylene monomer units.

The at least one polymer can be a blend of two or more (meth)acrylic polymers. A wide range of blends of (meth)acrylic polymers are suitable. Examples of suitable blends include blends of acrylic acid or methacrylic acid homopolymers with copolymers of acrylic acid or methacrylic acid and at least one additional monomer (e.g., selected from the group consisting of ethylene, propylene, alkyl(meth)acrylates, aryl(meth)acrylates, alkaryl(meth)acrylates, acrylonitrile, and carbon monoxide). Other examples include blends of acrylic acid or methacrylic acid homopolymers with copolymers of acrylic acid or methacrylic acid and at least two additional monomers (e.g., the copolymer can be a terpolymer). In some embodiments, the blends include a copolymer of acrylic acid or methacrylic acid and at least one additional monomer with a different copolymer of acrylic acid or methacrylic acid and at least one additional monomer. Yet other embodiments include blends of a copolymer of acrylic acid or methacrylic acid and at least one additional monomer with a copolymer of acrylic acid or methacrylic acid and at least two additional monomers. Additionally, the blend can also include different copolymers of acrylic acid or methacrylic acid and at least two additional monomers.

In some embodiments, the at least one polymer includes a second polymer different from the first polymer. The first and second polymers can be different by virtue of having different molecular weights, different acid content, different neutralization percent, different amounts of the same monomer units, and/or by being compositionally distinct, for example. In some embodiments, the second polymer is compositionally distinct from the first polymer. Compositionally distinct in this context can be understood to mean that at least one of the first and second polymers has a least one type of monomer unit not present in the other of the first and second polymers. For example, the first polymer can include two different monomer units (e.g., (meth)acrylic acid and either ethylene or propylene) and the second polymer can include a different third monomer unit (e.g., n-butyl acrylate or isobutyl acrylate) in addition to the two monomer units of the first polymer. Compositionally distinct includes different acid types (e.g., methacrylic acid monomer units versus acrylic acid monomer units) and different ion types (an ion at least partially neutralizing an ionomer can be considered to be part of the ionomer), for example. The second polymer can have a number average molecular weight of at least 10000 grams/mole, or at least 12000 grams/mole, or at least 15000 grams/mole.

In some embodiments, the second polymer includes (meth)acrylic acid monomer units. In some embodiments, the second polymer includes at least one monomer unit selected from the group consisting of ethylene, propylene, alkyl(meth)acrylates, aryl(meth)acrylates, alkaryl(meth) acrylates, acrylonitrile, and carbon monoxide. In some embodiments, the second polymer includes at least one monomer unit selected from the group consisting of ethylene and propylene. In some such embodiments, the second polymer further includes at least one monomer unit selected from the group consisting of n-butyl acrylate, isobutyl acrylate, isopropyl acrylate, n-propyl acrylate, ethyl acrylate, methyl acrylate, 2-ethylhexyl acrylate, iso-octyl acrylate and methyl methacrylate. In some embodiments, the second polymer includes (meth)acrylic acid monomer units; ethylene monomer units, propylene monomer units, or a combination of ethylene and propylene monomer units; and at least one alkyl (meth)acrylate monomer unit. In some embodiments, the second polymer includes (meth)acrylic acid monomer units and ethylene monomer units.

In some embodiments, the content of (meth)acrylic acid monomer units in the first polymer, and optionally in the second polymer, is greater than 12 weight percent. This has been found to help in dispersing the first polymer, and optionally the second polymer, in water. In some embodiments, the content of (meth)acrylic acid monomer units in the first and the second polymers is similar. This has been found to help the compatibility of the polymers and to improve optical properties, for example. In some embodiments, the first polymer includes (meth)acrylic acid monomer units at a first weight percent w1, and the second polymer includes (meth)acrylic monomer units at a second weight percent w2. In some embodiments, at least one of w1 and w2 (w1, or w2, or each of w1 and w2) is greater than 12 weight percent, or greater than 13 weight percent, or greater than 14 weight percent, or greater than 15 weight percent. In some embodiments, at least one of w1 and w2 is less than 50 weight percent, or less than 30 weight percent, or less than 25 weight percent. In some such embodiments, or in other embodiments, |w1−w2| is less than 15 weight percent or less than 14 weight percent, or less than 12 weigh percent, or less than 10 percent, or less than 8 percent, or less than 7 weight percent, or less than 6 weight percent. Smaller values of the difference |w1−w2| may be preferred when both the first and second polymers are formed from an aqueous dispersion, while larger values of the difference may be useful, in some embodiments, when the second polymer is added in a melt processing step.

In some embodiments, the aqueous dispersion includes a polar organic solvent such as an alcohol. Suitable organic solvents include, but are not limited to, ethanol, methanol, n-propanol, isopropanol, or combinations thereof, for example. The organic solvent may be included at 20 to 50 weight percent of the aqueous dispersion, for example. Including a polar organic solvent allows polymers with lower (meth)acrylic acid content to be dispersed in the aqueous dispersion. For example, a polymer with a (meth) acrylic acid content of less than 15 weight percent, or less than 12 weight percent, or less than 10 weight percent can be dispersed. In other embodiments, the aqueous dispersion can be essentially free of organic solvent (e.g., less than 5 weight percent organic solvent or less than 2 weight percent organic solvent). For some applications, a (meth)acrylic acid content of at least 15 weight percent is preferred since this results in an ionomer or nanocomposite with improved bonding to substrates such as glass.

In some embodiments, the nanocomposite is formed from an aqueous dispersion including the first and second polymers as described further elsewhere herein. In some such embodiments, or in other embodiments, each of w1 and w2 is greater than 12 weight percent, or greater than 13 weight percent, or greater than 14 weight percent, or greater than 15 weight percent. In some such embodiments, or in other embodiments, |w1−w2| is less than 10 weight percent, or less than 9 weight percent, or less than 8 weight percent, or less than 7 weight percent, or less than 6 weight percent. In some embodiments, |w1−w2| is in a range of 0 to 10 weight percent or in a range of 0 to about 9 weight percent (e.g., 8.8 or 9 or 9.2 weight percent can be considered to be about 9 weight percent). In some cases, where each of the two polymers in dispersion includes two monomer units (e.g., a (meth)acrylic acid monomer unit and a second monomer unit such as ethylene or propylene), the acid content of either the first polymer (w1) or second polymer (w2) may be in a range greater than 27 weight percent, for example. When one of the two polymers (e.g., the first polymer) has an acid content of greater than 27%, the difference |w1−w2| may be up to 15 weight percent, for example.

In some embodiments, a first nanocomposite, or a first concentrated aqueous dispersion, that includes the first polymer is melt processed with the second polymer (also referred to as an additional polymer) to form a nanocomposite (e.g., a second nanocomposite) that includes both the first and second polymers. In some such embodiments, the second polymer is not dispersible in water with or without a neutralizing agent. In some embodiments, w2 can be less than 12 weight percent and/or |w1−w2| can be as high as 15 weight percent, for example. In some embodiments, w1 is greater than 12 weight percent, or greater than 13 weight percent, or greater than 14 weight percent, or greater than 15 weight percent; or in a range of 13 to 50 weight percent, or 13 to 35 weight percent, or 13 to 27 weight percent, or 14 to 22 weight percent, or 15 to 21.5 weight percent, or 15 to 21 weight percent, or 15 to 20.5 weight percent. In some such embodiments, or in other embodiments, w2 is at least 10 weight percent; or in a range of 10 weight percent to 25 weight percent, or to 21.5 weight percent, to 21 weight percent, or to 20.5 weight percent; or w2 can be in any range described for w1. For example, in some embodiments, w1 is in a range of 15 to 20.5 weight percent and w2 is in a range of 10 to 20.5 weight percent or 15 to 20.5 weight percent. In some embodiments, at least one of w1 and w2 is in a range of 14 to 22 weight percent or in a range of 15 to 21.5 weight percent.

In some embodiments, the first polymer includes (meth) acrylic acid monomer units at a weight percent w1 and further includes ethylene monomer units, and the second polymer includes (meth)acrylic acid monomer units at a weight percent w1 and further includes ethylene monomer units. In some such embodiments, w1 is greater than 15 weight percent, and |w1−w2| is less than 10 weight percent.

In some embodiments, the first polymer includes (meth) acrylic acid monomer units at a weight percent w1 and further includes ethylene monomer units, and the second polymer includes (meth)acrylic acid monomer units at a weight percent w1, and further includes ethylene monomer units, and further includes at least one monomer unit selected from the group consisting of n-butyl acrylate, isobutyl acrylate, isopropyl acrylate, n-propyl acrylate, ethyl acrylate, methyl acrylate, 2-ethylhexyl acrylate, iso-octyl acrylate and methyl methacrylate. In some such embodiments, w1 is greater than 15 weight percent, and |w1−w2| is less than 15 weight percent, or less than 13 weight percent, or less than 12 weight percent.

In some embodiments, the first polymer is at least partially neutralized. By this it is meant that the first polymer includes a carboxylic acid group where the proton of the carboxylic acid group is replaced by a cation, such as a metal cation. Monovalent, divalent, and higher valency cations are suitable. In some embodiments, the first polymer is at least partially neutralized with metal cations, alkylammonium cations, or a combination thereof. In some embodiments, the first polymer is at least partially neutralized with sodium cations, calcium cations, potassium cations, zinc cations, lithium cations, magnesium cations, aluminum cations, or a combination thereof. In some embodiments, the first polymer is at least partially neutralized with nonmetallic cations. For example, the first polymer can be at least partially neutralized with alkylammonium cations. In some embodiments, the nanocomposite is formed from an aqueous dispersion as described further elsewhere herein. In some embodiments, in the aqueous dispersion, the first polymer is at least partially neutralized with at least one nonvolatile neutralizing agent, or at least one volatile neutralizing agent, or a combination of volatile and nonvolatile neutralizing agents. For example, in some embodiments, in the aqueous dispersion, the first polymer is at least partially neutralized with nonvolatile amine cations, volatile amine cations (e.g., cations of dimethylethanolamine or ammonium cations), or a combination of volatile and nonvolatile amine cations. The first polymer can be at least partially neutralized with a combination of different types of cations (e.g., metallic and nonmetallic cations or any combinations of cations describe herein). The first polymer can be an at least partially neutralized ionomer prior to being dispersed in the aqueous dispersion. In some embodiments, the ionomer is sufficiently neutralized that no additional neutralizing agents need to be added to the aqueous dispersion. In other embodiments, the ionomer is further at least partially neutralized by additional neutralizing agents added to the aqueous dispersion as described further elsewhere herein.

In some embodiments, the second polymer is at least partially neutralized. In some embodiments, each polymer of the at least one polymer, or each polymer including (meth) acrylic acid monomer units, is at least partially neutralized. The second polymer, or other polymers of the at least one polymer, can be at least partially neutralized with any cation or combination of cations described for the first polymer.

Suitable ethylene (meth)acrylic acid copolymers can be obtained from commercial sources such as PRIMACOR 5980i and PRIMACOR 1410 from SK Global Chemical Co. Ltd. (Seoul, South Korea), NUCREL 960, 699, and 925 a from Dow Chemical Co. (Midland, MI), ESCOR 5200 from Exxon-Mobil (Irving, TX), and AC-5180 from Honeywell (Morris Plains, NJ), for example. Suitable partially neutralized ethylene (meth)acrylic acid copolymers can be obtained from commercial sources such as, for example, SURLYN 1601, 1706, 1707, 7940, 9020, 9120, 8150 and PC-350, and HPF 1000 from Dow Chemical Co. (Midland, MI), for example.

A wide range of metal oxide nanoparticles are suitable. Examples of suitable metal oxide nanoparticles include metal oxides of silicon (silicon is considered to be a metalloid and thus is included in the list of metal oxides), titanium, aluminum, hafnium, zinc, tin, cerium, yttrium, indium, antimony or mixed metal oxides thereof. Among the more desirable metal oxide nanoparticles are those of silicon. For example, the metal oxide nanoparticles can be silica ($SiO_2$) nanoparticles or $SiO_x$ (0<x<2) nanoparticles.

The size of such particles can be chosen to avoid significant visible light scattering. The surface-modified metal oxide nanoparticles can be particles having a (e.g. unassociated) primary particle size or associated particle size of greater than 1 nm (nanometers) and less than 200 nm. In some embodiments, the particle size is greater than 4 nm, greater than 5 nm, greater than 10 nm, or greater than 20 nm. In some embodiments, the particle size is less than 190 nm, less than 150 nm, less than 100 nm, less than 75 nm, or less than 50 nm. Typically, the nanoparticles have a size ranging from 4-190 nm, 4-100 nm, 4-75 nm, 10-50 nm, or 20-50 nm. In embodiments where a low optical haze is desired, a particle size of less than 100 nm, less than 75 nm, or less than 50 nm is typically preferred. It is typically desirable that the nanoparticles are unassociated. Particle size can be measured in a wide variety of ways such as by transmission electron microscopy (TEM). Typically, commercially obtained metal oxide nanoparticles are supplied with a listed particle size or particle size range.

The nanoparticles are surface modified to improve compatibility with the polymer matrix material and to keep the nanoparticles non-associated, non-agglomerated, non-aggregated, or a combination thereof. The surface modification used to generate the surface-modified nanoparticles includes at least one acid-functional silane surface modifying agent. The acid-functional silane surface modifying agent can have the general Formula 1:

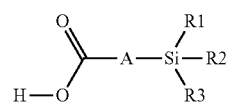

Formula 1 where R1 is a $C_1$ to $C_{10}$ alkoxy group; and R2 and R3 are independently selected from the group consisting of $C_1$ to $C_{10}$ alkyl and $C_1$ to $C_{10}$ alkoxy groups. The group A is a linker group selected from the group consisting of $C_1$ to $C_{10}$ alkylene or arylene groups, $C_1$ to $C_{10}$ aralkylene groups, $C_2$ to $C_{16}$ heteroalkylene or heteroarylene groups, and $C_2$ to $C_{16}$ amide containing groups. Amide containing groups include groups of the type $-(CH_2)_a-NH-(CO)-(CH_2)_b-$; where a and b are integers of 1 or greater, and (CO) is a carbonyl group C=O. In some embodiments, A is an alkylene group with 1-3 carbon atoms.

While acid-functional silanes may be commercially available, one aspect of the current disclosure includes the synthesis of the carboxylic acid-functional silanes of Formula 1. In addition to the synthetic process presented below, an anhydride-functional silane such as (3-triethoxysilyl)propylsuccinic anhydride, which can be obtained from commercial sources such as Gelest, Inc. (Morrisville, PA), could be used to prepare the acid-functional silane surface modification agent.

In some embodiments, a solution is prepared of an organic acid anhydride dissolved in a first organic solvent. A second solution is prepared of an aminosilane in a second organic solvent. The two solutions are combined. The combined solution is stirred continuously at a suitable temperature and duration to synthesize a carboxylic acid-functional silane of Formula 1. In other embodiments, a solution is prepared of an organic acid anhydride dissolved in an organic solvent. An aminosilane is dissolved in the organic acid anhydride solution. The solution containing the organic acid anhydride and aminosilane is stirred continuously at a suitable temperature and duration to synthesize a carboxylic acid silane of Formula 1. The first and second organic solvents may be the same or different. In the case where the first and second organic solvent are different, then the first and second organic solvents are miscible. Both first and second organic solvents are miscible with water.

Suitable organic acid anhydrides include succinic anhydride (3,4-dihdrofuran-2,5-dione), tetrahydrofuran-2,5-dione, 3-alkyltetrahydrofuran-2,5-diones such as 3-methyltetrahydrofuran-2,5-dione and 3-ethyltetrahydrofuran-2,5-dione, tetrahydropyran-2,6-dione, 3-alkyltetrahydropyran-2,6-diones such as 3-methyltetrahydropyran-2,6-dione and 3-ethyltetrahydropyran-2,6-dione 4-alkyltetrahydropyran-2,6-diones such as 4-methyltetrahydropyran-2,6-dione, 4-ethyltetrahydropyran-2,6-dione, and 4,4'-methyltetrahydropyran-2,6-dione, oxepane-2,7-dione. Suitable organic acid anhydrides can be obtained from commercial sources such as Alfa Aesar (Ward Hill, MA) and Millipore Sigma (Burlington, MA). Succinic anhydride is a particularly suitable organic acid anhydride.

Suitable aminosilanes include aminopropyltrimethoxysilane, aminopropyltriethoxysilane, p-aminophenyltrimethoxysilane, p-aminophenyltriethoxysilane, N-phenylaminopropyltrimethoxysilane, N-phenylaminopropyltriethoxysilane, n-butylaminopropyltrimethoxysilane, n-butylaminopropyltriethoxysilane, 3-(N-allylamino)propyltrimethoxysilane, (N,N-diethyl-3-aminopropyl)trimethoxysilane, and (N,N-diethyl-3-aminopropyl)triethoxysilane. Suitable aminosilanes can be obtained from commercial sources such as Gelest, Inc. (Morrisville, PA), Alfa Aesar (Ward Hill, MA), Millipore Sigma (Burlington, MA), and Momentive Performance Materials (Waterford, NY). A particularly suitable aminosilane is aminopropyltrimethoxysilane.

A wide variety of organic solvents can be used. Suitable organic solvents include N,N-dimethylformamide (DMF) which can be obtained from commercial sources such as OmniSolv (Billerica, MA).

In some embodiments, the surface-modified metal oxide nanoparticles are prepared by combining an aqueous nanodispersion of surface unmodified metal oxide nanoparticles of basic pH and a carboxylic acid-functional silane surface modifying agent, reacting the carboxylic acid-functional silane surface agent with the metal oxide nanoparticle surface resulting in an aqueous nanodispersion of surface-modified metal oxide nanoparticles where the nanoparticles are surface modified with a carboxylic acid. This can be carried out in a variety of ways. In some embodiments, an aqueous nanodispersion of surface unmodified metal oxide nanoparticles is combined with a solution of a carboxylic acid silane of Formula 1 in an organic solvent. In other embodiments, an aqueous nanodispersion of surface unmodified metal oxide nanoparticles is combined with a base and a solution of a carboxylic acid silane of Formula 1 in an organic solvent. In other embodiments, an aqueous nanodispersion of surface unmodified metal oxide nanoparticles is combined with a carboxylic acid silane of Formula 1. Generally, the carboxylic acid silane of Formula 1 is added at a concentration sufficient to modify 10 to 100% of the total metal oxide nanoparticle surface area in the nanodispersion. As was mentioned above, the metal oxide nanoparticles may have a variety of sizes. Typically, the average particle size is greater than 1 nm and less than 200 nm. In some embodiments, the particle size is greater than 4 nm, greater than 5 nm, greater than 10 nm, or greater than 20 nm. In some embodiments, the particle size is less than 190 nm, less than 150 nm, less than 100 nm, less than 75 nm, or less than 50 nm. Typically, the nanoparticles have a size ranging from 4-190 nm, 4-100 nm, 4-75 nm, 10-50 nm, or 20-50 nm. For low haze, typical preferred ranges are from 4-100 nm, 4-75 nm, or 4-50 nm. In some cases, a base may be added to the aqueous nanodispersion of surface unmodified metal oxide nanoparticles to maintain the pH in the desired range since the addition of the carboxylic acid silane solution of Formula 1 will tend to lower pH. In some cases, the organic solvent is removed from of the solution of carboxylic acid silane in organic solvent prior to combining the carboxylic acid silane and aqueous nanodispersion of surface unmodified metal oxide nanoparticles.

Aqueous nanodispersions of unmodified metal oxide nanoparticles may be prepared or, in some embodiments, aqueous nanodispersions of unmodified metal oxide nanoparticles may be obtained commercially. Suitable surface unmodified metal oxide nanoparticles include aqueous nanodispersions commercially available from Nalco Chemical Company (Naperville, IL) under the trade designation "Nalco Colloidal Silicas" such as products NALCO 2326, 1130, DVSZN002, 1142, 2327, 1050, DVSZN004, 1060, and 2329K; from Nissan Chemical America Corporation (Houston, TX) under the tradename SNOWTEX such as products ST-NXS, ST-XS, ST-S, ST-30, ST-40, ST-N40, ST-50, ST-XL, and ST-YL; from Nyacol Nano Technologies, Inc. (Ashland, MA) such as NEXSIL 5, 6, 12, 20, 85-40, 20A, 20K-30, and 20NH4. In some cases, the surface unmodified metal oxide nanoparticles may be dispersed in an aqueous solution with a pH in the range 8-12.

Suitable bases include ammonium hydroxide which can be obtained from commercial sources such as Millipore Sigma (Burlington, MA).

Typically, the surface-modified metal oxide nanoparticles are used as a nanodispersion, and the particles are not isolated. Another aspect of the present disclosure involves the preparation of nanodispersions of surface-modified metal oxide nanoparticles without precipitation, gelation, agglomeration, or aggregation, where the metal oxide nanoparticles are surface modified with a carboxylic acid silane of Formula 1.

In some embodiments, an aqueous nanodispersion of surface unmodified metal oxide nanoparticles and solution of a carboxylic acid silane of Formula 1 in an organic solvent are combined in a reactor and heated at a suitable temperature and duration to react the carboxylic acid silane of Formula 1 with the surface of the metal oxide nanoparticles. In other embodiments, an aqueous nanodispersion of surface-unmodified metal oxide nanoparticles, base, and a solution of carboxylic acid silane of Formula 1 in an organic solvent are combined in a reactor and heated at a suitable temperature and duration to react the carboxylic acid silane of Formula 1 with the surface of the metal oxide nanoparticles. In some embodiments, a solvent exchange is performed on the aqueous nanodispersion of surface-modified metal oxide nanoparticles and organic solvent to remove the organic solvent. In some embodiments, the reactor is open, under reflux conditions, and in other embodiments the reactor is closed and under pressure. In some embodiments, the reactor is glass and in some embodiments the reactor is stainless steel.

A wide range of loadings of the surface-modified metal oxide nanoparticles in the nanocomposite are suitable. Typically, the nanocomposite includes at least 1% by weight of surface-modified metal oxide nanoparticles and no more than 70% by weight of surface-modified metal oxide nanoparticles. In some embodiments, the surface-modified metal oxide nanoparticle concentration is from 5-60% by weight, or from 10-50% by weight.

Additional additives may include flame retardants, thermal stabilizers, anti-slip agents, neutralizing agents, UV absorbers, light stabilizers, antioxidants, crosslinking agents, mold release agents, catalysts, colorants, anti-stat agents, defoamers, plasticizers, and other processing aids, for example.

The nanocomposites may be provided in a wide range of configurations and articles. In some embodiments, the nanocomposite may be configured into continuous or discontinuous articles. For example, the nanocomposites may be in the form of a film, a sheet, a filament, particles, pellets, flakes. Additionally, an advantage of the nanocomposites is they may be in the configuration of a formed article. Forming is a commonly used process in the plastics art and includes molding techniques such as rotational molding, injection molding, blow molding, compression molding, and vacuum molding. Forming techniques can be used to form the nanocomposite into a wide range of three dimensional shapes. As mentioned above, the ability to form the nanocomposites into three dimensional shapes is something that more rigid materials such as glass are unable to do.

Also disclosed herein are a wide array of articles. Typically, the articles are optical articles. In some embodiments, the optical articles are optical film articles. In other embodiments, the articles are optical articles that include a display device as well as an optical film article. In other embodiments, the articles are optical articles that include a photovoltaic device as well as an optical film article. Optical film articles are articles that include an optical film. By this it is meant that the article may be an optical film, or it may include an optical film with other elements. In some embodiments, an optical film or optical film article includes at least one layer of a nanocomposite, where the nanocomposite is any nanocomposite described herein.

The optical films have a wide range of desirable properties. The optical films can be flexible, bendable, rollable, and/or foldable. These properties can be measured in a wide variety of ways as is well understood by one of ordinary skill in the art. For example, in some embodiments, an optical film can be bent around a cylindrical mandrel having a diameter of 10 mm, or 8 mm, or 6 mm, or 4 mm, or 2 mm without cracking. In some embodiments, the optical films are formable into a wide variety of three-dimensional shapes. Besides the above listed mechanical properties, the optical films also have desirable optical properties. Generally, the optical films are optically transparent and may be optically clear. Typically, the optically transparent optical films have an optical transmission in the visible light spectrum (about 400 to about 700 nm) of at least 80% and have a haze value of 10% or less. In some embodiments, the optical film article, or the optical film, or the nanocomposite layer of the optical film, or the optical coating of the optical film, has a luminous transmittance of greater than 85%, greater than 87%, greater than 89%, or greater than 90%. In some embodiments, the optical film article, or the optical film, or the nanocomposite layer of the optical film, or the optical coating of the optical film, has an optical haze of less than 7%, less than 5%, less than 4%, or less than 3%, or even less than 2%.

In some embodiments, the optical films or optical film articles or layer(s) of the optical films are nominally colorless. As described elsewhere, this refers to compositions that are generally color neutral on the yellow index with b* values being less than 5. In some embodiments, the yellow index b* value is 4 or less, 3 or less, 2 or less, or even 1 or less.

In some embodiments, the optical film article is a multilayer optical film article. By this it is meant that in addition to the at least one nanocomposite layer there is at least one additional layer in the optical film article. A wide variety of additional layers are suitable for use in the multilayer optical film articles of this disclosure. The additional layer or layers may be a coating, a lamination, or a coextruded layer. Examples of suitable layers include permanent layers and removable layers. Permanent layers are those that remain within the multilayer optical film article when it is used, whereas removable layers are those that are removed prior to the use of the multilayer optical film article.

Examples of suitable permanent layers include transparent functional coating layers and transparent adhesive layers. A wide range of transparent functional coatings are suitable depending upon the desired properties of the optical film article. Examples of a suitable transparent functional coating layers include a hardcoat layer, an ultraviolet (UV) protective layer, a conductive layer, a barrier layer, microstructure layer, an anti-glare layer, an anti-reflective layer, an anti-fingerprint layer, or an anti-sparkle layer. Such layers are well known and understood in the art.

Examples of suitable transparent adhesive layers include transparent pressure sensitive adhesive layers and transparent heat activated adhesives. A wide range of suitable transparent pressure sensitive adhesives are known including, for example, (meth)acrylate-based adhesives, block copolymer adhesives, and silicone adhesives. Examples of transparent heat activated adhesives include polyvinyl butyral (PVB). Examples of suitable adhesives include, for example, 3M OPTICALLY CLEAR ADHESIVES and 3M CONTRAST ENHANCEMENT FILMS.

Examples of removable layers include handling films and release liners. These layers can be attached to the multilayer optical film article to protect the surfaces of the article during shipping and handling of the article, and are removed prior to the use of the article.

Also disclosed are optical articles including a display device, and an optical film in contact with a surface of the display device. The optical films are described further elsewhere and include at least one layer of nanocomposite and may be a multilayer film.

A wide variety of display devices are suitable for the optical articles of this disclosure. The display device may include a display window. The display device can be any useful article such as, for example, a phone or smartphone, electronic tablet, electronic notebook, and computer. The optical display may include an organic light emitting diode (OLED) display panel. The optical display may include a liquid crystal display (LCD) panel or a reflective display. Examples of reflective displays include electrophoretic displays, electrofluidic displays (such as an electrowetting display), interferometric displays or electronic paper display panels, and are described in U.S. Pat. Appl. Publ. No. 2015/0330597 (Schaffer et al.). Further examples of optical displays include static display such as commercial graphic signs and billboards.

A wide variety of articles of this disclosure are suitable protective layers for photovoltaic devices such as encapsulant layers for photovoltaic solar panels.

In some embodiments, the optical article includes a display device with a formed optical film article, where the formed optical film article is a molded optical film article.

Exemplary nanocomposite articles and devices of this disclosure are further illustrated in FIGS. 1-10.

FIG. 1 is a schematic cross-sectional view of an illustrative flexible display film article 30. Article 30 includes the flexible display film 10 which includes a nanocomposite layer 14. The nanocomposite layer 14 can be a transparent elastomeric nanocomposite layer.

The flexible display film 10 may have a haze value of 10% or less. In some embodiments, the flexible display film 10 had a haze value of 7% or less, or 5% or less, 4% or less, or 3% or less. The flexible display film 10 may have a clarity of 95% or greater, or 97% or greater. The flexible display film 10 may have a visible light transmission of 85% or greater, or 90% or greater, or 93% or greater.

The flexible display film 10 may be nominally colorless, having a yellow index or b* value of 5 or less, or 4 or less, or 3 or less, or 2 or less, or 1 or less. In some embodiments, the display film 10 may have a yellow index or b* value of 1 or less.

After at least 100,000 bending or folding cycles about a 3 millimeter (mm) radius, the flexible display film 10 may maintain a haze value of 5% or less. After at least 100,000 bending or folding cycles about a 5 mm radius, or about a 4 mm radius, or about a 3 mm radius, or about a 2 mm radius, or about a 1 mm radius, the flexible display film 10 may maintain a stable haze value, or remain intact without cracking or delaminating. After at least 100,000 bending or folding cycles about a 3 mm radius or less, the flexible display film 10 may remain intact.

The flexible display film 10 may have any useful thickness. In many embodiments, the flexible display film 10 has a thickness of 500 micrometers or less, or 400 micrometers or less, or 300 micrometers or less, or 200 micrometers or less. The thickness of the flexible display film 10 is a balance between being thick enough to provide the desired display protection and thin enough to provide the folding and reduced thickness design parameters.

Figure 2:
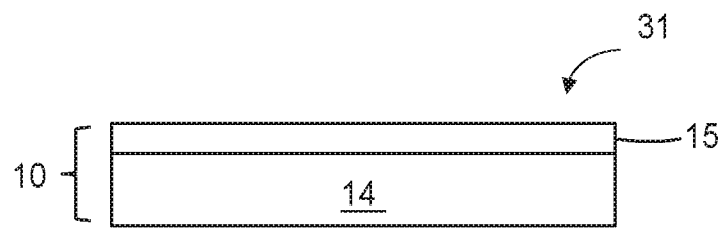

FIG. 2 is a schematic cross-sectional view of an illustrative flexible display film article 31. Article 31 includes the flexible display film 10 which includes a nanocomposite layer 14 and a transparent functional coating layer 15.

The transparent functional coating layer 15 may be an abrasion resistant hardcoat, or conductive layer for touch sensitive display elements, or barrier layer to mitigate or slow ingress of oxygen or water through the flexible display film 10. Transparent barrier layers may include for example, thin alternating layers of silica, alumina or zirconia together with an organic resin. Exemplary transparent barrier layers are described in U.S. Pat. No. 7,980,910 (Padiyath et al.) and U.S. Pat. Appl. Pub. No. 2003/0203210 (Graff et al.).

Other transparent functional coating layers 15 include a microstructure layer, a slip agent layer, an anti-glare layer, an anti-reflective layer, or an anti-fingerprint layer. Additional transparent functional coating layers 15 may be disposed in the interior of the display film. One useful transparent functional coating layer 15 disposed within the flexible display film 10 is a sparkle reduction layer as described in U.S. Pat. Appl. Pub. No. 2017/0115498 (Sitter et al.). The sparkle reduction layer may be particularly useful with high definition displays that include anti-glare coatings.

Figure 3:
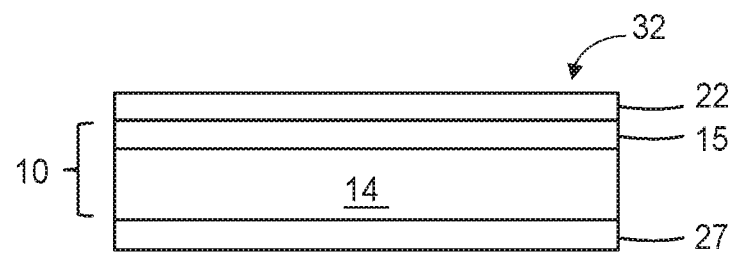

FIG. 3 is a schematic cross-sectional view of an illustrative flexible display film article 32. Article 32 includes the flexible display film 10, where the flexible display film 10 includes a nanocomposite layer 14 and a transparent functional coating layer 15, and where removable liners 22 and 27 offer transport protection to the underlying flexible display film 10.

Figure 4:
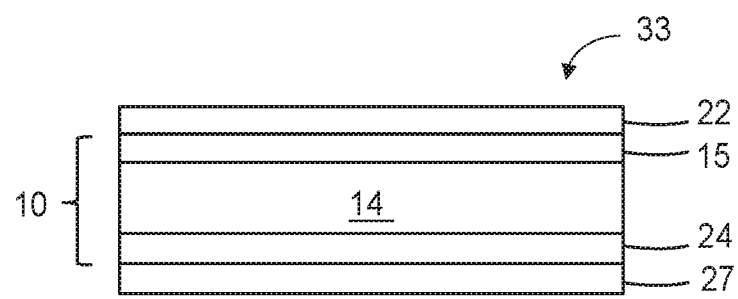

FIG. 4 is a schematic cross-sectional view of an illustrative flexible display film article 33. Article 33 includes the flexible display film 10, where the flexible display film 10 includes a nanocomposite layer 14, a transparent functional coating layer 15, and a transparent adhesive layer 24, and where removable liners 22 and 27 offer transport protection to the underlying flexible display film 10.

Figure 5:
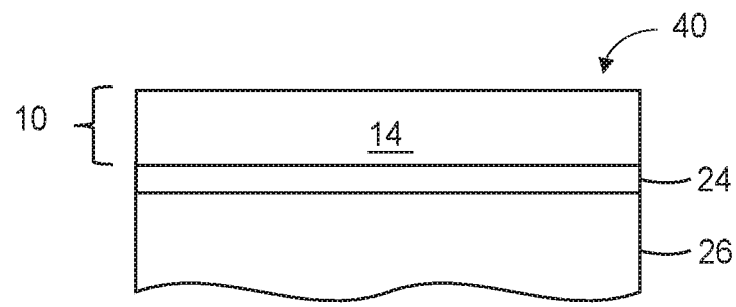
FIGS. 5-6 are schematic cross-sectional views of illustrative flexible optical films on optical displays.

FIG. 5 is a schematic cross-sectional view of an illustrative flexible display film 10 on an optical element 26 forming article 40. The flexible display film 10 includes a nanocomposite layer 14. A transparent adhesive layer 24 adheres the flexible display film 10 to the optical element 26. In some cases, the transparent adhesive layer 24 permanently fixes the flexible display film 10 to the optical element 26. In some cases, the flexible display film 10 and adhesive layer 24 can be removed/debonded/repositioned, relative to the optical element 26, the application of heat or mechanical force such that the flexible display film is replaceable or repositioned by the consumer. In some embodiments, optical element 26 is or includes a display device. In some embodiments, an optical system (e.g., corresponding to article 40 or to an optical system including article 40) includes a display device (e.g., optical element 26) and an optical film of the present disclosure (e.g., display film 10) disposed on the display device.

Figure 6:
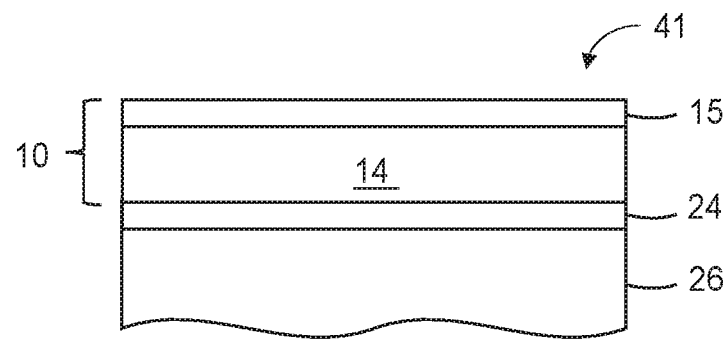

FIG. 6 is a schematic cross-sectional view of an illustrative flexible display film 10 on an optical element 26 forming an article 41. The flexible display film 10 includes a nanocomposite layer 14 and a transparent functional coating layer 15. A transparent adhesive layer 24 adheres the flexible display film 10 to the optical element 26. In some cases, the transparent adhesive layer 24 permanently fixes the flexible display film 10 to the optical element 26. In some cases, the flexible display film 10 and adhesive layer 24 can be removed/debonded/repositioned, relative to the optical element 26, the application of heat or mechanical force such that the flexible display film is replaceable or repositioned by the consumer.

Figure 7:
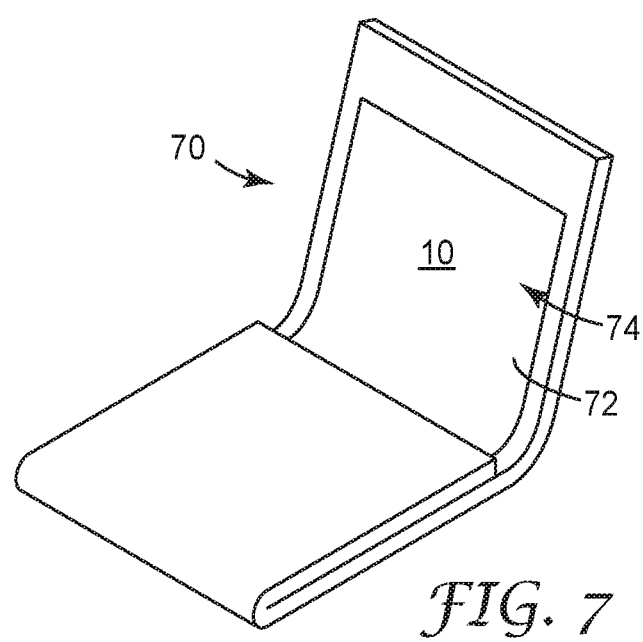
FIG. 7 is a schematic perspective view of an illustrative folding article including an illustrative flexible optical film.

FIG. 7 is a schematic perspective view of an illustrative folding display device 70 including an illustrative flexible display film 10. The flexible display film 10 may be any of the display film constructions described herein disposed on an optical element such as an optical display 74. Alternatively, the display device 70 may not be a folding article and may only flex within a certain range, or may be a static curved display device. Display device 70 may also be referred to as an optical system.

An optical display 74 may form at least a portion of display device. The display device 70 may include a display window 72. The display device 70 can be any useful article such as, for example, a phone or smartphone, electronic tablet, electronic notebook, or computer. The optical display may include an organic light emitting diode (OLED) display panel. The optical display may include a liquid crystal display (LCD) panel or a reflective display. Examples of reflective displays include electrophoretic displays, electrofluidic displays (such as an electrowetting display), interferometric displays or electronic paper display panels, and are described in U.S. Pat. Appl. Publ. No. 2015/0330597 (Schaffer et al.). Further examples of optical displays include static displays such as commercial graphic signs and billboards.

The flexible display film 10 and the optical display 74 may be foldable so that the optical display 74 faces itself and at least a portion of display film 10 contacts or directly faces another portion of the flexible display film 10, as illustrated in FIG. 7. The flexible display film 10 and the optical display 74 may be flexible or bendable or rollable or foldable so that a portion of the display film 10 and the optical display 74 can articulate relative to another portion of the flexible display film 10 and the optical display 74. The display film 10 and the optical display 74 may be flexible or bendable or rollable or foldable so that a portion of the flexible display film 10 and the optical display 74 can articulate at least 90 degrees or at least 170 degrees relative to another portion of the display film 10 and the optical display 74.

The flexible display film 10 and the optical display 74 may be flexible or bendable or rollable or foldable so that a portion of the display film 10 and the optical display 74 can articulate relative to another portion of the flexible display film 10 and optical display 74 to form a bend radius of 3 mm or less in the display film 10 at the bend or fold line. The flexible display film 10 and the optical display 74 may be flexible or bendable or rollable or foldable so that a portion of the flexible display film 10 and optical display 74 can articulate relative to another portion of the display film 10 and the optical display 74 to form a bend radius such that the flexible display film 10 overlaps itself and is separated from each other by a distance on 10 mm or less, or 6 mm or less or 3 mm or less or contacts each other. While FIG. 7 shows the display device 74 folding inward, where the surface of the display film 10 approach each other, there are other cases in which the display device may fold in the opposite or outward direction (out-folding) such that the flexible display film 10 is on the outer surface of the display device.

Figure 8:
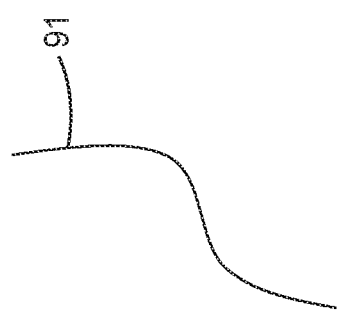
FIG. 8 is a schematic representation of an illustrative filament.

In some embodiments, the nanocomposite is in the form of a filament. For example, the nanocomposite can be extruded into the form of a filament for use in string, fibers, or fabrics, for example. FIG. 8 is a schematic representation of an illustrative filament 91.

Figure 9:
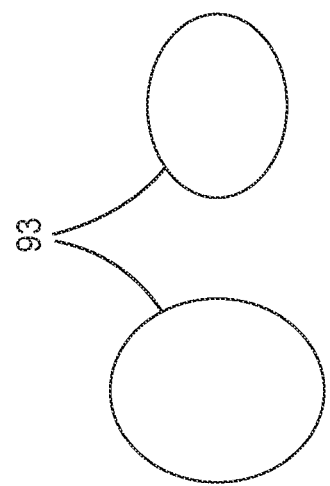
FIG. 9 is a schematic representation of illustrative particles, pellets, or flakes.

In some embodiments, the nanocomposite is in the form of particles, pellets, or flakes. FIG. 9 is a schematic representation of illustrative elements 93, which can be particles, pellets, or flakes. Elements 93 can schematically represent approximately spherical or ellipsoidal particles or pellets (e.g., shown in cross-sectional view), or approximately planar flakes (e.g., shown in plan view).

Figure 10:
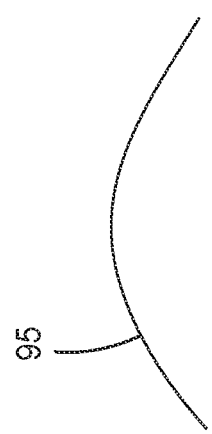
FIG. 10 is a schematic cross-sectional view of an illustrative formed article.

In some embodiments, an optical film or optical film article includes a formed nanocomposite. The optical films are described further elsewhere herein. The optical film may be monolithic (the film may be just the nanocomposite layer) or the film may be a multilayer optical film. Additionally, the formed nanocomposite may be in a variety of three dimensional shapes. In some embodiments, the nanocomposite is in the form of a formed article. For example, the nanocomposite, or a film including the nanocomposite, can be thermoformed into a desired shape. FIG. 10 is a schematic cross-sectional view of an illustrative formed article 95. Formed article 95 can be a protective cover film, for example, and can have a shape selected to conform to a curved display surface or a curved lens surface, for example.

Also disclosed herein are aqueous dispersions which can be used, for example, in forming the nanocomposite. It has been unexpectedly found that high molecular weight (meth)acrylic polymer(s) (e.g., number average molecular weight of at least 10000 grams/mole) can be dispersed in water (e.g., with suitable neutralizing agents) and that the resulting aqueous dispersion is useful in making a nanocomposite, for example, with desired mechanical and optical properties. In some embodiments, an aqueous dispersion includes water; at least one polymer dispersed in the water; and metal oxide nanoparticles dispersed in the water. The at least one polymer includes a first polymer including (meth)acrylic acid monomer units and having a number average molecular weight of at least 10000 grams/mole. The first polymer is at least partially neutralized. The metal oxide nanoparticles are surface modified with a carboxylic acid silane surface modifying agent. The carboxylic acid silane surface modifying agent can be or include a carboxylic acid silane of Formula 1, described elsewhere herein.

Figure 11:
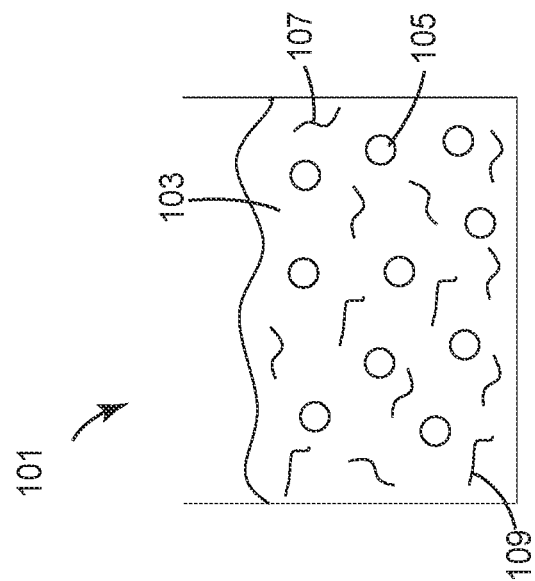
FIG. 11 is a schematic cross-sectional view of an illustrative aqueous dispersion.

FIG. 11 is a schematic cross-sectional view of an illustrative aqueous dispersion 101 including water 103, nanoparticles 105, and first and second polymers 107 and 109. In other embodiments, the second polymer 109 is not included in the aqueous dispersion. In still other embodiments, the first and second polymers 107 and 109 are included and additional polymer(s) are included in the aqueous dispersion. The nanoparticles 105 can include one or more types of nanoparticles (e.g., pluralities of first and second metal oxide nanoparticles, where the first and second metal oxide nanoparticles differ in at least one of size, shape, or composition).

The first polymer of the aqueous dispersion can be as described for the first polymer of the nanocomposite provided that the first polymer is dispersible in water (e.g., optionally with the addition of a neutralizing agent). For example, the first polymer can be a polymer or copolymer including (meth)acrylic monomer units at greater than 12 weight percent. In some embodiments, the at least one polymer further includes a second polymer. The second polymer of the aqueous dispersion can be as described for the second polymer of the nanocomposite provided that the second polymer is dispersible in water (e.g., optionally with the addition of a neutralizing agent). For example, the second polymer can be a polymer or copolymer including (meth)acrylic monomer units at greater than 12 weight percent. In some embodiments, the first polymer includes (meth)acrylic monomer units at a first weight percent w1, and the second polymer includes (meth)acrylic monomer units at a second weight percent w2. In some embodiments, each of w1 and w2 is greater than 12 weight percent, or greater than 14 weight percent, or greater that 15 weight percent. In embodiments where first and second polymers are included it is typically preferred that the difference in the content of (meth)acrylic acid monomer units in the first and second polymers is small since this has been found to help the compatibility of the polymers which has been found to result in improved optical properties, for example. In some such embodiments, or in other embodiments, |w1−w2| is less than 8 weight percent, or less than 7.5 percent, or less than 7 weight percent, or less than 6.5 weight percent, or less than 6 weight percent. In other embodiments, |w1−w2| is in a range of 0 to 7.5 weight percent or 0 to about 7 weight percent. In some embodiments, at least one of w1 and w2 is in a range of 14 to 22 weight percent or in a range of 15 to 21.5 weight percent. In some embodiments, each of w1 and w2 is in a range of 14 to 22 weight percent or in a range of 15 to 21.5 weight percent.

Figure 12:
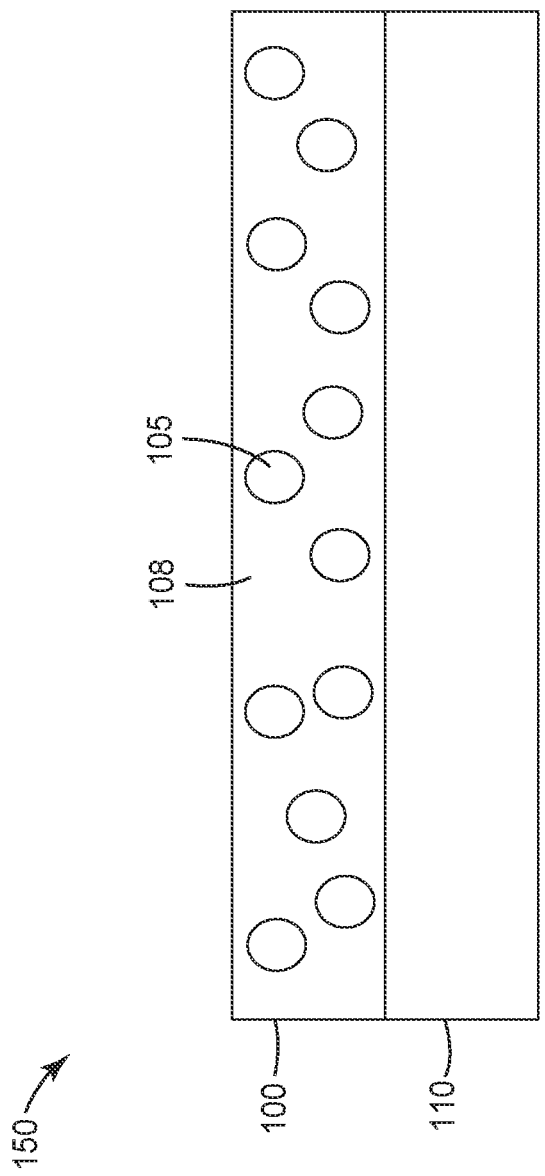
FIG. 12 is a schematic cross-sectional view of an illustrative film.

The aqueous dispersion can be coated on a substrate to form a layer of a nanocomposite on a substrate as described further elsewhere herein. FIG. 12 is a schematic cross-sectional view of a film 150 including a nanocomposite in the form of nanocomposite layer 100 disposed on a substrate 110. The nanocomposite layer 100 includes the particles 105 dispersed in the at least one polymer 108. For example, the at least one polymer 108 can be a polymer matrix that can include a blend of the first and second polymers 107 and 109. In some embodiments, the nanocomposite layer 100 is removed from the substrate 110. In some such embodiments, the nanocomposite layer 100 is then a free-standing film which may be an optical film having a luminous transmittance and/or optical haze as described elsewhere herein. In some embodiments, the nanocomposite layer 100 is an optical coating which is not removed from the substrate 110. The optical coating, or the film 150 which may be an optical film, can have a luminous transmittance and/or optical haze described elsewhere herein.

In some embodiments, a film 150 includes a substrate 110 and a nanocomposite layer 100 disposed on the substrate 110. In some embodiments, the substrate 110 includes one or more of glass, ceramic, metal, or polymer. The substrate may be formed of any useful polymeric material, for example, that provides desired mechanical properties (such as dimensional stability) and optical properties (such as light transmission and clarity). In some embodiments, the substrate 110 includes one or more of polyester (e.g., polyethylene terephthalate, polyethylene naphthalate), polycarbonate, polymethylmethacrylate, paper, cyclic olefin polymer, cyclic olefin copolymer, thermoplastic polyurethane, or polyimide. For example, the substrate 110 can be a paper with an image and the nanocomposite layer 100 can be a protective layer for protecting the image. In some embodiments, the substrate 110 is a glass which can be a flexible glass.

In some embodiments, the substrate 110 is or includes a polyimide which may be a nominally colorless polyimide. Nominally colorless polyimide can be formed via chemistry or via nanoparticle incorporation. Some exemplary nominally colorless polyimides formed via chemistry are described in WO 2014/092422. Some exemplary nominally colorless polyimides formed via nanoparticle incorporation are described in Journal of Industrial and Engineering Chemistry 28 (2015) 16-27. Useful polyimide films, which can be nominally colorless, may have glass transition temperatures greater 220 degrees Celsius or greater than 250 degrees Celsius or even greater than 300 degrees Celsius and tensile moduli greater than 6 GPa, or greater than 6.5 GPa or even Greater than 7 GPa. These high modulus polymers exhibit excellent resistance to plastic deformation. In some cases, a b* value for the film or substrate is less than 5. In some preferred cases, b* is less 4 or less, 3 or less than 2.

The substrate 110 may be primed or treated to impart some desired property to one or more of its surfaces. For example, the substrate 110 may be primed to improve adhesion of the nanocomposite layer 100 to the substrate 110. Examples of such treatments include corona, flame, plasma and chemical treatments such as, acrylate or silane treatments.

In some embodiments, an aqueous dispersion described elsewhere herein is coated onto a substrate 110 and dried to form a nanocomposite layer 100 (e.g., an optical coating) disposed on the substrate. In some embodiments, the resulting film 150 is the desired article (e.g., with no further processing). For example, the film 150 can be a protective film for display applications, for example. In some embodiments, the substrate 110 is an article, such as a display article or an optical lens. For example, an aqueous dispersion described elsewhere herein can be coated onto a (e.g. curved) major surface of an article and dried to form a nanocomposite optical coating disposed on the major surface.

In some embodiments, the substrate 110 is optically transparent. In some embodiments, the film 150 has a luminous transmittance of at least 80%, or at least 85%, or at least 90%. In some embodiments, the film 150 has an optical haze of less than 7 percent, or less than 5 percent, or less than 4 percent, or less than 3 percent, or even less than 2 percent. In some embodiments, the nanocomposite layer 100 has a luminous transmittance of at least 80%, or at least 85%, or at least 90%. In some embodiments, the nanocomposite layer 100 has an optical haze of less than 7 percent, or less than 5 percent, or less than 4 percent, or less than 3 percent, or even less than 2 percent.

Figure 13:
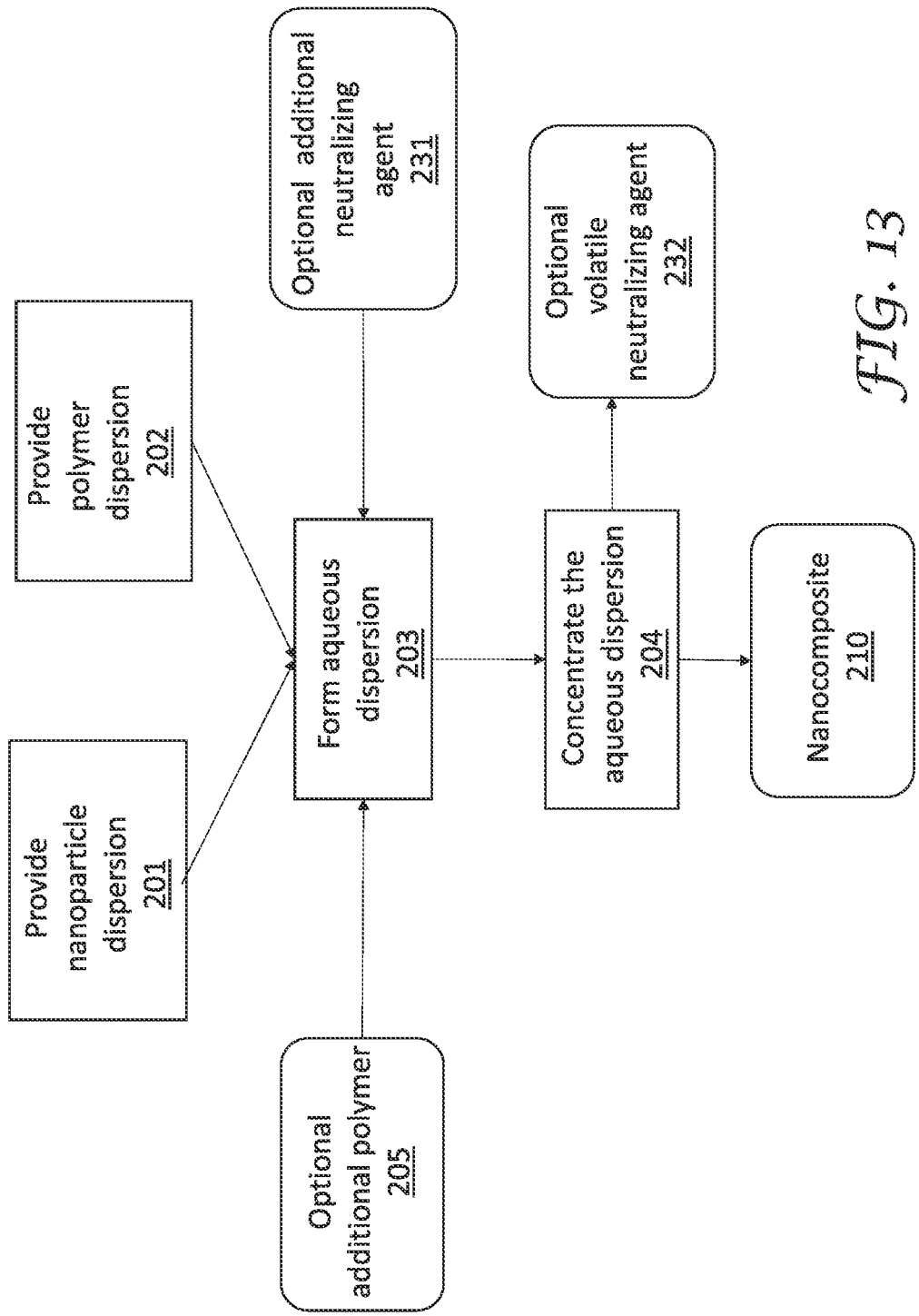
FIGS. 13-14 are flow diagrams schematically illustrating methods of making nanocomposites.
Figure 14:
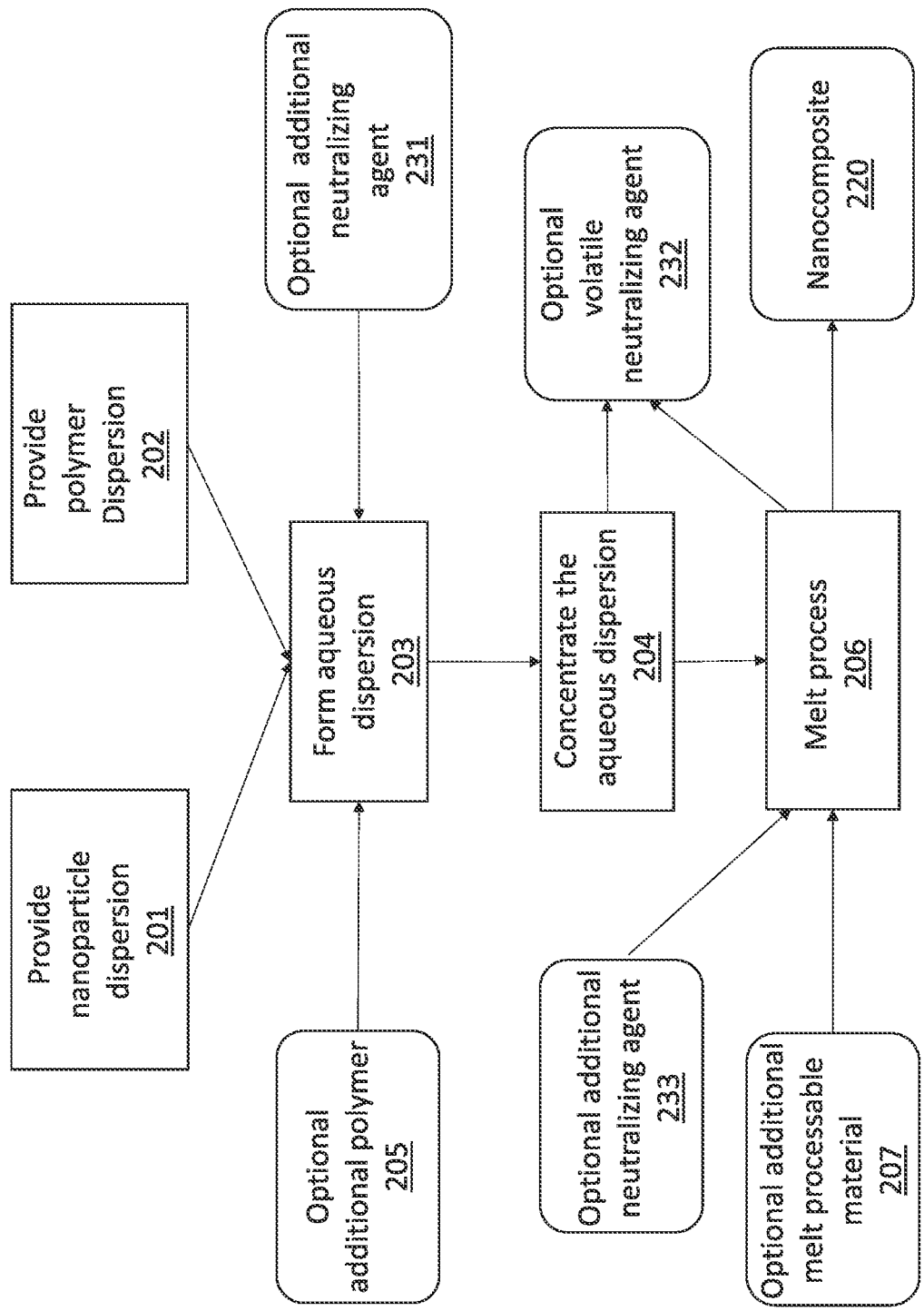

Also disclosed herein are methods of making nanocomposites. A method can include providing an aqueous dispersion and concentrating the aqueous dispersion. As schematically illustrated in FIGS. 13-14, in some embodiments, a method of making a nanocomposite includes providing a nanoparticle dispersion (step 201) including metal oxide nanoparticles dispersed in water where the metal oxide nanoparticles are surface modified with a carboxylic acid silane surface modifying agent; providing a (e.g., at least partially neutralized) polymer dispersion (step 202) including at least one polymer dispersed in water where the at least one polymer includes a first polymer including (meth)acrylic acid monomer units and having a number average molecular weight of at least 10000 grams/mole; forming an aqueous dispersion (step 203) including a mixture of the nanoparticle dispersion and the polymer dispersion; and concentrating the aqueous dispersion (step 204). Optionally, additional neutralizing agent 231 can be added to the aqueous dispersion. Concentrating the aqueous dispersion can include coating the aqueous dispersion on a substrate; and drying the aqueous dispersion to form a first nanocomposite disposed on the substrate. In some embodiments, the first nanocomposite is an optical coating. FIG. 13 schematically illustrates forming a nanocomposite 210 by concentrating the aqueous dispersion. Alternatively, concentrating the aqueous dispersion can include forming a second aqueous dispersion having a higher concentration of the at least one polymer than the aqueous dispersion. The second aqueous dispersion can be subsequently dried to form a nanocomposite or can be subject to further processing (e.g., melt processing when some water is still present). In some embodiments where the aqueous dispersion is coated and dried to form a first nanocomposite (e.g., nanocomposite 210) disposed on a substrate, the first nanocomposite is subsequently removed from the substrate. For example, the first nanocomposite can be removed from the substrate and then subjected to additional processing (e.g., melt processing to form a second nanocomposite, such as nanocomposite 220). FIG. 14 schematically illustrates melt processing (step 206) the concentrated aqueous dispersion (which may be a first nanocomposite) and an optional additional melt processable material 207, which may be an additional nanocomposite or an additional polymer, to form a nanocomposite 220. Optionally, additional neutralizing agent 233 can be added during melt processing as described further elsewhere herein.

Suitable coating methods include known roll to roll coating methods, for example. Such coating methods include slot die coating, slide coating (including multilayer slide coating), dip coating, and roll coating methods. In some cases, the coating may be applied as a spray.

In some embodiments, the aqueous dispersion further includes at least one additional polymer different than, and/or compositionally distinct from, each polymer in the polymer dispersion. For example, the aqueous dispersion can be formed by mixing the polymer dispersion, the nanoparticle dispersion and a different second polymer dispersion. The second polymer dispersion can include the at least one additional polymer. FIGS. 13-14 schematically illustrate adding an optional additional polymer 205 to the aqueous dispersion. The optional additional polymer 205 can be at least partially neutralized prior to being added to the aqueous dispersion.

The at least one polymer of the polymer dispersion can be as generally described elsewhere for the first and/or second polymers of the aqueous dispersion. In some embodiments, the at least one polymer is at least partially neutralized with one or more nonvolatile neutralizing agents and/or with one or more volatile neutralizing agents. In some embodiments, providing the polymer dispersion includes dispersing the at least one polymer in water, where prior to being dispersed in the water, the at least one polymer includes an at least partially neutralized ionomer. In some embodiments, providing the polymer dispersion includes dispersing the at least one polymer in water, where prior to being dispersed in the water, the at least one polymer includes at least two different at least partially neutralized ionomers. In some embodiments, prior to being dispersed in the water, the at least one polymer includes an at least partially neutralized ionomer which can, in some embodiments, be at least partially neutralized with metal cations and/or nonmetal cations as described further elsewhere herein. For example, the ionomer can be at least partially neutralized by an amine. In some embodiments, the ionomer includes ammonium cations or alkylammonium cations. In some embodiments, the ionomer includes both metal cations and ammonium or alkylammonium cations. In some embodiments, the at least one polymer is further at least partially neutralized with one or more additional neutralizing agents in the aqueous dispersion (e.g., optional additional neutralizing agent 231). The one or more additional neutralizing agents can include at least one volatile neutralizing agent and/or at least one nonvolatile neutralizing agent. In some embodiments, forming the aqueous dispersion includes dispersing first and second polymers in the water, where the first polymer includes an at least partially neutralized ionomer prior to being dispersed in the water and the second polymer includes a neutral copolymer prior to being dispersed in the water.

In some embodiments, the method includes concentrating (with or without fully drying) the aqueous dispersion. In some embodiments, the method includes drying the aqueous dispersion to form a first nanocomposite. In some embodiments, the aqueous dispersion includes one or more volatile neutralizing agents 232, and the concentrating or drying step includes removing the one or more volatile neutralizing agents 232. The aqueous dispersion may include one or more nonvolatile neutralizing agents instead of, or in addition to, the one or more volatile neutralizing agents. The nonvolatile neutralizing agents remain after drying.

In some embodiments, the method further includes melt processing at least the first nanocomposite, or a concentrated but not fully dried aqueous dispersion, to form a second nanocomposite. For example, the melt processing can form a melt which is subsequently cooled (e.g., after being coated on a substrate) to form the second nanocomposite. In some embodiments, the aqueous dispersion includes one or more volatile neutralizing agents, and the melt processing step includes removing the one or more volatile neutralizing agents. For example, the volatile neutralizing agent(s) may not be removed or fully removed when the aqueous dispersion is concentrated and then during melt processing the volatile neutralizing agent(s) are removed. In some embodiments, volatile neutralizing agents are at least partially removed when the aqueous dispersion is concentrated (step 204) and partially removed during melt processing (step 206). Neutralizing agents (e.g., one or more nonvolatile neutralizing agents) can be added to the melt.

In some embodiments, melt processing at least the first nanocomposite, or a first concentrated but not fully dried aqueous dispersion, includes melt processing an additional polymer (or additional polymers) with the first nanocomposite or with the first concentrated aqueous dispersion. For example, the melt processing of at least the first nanocomposite can include extruding a molten blend of the first nanocomposite and the additional polymer. The molten blend can be formed by adding pellets of the additional polymer to the melt of the first nanocomposite or melts of the first nanocomposite and the additional polymer can be blended together, for example.

The additional polymer included in the melt processing can be generally as described for the first polymer. However, the at least one polymer in the aqueous dispersion is generally dispersible in water with or without a neutralizing agent, while the additional polymer included in the melt processing need not be and so the additional polymer can generally be selected from a broader set of polymers than the at least one polymer of the aqueous dispersion. In some embodiments, the additional polymer includes (meth)acrylic acid monomer units (e.g., a first type of monomer unit) and at least one monomer unit (e.g., a second type of monomer unit) selected from the group consisting of ethylene, propylene, alkyl(meth)acrylates, aryl(meth)acrylates, alkaryl (meth)acrylates, acrylonitrile, and carbon monoxide. In some embodiments, the additional polymer includes (meth)acrylic acid monomer units (e.g., a first type of monomer unit) and at least one monomer unit (e.g., a second type of monomer unit) selected from the group consisting of ethylene and propylene. In some such embodiments, the additional polymer further includes at least one monomer unit (e.g., a third type of monomer unit) selected from the group consisting of n-butyl acrylate, isobutyl acrylate, isopropyl acrylate, n-propyl acrylate, ethyl acrylate, methyl acrylate, 2-ethylhexyl acrylate, iso-octyl acrylate and methyl methacrylate. In some embodiments, the additional polymer is not dispersible in water with or without a neutralizing agent.

In some embodiments, the additional polymer(s) added during melt processing are at least partially neutralized. In some embodiments, the polymer(s) added during melt processing are un-neutralized. In some embodiments, additional neutralizing agent 233 (FIG. 14) is added during melt processing. Additional neutralizing agents suitable for addition during melt processing include metal salts of oxides, hydroxides, acetates, and stearates of zinc, magnesium, sodium, lithium, calcium, potassium, and aluminum.

In some embodiments, an additional material (e.g., corresponding to optional additional melt processable material 207 of FIG. 14), such as an additional concentrated aqueous dispersion or an additional nanocomposite, includes the additional polymer. In some embodiments, melt processing at least the first nanocomposite or at least the first concentrated aqueous dispersion includes melt processing an additional material with the first nanocomposite or the first concentrated aqueous dispersion. In some embodiments, melt processing at least the first nanocomposite or at least the first concentrated aqueous dispersion includes extruding a molten blend of the first nanocomposite or the first concentrated aqueous dispersion (that may be dried during melt processing) and the additional material.

In some embodiments, the method further includes forming the additional material (e.g., by repeating steps corresponding to steps 201-204 for the additional material). In some embodiments, forming the additional material includes providing of a second aqueous dispersion including surface-modified metal oxide nanoparticles dispersed in water and at least one polymer dispersed in the water; and concentrating the second aqueous dispersion to form the additional material. In some embodiments, forming the additional material includes providing of a second nanoparticle dispersion including surface-modified metal oxide nanoparticles dispersed in water; providing a second polymer dispersion including at least one polymer dispersed in water; forming a second aqueous dispersion including a mixture of the second nanoparticle dispersion and the second polymer dispersion; and concentrating the second aqueous dispersion to form the additional material. In some embodiments, concentrating the second aqueous dispersion includes drying the second aqueous dispersion so that the additional material is a nanocomposite.

In some embodiments, the aqueous dispersion is concentrated, meaning at least some of the water and/or organic solvent is removed. In some embodiments, the aqueous dispersion is dried, meaning essentially all of the water and/or organic solvent is removed. In some embodiments, a combination of a first concentration step and a drying step is performed, such as concentrating by one method and then drying by a different method. In some embodiments, drying is performed by such suitable methods as evaporative drying, thermal drying, or spray drying. Suitable concentration methods include evaporation methods such as the use of a falling film evaporator or wiped film evaporator, tangential flow filtration, and precipitation with the addition of a precipitant. Such methods as precipitation can be followed by separation methods such as decantation, pressing, filtering, or centrifugation. In some embodiments, concentrating the aqueous dispersion includes at least one of evaporative drying, thermal drying, spray drying, freeze drying, falling film evaporation, wiped film evaporation, tangential flow filtration, or precipitation.

In some embodiments, melt processing is performed by extruders, mixers, kneaders, or compounders. Suitable melt process operations are available from commercial sources such as Leitritz Advanced Technologies Corporation (Somerville, NJ), Krauss-Maffei Bertsdorff (Florence, KY), C.W. Brabender Instruments Incorporated (South Hackensack, NJ), Farrell Corporation (Ansonia, CT), LIST Technology AG (Arisdorf, Switzerland), and Buss USA (Carol Stream, IL).

EXAMPLES

The Examples illustrate nanocomposite compositions of surface-modified metal oxide nanoparticles namely, silica, and (meth)acrylic acid copolymers and their blends.

TABLE 1

Materials

| Material | Description | Supplier |
| --- | --- | --- |
| PRIMACOR 5980i | poly(ethylene-co-acrylic acid) | SK Global Chemical Co. Ltd. (Seoul, South Korea) |
| PRIMACOR 1410 | poly (ethylene-co-acrylic acid) | SK Global Chemical Co. Ltd. |
| NUCREL 699 | poly(ethylene-co-methacrylic acid) | Dow Chemical Co. (Midland, MI) |
| NUCREL 960 | poly (ethylene-co-methacrylic acid) | Dow Chemical Co. |
| SURLYN 1601 | poly(ethylene-co-methacrylic acid) partially neutralized with $Na^+$ ions | Dow Chemical Co. |
| SURLYN 1650 | poly (ethylene-co-methacrylic acid) partially neutralized with $Zn^{++}$ ions | Dow Chemical Co. |
| SURLYN 1706 | poly (ethylene-co-methacrylic acid) partially neutralized with $Zn^{++}$ ions | Dow Chemical Co. |
| SURLYN 1707 | poly(ethylene-co-methacrylic acid) partially neutralized with $Na^+$ ions | Dow Chemical Co. |
| SURLYN 7940 | poly (ethylene-co-methacrylic acid) partially neutralized with $Li^+$ ions | Dow Chemical Co. |
| SURLYN 8150 | poly (ethylene-co-methacrylic acid) partially neutralized with $Na^+$ ions | Dow Chemical Co. |
| SURLYN 9120 | poly (ethylene-co-methacrylic acid) partially neutralized with $Zn^{++}$ ions | Dow Chemical Co. |
| SURLYN PC-350 | poly (ethylene-co-methacrylic acid) partially neutralized with $Na^+$ ions | Dow Chemical Co. |
| SURLYN 9020 | poly (ethylene-co-methacrylic acid-co-isobutyl acrylate) partially neutralized with $Zn^{++}$ ions | Dow Chemical Co. |

TABLE 1-continued

Materials

| Material | Description | Supplier |
|---|---|---|
| HPF 1000 | poly (ethylene-co-methacrylic acid-co-n-butyl acrylate) partially neutralized with $Mg^{++}$ ions | Dow Chemical Co. |
| NaOH | sodium hydroxide | MilliporeSigma Co. (Burlington, MA) |
| KOH | potassium hydroxide | VWR Chemical (Radnor, PA) |
| $NH_4OH$ | ammonium hydroxide solution | MilliporeSigma Co. |
| DMEA | N,N-dimethylethanolamine | Alfa Aesar (Haverhill, MA) |
| MOR | morpholine | Alfa Aesar |
| TEA | triethylamine | Alfa Aesar |
| AMP (95%) | 2-amino-2-methyl-1-propanol | Alfa Aesar |
| MEA | monoaminoethanol | Alfa Aesar |
| T(EtOH)A | triethanolamine | Alfa Aesar |
| ZnO | zinc oxide | Alfa Aesar |
| ZnAc | zinc acetate dihydrate | Alfa Aesar |
| AMINO-TMOS | 3-aminopropyltrimethoxysilane | Gelest, Inc. (Morrisville, PA) |
| DMF | N,N-dimethylformamide | OmniSolv (Billerica, MA) |
| SA | succinic anhydride | Alfa Aesar |
| NALCO 2327 | aqueous colloidal silica nanodispersion | Nalco Co. (Naperville, IL) |
| DI $H_2O$ | deionized water | |

PREPARATIVE EXAMPLES

Preparative Example 1: NaOH Solution 3000 grams of deionized water was placed in a 3.78 liter clear glass jar. A Teflon coated stir bar was added to the jar. The jar was placed on a stir plate (RCT Basic Model Magnetic Stirrer/Hot Plate Combination, IKA Works, Inc., Wilmington, NC) and agitation initiated. 1156 grams of sodium hydroxide (NaOH) pellets was added to the jar. The NaOH pellets dissolved in the water forming a clear solution.

Preparative Example 2: KOH Solution 72 grams of deionized water was placed in a 0.24 liter clear glass jar. A Teflon coated stir bar was added to the jar. The jar was placed on a stir plate and agitation initiated. 28 grams of potassium hydroxide (KOH) chips was added to the jar. The KOH chips dissolved in the water forming a clear solution.

Preparative Example 3: LiOH Solution 90 grams of deionized water was placed in a 0.24 liter clear glass jar. A Teflon coated stir bar was added to the jar. The jar was placed on a stir plate and agitation initiated. 10 grams of lithium hydroxide (LiOH) granules was added to the jar. The LiOH granules dissolved in the water forming a clear solution.

Preparative Example 4: Zinc Neutralizing Agent Solution 10 grams of zinc oxide (ZnO) was placed in a 3.78 liter clear glass jar. A Teflon coated stir bar was added to the jar. 707 grams of deionized water was added to the jar. 394 grams of ammonium hydroxide ($NH_4OH$) solution was added to the jar. The jar was placed on a stir plate and agitation initiated. Agitation was continued overnight resulting in a clear solution.

Preparative Example 5: Acid Silane Solution 225 grams of succinic anhydride (SA) was placed in a 4 liter brown glass jug. A Teflon coated stir bar was added to the jug. The jug was placed on a stir plate. 2500 grams of N,N-dimethylformamide (DMF) was added to the jar and agitation initiated. Once the succinic anhydride dissolved, 400 grams of 3-aminopropyltrimethoxysilane (AMINO-TMOS) was added to the jug. The contents of the jug continued to be agitated for 24 hours at room temperature to complete the reaction to form the acid silane in DMF.

Ionic Elastomer Dispersion

Examples D1, D4-D10

Examples D1, D4-D10 illustrate preparation of ionic elastomer dispersions in an open (atmospheric) reactor. The mass of each component is shown in Table 2. Deionized water was placed in a two liter cylindrical clear glass reactor (Ace Glass, Vineland, NJ). Un-neutralized (meth)acrylic acid elastomer in pellet form was added to the reactor to achieve a 15 weight percent elastomer dispersion. Agitation was initiated at 120 rpm. Neutralizing agent was added to the reactor to achieve 75% neutralization of the (meth) acrylic acid elastomer. Heat was initiated at a set point temperature of 100° C. and the reactor was operated under reflux. Once the batch temperature reached 100° C. the contents of the reactor was maintained under continuous agitation at 100° C. for 2.5 hours. The resulting dispersion was filtered through a 200 μm sock filter (Pall Corp., Port Washington, NY) and transferred to a clear glass jar. The process conditions along with pH of resulting dispersions are detailed in Table 3.

Comparative Examples CE1, CE2

Comparative Examples CE1 and CE2 were processed in the same manner as Example D1 except that a different neutralizing agent was used as detailed in Table 2. Neither CE1 nor CE2 formed a dispersion. The process conditions are detailed in Table 3.

Example D2

Example D2 illustrates preparation of an ionic elastomer dispersion in a closed (pressurized) reactor. The mass of each component is shown in Table 2. Deionized water was placed in a 37.85 liter stainless steel reactor. Un-neutralized (meth)acrylic acid elastomer in pellet form was added to the reactor to achieve a 15 weight percent elastomer dispersion. Agitation was initiated at 30 rpm. Neutralizing agent was added to the reactor to achieve 75% neutralization of the (meth)acrylic acid elastomer. Agitation was increased to 60 rpm. The reactor was sealed to prevent loss of materials. Heat was initiated at a set point temperature of 100° C. Once the batch temperature reached 100° C. the contents of the reactor was maintained under continuous agitation at 100° C. for 2.5 hours. The resulting dispersion was filtered through a 200 μm sock filter (Pall Corp., Port Washington, NY) and transferred to two 18.93 liter plastic lined metal pails. The process conditions along with pH of resulting dispersion is detailed in Table 3.

Example D3

Example D3 illustrates preparation of an ionic elastomer dispersion in a closed (pressurized) reactor. The mass of each component is shown in Table 2. Deionized water was placed in a 265 liter stainless steel reactor. Un-neutralized (meth)acrylic acid elastomer in pellet form was added to the reactor to achieve a 15 weight percent elastomer dispersion. Agitation was initiated. Neutralizing agent was added to the reactor to achieve 75% neutralization of the (meth)acrylic acid elastomer. The reactor was sealed to prevent loss of materials. Heat was initiated at a set point temperature of 100° C. Once the batch temperature reached 100° C. the contents of the reactor was maintained under continuous agitation at 100° C. for 4.5 hours. The resulting dispersion was filtered through a 200 μm sock filter (Pall Corp., Port Washington, NY) and transferred to a 208 liter plastic drum. The process conditions along with pH of resulting dispersion is detailed in Table 3.

Example D11

Example D11 illustrates preparation of an ionic elastomer dispersion in a closed (pressurized) reactor. The mass of each component is shown in Table 2. Deionized water was placed in a 37.85 liter stainless steel reactor. Un-neutralized (meth)acrylic acid copolymer elastomer in pellet form was added to the reactor to achieve a 15 weight percent elastomer dispersion. Agitation was initiated at 60 rpm. Neutralizing agent was added to the reactor to achieve 75% neutralization of the (meth)acrylic acid elastomer. Agitation was increased to 120 rpm. The reactor was sealed to prevent loss of materials. Heat was initiated at a set point temperature of 100° C. Once the batch temperature reached 100° C. the contents of the reactor was maintained under continuous agitation at 100° C. for 2.5 hours. The resulting dispersion was filtered through a 200 μm sock filter (Pall Corp., Port Washington, NY) and transferred to two 18.93 liter plastic lined metal pails. The process conditions along with pH of resulting dispersion is detailed in Table 3.

Example D12

Example D12 illustrates preparation of an ionic elastomer dispersion in a closed (pressurized) reactor. The mass of each component is shown in Table 2. Deionized water was placed in a 37.85 liter stainless steel reactor. Un-neutralized (meth)acrylic acid elastomer in pellet form was added to the reactor to achieve a 15 weight percent elastomer dispersion. Agitation was initiated at 120 rpm. Neutralizing agent was added to the reactor to achieve 75% neutralization of the (meth)acrylic acid elastomer. Heat was initiated at a set point temperature of 150° C. The reactor was sealed to allow processing at higher temperatures and prevent loss of materials. Once the batch temperature reached 150° C. the contents of the reactor was maintained under continuous agitation at 150° C. for 2.5 hours. The resulting dispersion was filtered through a 200 μm sock filter (Pall Corp., Port Washington, NY) and transferred to two 18.93 liter plastic lined metal pails. The process conditions along with pH of resulting dispersion is detailed in Table 3.

TABLE 2

| | | | | | | | Ionic Elastomer Dispersion | | | | | | | | |
|---|---|---|---|---|---|---|---|---|---|---|---|---|---|---|---|
| EX | | D1 | D2 | D3 | D4 | D5 | CE1 | D6 | CE2 | D7 | D8 | D9 | D10 | D11 | D12 |
| ELASTOMER | | | | | | | | | | | | | | | |
| PRIMACOR 5980i | (g) | 225 | 5139 | 28395 | 225 | 225 | 225 | 225 | 225 | 225 | 225 | 225 | 225 | 5107 | |
| NUCREL 960 | (g) | | | | | | | | | | | | | | 5098 |
| WATER | | | | | | | | | | | | | | | | |
| DI H$_2$O | (g) | 1206 | 27578 | 152407 | 1179 | 1160 | 1233 | 1232 | 1203 | 1230 | 1246 | 1226 | 828 | 27669 | 27946 |
| NEUTRALIZING AGENT | | | | | | | | | | | | | | | | |
| NaOH Solution | (g) | 69 | 1528 | 8437 | | | | | | | | | | | 948 |
| KOH Solution | (g) | | | | 96 | | | | | | | | | | |
| LiOH Solution | (g) | | | | | 115 | | | | | | | | | |
| MOR | (g) | | | | | | 42 | | | | | | | | |
| DMEA | (g) | | | | | | | 43 | | | | | | | |
| T(EtOH)A | (g) | | | | | | | | | 72 | | | | | |
| AMP | (g) | | | | | | | | | | | 45 | | | |
| MEA | (g) | | | | | | | | | | | | 29 | | |

TABLE 2-continued

Ionic Elastomer Dispersion

| EX | | D1 | D2 | D3 | D4 | D5 | CE1 | D6 | CE2 | D7 | D8 | D9 | D10 | D11 | D12 |
|---|---|---|---|---|---|---|---|---|---|---|---|---|---|---|---|
| TEA | (g) | | | | | | | | | | | 49 | | | |
| Zn Complex Solution | (g) | | | | | | | | | | | | 447 | | |
| NH$_4$OH Solution | (g) | | | | | | | | | | | | | 1315 | |
| Reactor | | open | closed | closed | open | open | open | open | open | open | open | open | open | closed | closed |
| Reactor Temperature (° C.) | | 100 | 100 | 100 | 100 | 100 | 100 | 100 | 100 | 100 | 100 | 100 | 100 | 100 | 150 |
| Time (hr) | | 2.5 | 2.5 | 4.5 | 2.5 | 2.5 | 2.5 | 2.5 | 2.5 | 2.5 | 2.5 | 2.5 | 2.5 | 2.5 | 2.5 |

TABLE 3

Characterization of Ionic Elastomer Dispersion

| EX | Elastomer | Elastomer (w %) | Acid (w %) | Ion | Neutralization (%) | pH |
|---|---|---|---|---|---|---|
| D1 | PRIMACOR 5980i | 15 | 20.5 | Na$^+$ | 75 | NM[1] |
| D2 | | | | Na$^+$ | | 9.5 |
| D3 | | | | Na$^+$ | | 9.5 |
| D4 | | | | K$^+$ | | 9.5 |
| D5 | | | | Li$^+$ | | 10.0 |
| CE1 | | | | MOR$^+$ | | DND[2] |
| D6 | | | | DMEA$^+$ | | 9.5 |
| CE2 | | | | T(EtOH)A$^+$ | | DND[2] |
| D7 | | | | AMP$^+$ | | 9.5 |
| D8 | | | | MEA$^+$ | | 9.5 |
| D9 | | | | TEA$^+$ | | NM[1] |
| D10 | | | | Zn(NH$_3$)$_4$$^{++}$ | | 10.0 |
| D11 | | | | NH$_4$$^+$ | | 10.5 |
| D12 | NUCREL 960 | 15 | 15 | Na$^+$ | 75 | 10.5 |

[1]NM designates "not measured";
[2]DND designates "did not disperse"

Comparative Examples CE3, CE5, CE6, CE8

Comparative Examples CE3, CE5, CE6, and CE8 illustrate attempts to prepare ionic elastomer dispersions of pre-neutralized (meth)acrylic acid elastomers in an open (atmospheric) reactor. The mass of each component is shown in Table 4. Deionized water was placed in a two liter cylindrical clear glass reactor (Ace Glass, Vineland, NJ). Pre-neutralized (meth)acrylic acid elastomer in pellet form was added to the reactor to achieve a 15 weight percent elastomer dispersion. Agitation was initiated at 120 rpm. Neutralizing agent was added to the reactor. Heat was the initiated at a set point temperature of 100° C. and the reactor was operated under reflux. Once the batch temperature reached 100° C. the contents of the reactor was maintained under continuous agitation at 100° C. for 2.5 hours. None of the Comparative Examples CE3, CE5, CE6, nor CE8 formed a dispersion. The process conditions are detailed in Table 5.

Comparative Examples CE4, CE9

Comparative Examples CE4 and CE9 illustrate attempts to formulate ionic elastomer dispersions of pre-neutralized (meth)acrylic acid elastomers in an open (atmospheric) reactor without further neutralization. The mass of each component is shown in Table 4. Deionized water was placed in a two liter cylindrical clear glass reactor (Ace Glass, Vineland, NJ). Pre-neutralized (meth)acrylic acid elastomer in pellet form was added to the reactor to achieve a 15 weight percent elastomer dispersion. Agitation was initiated at 120 rpm. No additional neutralizing agent was added to the reactor. Heat was initiated to a set point temperature of 100° C. and the reactor was operated under reflux. Once the batch temperature reached 100° C. the contents of the reactor was maintained under continuous agitation at 100° C. for 2.5 hours. Neither CE4 nor CE9 formed a dispersion. The process conditions are detailed in Table 5.

Comparative Example CE7

Comparative Example CE7 illustrates an attempt to prepare an ionic elastomer dispersion in a closed (pressurized) reactor. The mass of each component is shown in Table 4. Deionized water was placed in a 37.85 liter stainless steel reactor. Pre-neutralized (meth)acrylic acid elastomer in pellet form was added to the reactor to achieve a 15 weight percent elastomer dispersion. Agitation was initiated at 30 rpm. Neutralizing agent was added to the reactor. Agitation was increased to 120 rpm. The reactor was sealed to allow processing at higher temperatures and prevent loss of materials. Heat was initiated at a set point temperature of 140° C. Once the batch temperature reached 140° C. the contents of the reactor was maintained under continuous agitation at 140° C. for 2.5 hours. CE7 did not form a dispersion. The process conditions are detailed in Table 5.

TABLE 4

Ionic Elastomer Dispersion

| EX | | CE3 | CE4 | CE5 | CE6 | CE7 | CE8 | CE9 | CE10 |
|---|---|---|---|---|---|---|---|---|---|
| ELASTOMER | | | | | | | | | |
| SURLYN 8150 | (g) | 225 | | | | | | | |
| SURLYN PC-350 | (g) | | 225 | | | | | | |
| SURLYN 9120 | (g) | | | 225 | 225 | 5110 | | | |
| SURLYN 1601 | (g) | | | | | | 225 | | |
| SURLYN 1707 | (g) | | | | | | | 225 | |
| SURLYN 1706 | (g) | | | | | | | | 225 |

TABLE 4-continued

| | | Ionic Elastomer Dispersion | | | | | | | |
|---|---|---|---|---|---|---|---|---|---|
| EX | | CE3 | CE4 | CE5 | CE6 | CE7 | CE8 | CE9 | CE10 |
| | | WATER | | | | | | | |
| DI H$_2$O | (g) | 1222 | 1275 | 1222 | 1242 | 27940 | 1257 | 1275 | 1249 |
| | | NEUTRALIZING AGENT | | | | | | | |
| NaOH Solution | (g) | 53 | | 53 | | | | | |
| DMEA | (g) | | | | 33 | | 17 | | 26 |
| NH$_4$OH Solution | (g) | | | | | 1020 | | | |
| Reactor | | open | open | open | open | closed | open | open | open |
| Reactor Temperature (° C.) | | 100 | 100 | 100 | 100 | 140 | 100 | 100 | 100 |
| Time (hr) | | 2.5 | 2.5 | 2.5 | 2.5 | 2.5 | 2.5 | 2.5 | 2.5 |

TABLE 5

Characterization of Ionic Elastomer Dispersion

| EX | Elastomer | Elastomer (w %) | Acid (w %) | Ion | Neutralization (%) | pH |
|---|---|---|---|---|---|---|
| CE3 | SURLYN 8150 | 15 | 19 | Na$^+$ | 120 | DND[1] |
| CE4 | SURLYN PC-350 | 15 | 15 | Na$^+$ | 55 | DND[1] |
| CE5 | SURLYN 9120 | 15 | 19 | Na$^+$, Zn$^{++}$ | 113 | DND[1] |
| CE6 | | 15 | | DMEA$^+$, Zn$^{++}$ | 113 | DND[1] |
| CE7 | | 15 | | NH$_4^+$, Zn$^{++}$ | 113 | DND[1] |
| CE8 | SURLYN 1601 | 15 | 10 | Na$^+$, DMEA$^+$ | 128 | DND[1] |
| CE9 | SURLYN 1707 | 15 | 15 | Na | 60 | DND[1] |
| CE10 | SURLYN 1706 | 15 | 15 | Zn$^{++}$ | 135 | DND[1] |

[1]DND designates "did not disperse"

Examples D13-D15, D17-D21, D23, D24

Examples D13-D15, D17-D21, D23, and D24 illustrate preparation of ionic elastomer dispersions in an open (atmospheric) reactor. The mass of each component is shown in Table 6. Deionized water was placed in a two liter cylindrical clear glass reactor (Ace Glass, Vineland, NJ). Pre-neutralized (meth)acrylic acid elastomer in pellet form was added to the reactor to achieve a 15 weight percent elastomer dispersion. Agitation was initiated at 120 rpm. Neutralizing agent was added to the reactor. Heat was initiated at a set point temperature of 100° C. and the reactor was operated under reflux. Once the batch temperature reached 100° C. the contents of the reactor was maintained under continuous agitation at 100° C. for 2.5 hours. The resulting dispersion was filtered through a 200 μm sock filter (Pall Corp., Port Washington, NY) and transferred to clear glass jar. The process conditions along with characterization results are detailed in Table 7. The pH of each dispersion was measured. Particle size analysis indicated all dispersions are unimodal with a dispersed phase size less than 100 nm. The dispersions exhibit varying degrees of haze which correlates with dispersed phase size. Similar values of dried weights of unfiltered and filtered dispersions give an indication that the elastomer is fully dispersed.

Example D16

Example D16 illustrates preparation of an ionic elastomer dispersion in an open (atmospheric) reactor. The mass of each component is shown in Table 6. Deionized water was placed in a two liter cylindrical clear glass reactor (Ace Glass, Vineland, NJ). Pre-neutralized (meth)acrylic acid elastomer in pellet form was added to the reactor to achieve a 15 weight percent elastomer dispersion. Agitation was initiated at 120 rpm. No neutralizing agent was added to the reactor. Heat was initiated to a set point temperature of 100° C. and the reactor was operated under reflux. Once the batch temperature reached 100° C. the contents of the reactor was maintained under continuous agitation at 100° C. for 2.5 hours. The resulting dispersion was filtered through a 200 μm sock filter (Pall Corp., Port Washington, NY) and transferred to clear glass jar. The process conditions and characterization results are detailed in Table 7. The pH of the resulting dispersion was 9.5. Particle size analysis indicated a unimodal dispersed phase size of 44.26 nm. The dispersion was turbid with a measured haze of 11.6%. Similar values of dried weights of unfiltered and filtered dispersions give an indication that the elastomer is fully dispersed.

Example D22

Example D22 illustrates preparation of an ionic elastomer dispersion in a closed (pressurized) reactor. The mass of each component is shown in Table 6. Deionized water was placed in a 37.85 liter stainless steel reactor. Pre-neutralized (meth)acrylic acid elastomer in pellet form was added to the reactor to achieve a 15 weight percent elastomer dispersion. Agitation was initiated at 30 rpm. Neutralizing agent was added to the reactor. Agitation was increased to 120 rpm. The reactor was sealed to allow processing at higher temperatures and prevent loss of materials. Heat was initiated to a set point temperature of 150° C. Once the batch temperature reached 150° C. the contents of the reactor was maintained under continuous agitation at 150° C. for 2.5 hours. The resulting dispersion was filtered through a 200 μm sock filter (Pall Corp., Port Washington, NY) and transferred to two 18.93 liter plastic lined metal pails. The process conditions along characterization results are detailed in Table 7. The pH of the resulting dispersion was 11.5. Particle size analysis indicated a bimodal dispersion of sizes of 23.25 nm and 140.5 nm. The dispersion was milky white with a measured haze of 81.6%. Similar values of dried weights of unfiltered and filtered dispersions give an indication that the elastomer is fully dispersed.

TABLE 6

Ionic Elastomer Dispersion

| EX | | D13 | D14 | D15 | D16 | D17 | D18 | D19 | D20 | D21 | D22 | D23 | D24 |
|---|---|---|---|---|---|---|---|---|---|---|---|---|---|
| ELASTOMER | | | | | | | | | | | | | |
| SURLYN 8150 | (g) | 225 | 225 | 225 | 225 | | | | | | | | |
| SURLYN PC-350 | (g) | | | | | 225 | 225 | 225 | 225 | | | | |
| SURLYN 7940 | (g) | | | | | | | | | 225 | | | |
| SURLYN 9120 | (g) | | | | | | | | | | 5110 | | |
| SURLYN 1707 | (g) | | | | | | | | | | | 225 | 225 |
| WATER | | | | | | | | | | | | | |
| DI H$_2$O | (g) | 1264 | 1242 | 1271 | 1275 | 1255 | 1247 | 1248 | 1264 | 1249 | 27760 | 1248 | 1264 |
| NEUTRALIZING AGENT | | | | | | | | | | | | | |
| NaOH Solution | (g) | 11 | | | | 20 | | | | | 1210 | | |
| KOH Solution | (g) | | | | | | 27 | | | | | | |
| DMEA | (g) | | 33 | 13 | | | | 26 | 10 | 26 | | 26 | 10 |
| Reactor | | open | open | open | open | open | open | open | open | open | closed | open | open |
| Reactor Temperature (° C.) | | 100 | 100 | 100 | 100 | 100 | 100 | 100 | 100 | 100 | 150 | 100 | 100 |
| Time (hr) | | 2.5 | 2.5 | 2.5 | 2.5 | 2.5 | 2.5 | 2.5 | 2.5 | 2.5 | 2.5 | 2.5 | 2.5 |

TABLE 7

Characterization of Ionic Elastomer Dispersion

| EX | Elastomer | Elastomer (w %) | Acid (w %) | Ion | Neutralization (%) | pH | unfiltered (w%) | filtered (w%) | Particle Size[2] (nm) | H (%) |
|---|---|---|---|---|---|---|---|---|---|---|
| D13 | SURLYN 8150 | 15 | 19 | Na$^+$ | 60 | 10.0 | 15.55 | 15.61 | NM[2] | 6.4 |
| D14 | | 15 | | Na$^+$, DMEA$^+$ | 118 | 10.5 | 15.46 | 15.45 | 21.86 | 3.1 |
| D15 | | 15 | | Na$^+$, DMEA$^+$ | 75 | 10.0 | 15.40 | 15.48 | 28.22 | 2.9 |
| D16 | | 15 | | Na$^+$ | 45 | 9.5 | 15.77 | 15.66 | 44.26 | 11.6 |
| D17 | SURLYN PC-350 | 15 | 15 | Na$^+$ | 90 | 11.5 | 16.04 | 16.02 | 50.24 | 9.3 |
| D18 | | 15 | | Na$^+$, K$^+$ | 90 | 11.0 | 15.85 | 15.86 | 33.49 | 6.5 |
| D19 | | 15 | | Na$^+$, DMEA$^+$ | 128 | 10.5 | 15.31 | 15.40 | 44.12 | 8.4 |
| D20 | | 15 | | Na$^+$, DMEA$^+$ | 85 | 10.0 | 15.33 | 15.37 | 73.84 | 45.0 |
| D21 | SURLYN 7940 | 15 | 15 | Li$^+$, DMEA$^+$ | 115 | 10.5 | 15.87 | 15.75 | 170.7 | 99.3 |
| D22 | SURLYN 9120 | 15 | 19 | Na$^+$, Zn$^{++}$ | 113 | 11.5 | 15.59 | 15.65 | 23.25  140.5 (13.8)  (86.2) | 81.6 |
| D23 | SURLYN 1707 | 15 | 15 | Na$^+$, DMEA$^+$ | 128 | 10.5 | 15.95 | 15.69 | 45.78 | 6.8 |
| D24 | | 15 | | Na$^+$, DMEA$^+$ | 90 | 10.0 | 15.37 | 15.30 | 92.06 | 40.3 |

[1]Number in parentheses is percentage of particle size population; designates "not measured"
[2]designates "not measured"

Ionic Elastomer Blend Dispersion

Comparative Examples CE11, CE12

Comparative Examples CE11 and CE12 illustrate attempts to prepare ionic elastomer blend dispersions in a closed (pressurized) reactor. The mass of each component is shown in Table 8. Deionized water was placed in a 37.85 liter stainless steel reactor. Two pre-neutralized (meth)acrylic acid elastomers in pellet form were added to the reactor to achieve a 15 weight percent elastomer dispersion. Agitation was initiated at 30 rpm. Neutralizing agent was added to the reactor. Agitation was increased to 120 rpm. The reactor was sealed to allow processing at higher temperatures and prevent loss of materials. Heat was initiated to a set point temperature of 140° C. Once the batch temperature reached 140° C. the contents of the reactor was maintained under continuous agitation at 140° C. for 2.5 hours. Neither CE11 nor CE12 formed a dispersion. The process conditions are detailed in Table 9.

Comparative Example CE13

Comparative Example CE13 illustrates an attempt to prepare an ionic elastomer blend dispersion in an open (atmospheric) reactor. The mass of each component is shown in Table 8. Deionized water was placed in a two liter cylindrical clear glass reactor (Ace Glass, Vineland, NJ). Two pre-neutralized (meth)acrylic acid elastomers in pellet form were added to the reactor to achieve a 15 weight percent elastomer dispersion. Agitation was initiated at 120 rpm. Neutralizing agent was added to the reactor. Heat was initiated at a set point temperature of 100° C. and the reactor was operated under reflux. Once the batch temperature reached 100° C. the contents of the reactor was maintained under continuous agitation at 100° C. for 2.5 hours. CE13 did not formed a dispersion. The process conditions are detailed in Table 9.

Comparative Example CE14

Comparative Example CE14 illustrates an attempt to prepare an ionic elastomer blend dispersion in a closed (pressurized) reactor. The mass of each component is shown in Table 8. Deionized water was placed in a 37.85 liter stainless steel reactor. One pre-neutralized (meth)acrylic acid elastomer and one un-neutralized (meth)acrylic acid elastomer, both in pellet form, were added to the reactor to achieve a 15 weight percent elastomer dispersion. Agitation was initiated at 30 rpm. Neutralizing agent was added to the reactor. Agitation was increased to 120 rpm. The reactor was sealed to allow processing at higher temperatures and prevent loss of materials. Heat was initiated to a set point temperature of 135° C. Once the batch temperature reached 135° C. the contents of the reactor was maintained under continuous agitation at 135° C. for 2.5 hours. CE14 did not formed a dispersion. The process conditions are detailed in Table 9.

Comparative Examples CE15, CE16

Comparative Examples CE15 and CE16 illustrate attempts to formulate ionic elastomer blend dispersions in an open (atmospheric) reactor. The mass of each component is shown in Table 8. Deionized water was placed in a two liter cylindrical clear glass reactor (Ace Glass, Vineland, NJ). Two un-neutralized (meth)acrylic acid elastomers in pellet form were added to the reactor to achieve a 15 weight percent elastomer dispersion. Agitation was initiated at 120 rpm. Neutralizing agent was added to the reactor. Heat was initiated at a set point temperature of 100° C. and the reactor was operated under reflux. Once the batch temperature reached 100° C. the contents of the reactor was maintained under continuous agitation at 100° C. for 2.5 hours. Neither CE15 nor CE16 formed a dispersion. The process conditions are detailed in Table 9.

TABLE 8

Ionic Elastomer Blend Dispersion

| EX | | CE11 | CE12 | CE13 | CE14 | CE15 | CE16 |
|---|---|---|---|---|---|---|---|
| ELASTOMER | | | | | | | |
| SURLYN9120 | (g) | 4600 | 4600 | | | | |
| SURLYN8150 | (g) | | | 112 | | | |
| SURLYN PC-350 | (g) | | | 112 | | | |
| SURLYN 1707 | (g) | | | | 4600 | | |
| SURLYN 1706 | (g) | 630 | | | | | |
| SURLYN 9020 | (g) | | 630 | | | | |
| PRIMACOR 5980i | (g) | | | | | 99 | 99 |
| NUCREL 960 | (g) | | | | 630 | 126 | 126 |
| WATER | | | | | | | |
| DI H$_2$O | (g) | 27710 | 27760 | 1264 | 27940 | 1221 | 1241 |
| NEUTRALIZING AGENT | | | | | | | |
| NaOH Solution | (g) | 1180 | 1150 | | 950 | 54 | |
| DMEA | (g) | | | 11 | | | 33 |
| Reactor | | closed | closed | open | closed | open | open |
| Reactor Temperature (° C.) | | 140 | 140 | 100 | 135 | 100 | 100 |
| Time (hr) | | 2.5 | 2.5 | 2.5 | 2.5 | 2.5 | 2.5 |

TABLE 9

Ionic Elastomer Blend Dispersion

| EX | Elastomer Blend[1] | Elastomer (w %) | Blend (w %) | Acid (w %) | Δ[1] (w %) | Ion | Neutral- ization (%) | pH |
|---|---|---|---|---|---|---|---|---|
| CE11 | SURLYN 9120 | 15 | 90 | 19 | 4 | Na$^+$, Zn$^{++}$ | 113 | DNP[2] |
| | SURLYN 1706 | | 10 | 15 | | | | |
| CE12 | SURLYN 9120 | 15 | 90 | 19 | 9 | Na$^+$, Zn$^{++}$ | 114 | DNP[2] |
| | SURLYN 9020 | | 10 | 10 | | | | |
| CE13 | SURLYN 8150 | 15 | 50 | 19 | 4 | Na$^+$, DMEA$^+$ | 77 | DNP[2] |
| | SURLYN PC-3 50 | | 50 | 15 | | | | |
| CE14 | NUCREL 960 | 15 | 10 | 15 | 0 | Na$^+$ | 126 | DNP[2] |
| | SURLYN 1707 | | 90 | 15 | | | | |
| CE15 | PRIMACOR 5980i | 15 | 44 | 20.5 | 5.5 | Na$^+$ | 75 | DNP[2] |
| | NUCREL 960 | | 56 | 15 | | | | |
| CE16 | PRIMACOR 5980i | 15 | 44 | 20.5 | 5.5 | Na$^+$, DMEA$^+$ | 74 | DNP[2] |
| | NUCREL 960 | | 56 | 15 | | | | |

[1]Δ designates difference in acid content of polymers of blend;

[2]DNP designates "did not disperse"

Example D25

Example D25 illustrates preparation of an ionic elastomer blend dispersion in an open (atmospheric) reactor. The mass of each component is shown in Table 10. Deionized water was placed in a two liter cylindrical clear glass reactor (Ace Glass, Vineland, NJ). Two un-neutralized (meth)acrylic acid elastomers, both in pellet form, were added to the reactor to achieve a 15 weight percent elastomer dispersion. Agitation was initiated at 120 rpm. Two neutralizing agents were added to the reactor. Heat was initiated at a set point temperature of 100° C. and the reactor was operated under reflux. Once the batch temperature reached 100° C. the contents of the reactor was maintained under continuous agitation at 100° C. for 2.5 hours. The resulting dispersion was filtered through a 200 μm sock filter (Pall Corp., Port Washington, NY) and transferred to clear glass jar. The process conditions along with characterization results are given in Table 11. The pH of the resulting dispersion was 10.5. Particle size analysis indicated a bimodal dispersion sizes of 47.09 and 5350 nm with the smaller size representing 99.1% of the result. The dispersion was turbid with a measured haze of 22.6%. Similar values of dried weights of unfiltered and filtered dispersions give an indication that the two elastomers are fully dispersed.

Examples D26, D27

Examples D26 and D27 illustrate preparation of ionic elastomer blend dispersions in a closed (pressurized) reactor. The mass of each component is shown in Table 10. Deionized water was placed in a 37.85 liter stainless steel reactor. One pre-neutralized (meth)acrylic acid elastomer and one un-neutralized (meth)acrylic acid elastomer, both in pellet form, were added to the reactor to achieve a 15 weight percent elastomer dispersion. Agitation was initiated at 30 rpm. Neutralizing agent was added to the reactor. Agitation was increased to 120 rpm. The reactor was sealed to allow processing at higher temperatures and prevent loss of materials. Heat was initiated at a set point temperature of 150° C. Once the batch temperature reached 150° C. the contents of the reactor was maintained under continuous agitation at 150° C. for 2.5 hours. The resulting dispersion was filtered through a 200 μm sock filter (Pall Corp., Port Washington, NY) and transferred to two 18.93 liter plastic lined metal pails. The process conditions along characterization results are detailed in Table 11. The pH of the resulting dispersions were 10.5 and 11.0 for D26 and D27, respectively. Particle size analysis indicated a bimodal dispersion for both Examples D26 and D27 with similar dispersed phase sizes. Both dispersions were milky white with a measured haze of 61.2% and 48.0%, for D26 and D27, respectively. Similar values of dried weights of unfiltered and filtered dispersions give an indication that the two elastomers are fully dispersed.

Example D28

Example D28 illustrates preparation of an ionic elastomer blend dispersion in a closed (pressurized) reactor. The mass of each component is shown in Table 10. Deionized water was placed in a 37.85 liter stainless steel reactor. One pre-neutralized (meth)acrylic acid elastomer and one un-neutralized (meth)acrylic acid elastomer, both in pellet form, were added to the reactor to achieve a 15 weight percent elastomer dispersion. Agitation was initiated at 30 rpm. Neutralizing agent was added to the reactor. Agitation was increased to 120 rpm. The reactor was sealed to allow processing at higher temperatures and prevent loss of materials. Heat was initiated at a set point temperature of 150° C. Once the batch temperature reached 150° C. the contents of the reactor was maintained under continuous agitation at 150° C. for 2.5 hours. The resulting dispersion was filtered through a 200 μm sock filter (Pall Corp., Port Washington, NY) and transferred to two 18.93 liter plastic lined metal pails. The process conditions along characterization results are detailed in Table 11. The pH of the resulting dispersion was 11.5. Particle size analysis indicated a bimodal distribution of dispersed phase sizes of 12.26 and 194.0 nm. The dispersion was milky white with a measured haze of 88.10%. Similar values of dried weights of unfiltered and filtered dispersions give an indication that the two elastomers are fully dispersed.

Example D29

Example D29 illustrates preparation of an ionic elastomer blend dispersion in a closed (pressurized) reactor. The mass of each component is shown in Table 10. Deionized water was placed in a 37.85 liter stainless steel reactor. One pre-neutralized (meth)acrylic acid elastomer and one un-neutralized (meth)acrylic acid elastomer, both in pellet form, were added to the reactor to achieve a 15 weight percent elastomer dispersion. Agitation was initiated at 30 rpm. Neutralizing agent was added to the reactor. Agitation was increased to 120 rpm. The reactor was sealed to allow processing at higher temperatures and prevent loss of materials. Heat was initiated at a set point temperature of 140° C. Once the batch temperature reached 140° C. the contents of the reactor was maintained under continuous agitation at 140° C. for 2.5 hours. The resulting dispersion was filtered through a 200 μm sock filter (Pall Corp., Port Washington, NY) and transferred to two 18.93 liter plastic lined metal pails. The process conditions along characterization results are detailed in Table 11. The pH of the resulting dispersion was 11.5. Particle size analysis indicated a bimodal distribution of dispersed phase sizes of 26.21 and 290.0 nm. The dispersion was milky white with a measured haze of 70.2%. Similar values of dried weights of unfiltered and filtered dispersions give an indication that the two elastomers are fully dispersed.

Examples D30-D33

Examples D30-D33 illustrate preparation of ionic elastomer blend dispersions in an open (atmospheric) reactor. The mass of each component is shown in Table 10. Deionized water was placed in a two liter cylindrical clear glass reactor (Ace Glass, Vineland, NJ). Two pre-neutralized (meth)acrylic acid elastomers, both in pellet form, were added to the reactor to achieve a 15 weight percent elastomer dispersion. Agitation was initiated at 120 rpm. Neutralizing agent was added to the reactor. Heat was initiated at a set point temperature of 100° C. and the reactor was operated under reflux. Once the batch temperature reached 100° C. the contents of the reactor was maintained under continuous agitation at 100° C. for 2.5 hours. The resulting dispersion was filtered through a 200 μm sock filter (Pall Corp., Port Washington, NY) and transferred to clear glass jar. The process conditions along with characterization results are given in Table 11. The pH of the resulting dispersions ranged from 10.0-11.0. Particle size analysis indicated that Examples D30, D31, and D32 exhibited a unimodal dispersed size and Example D33 exhibited a bimodal distribution. The dispersions exhibited varying degrees of turbidity which correlated with the haze provided in Table 11. Haze was significantly lower for dispersions with unimodal dispersed phase relative to bimodal. Similar values of dried weights of unfiltered and filtered dispersions give an indication that the two elastomers are fully dispersed.

Example D34

Example D34 illustrates preparation of an ionic elastomer blend dispersion in an open (atmospheric) reactor. The mass of each component is shown in Table 10. Deionized water was placed in a two liter cylindrical clear glass reactor (Ace Glass, Vineland, NJ). One pre-neutralized (meth)acrylic acid elastomer and one un-neutralized(meth)acrylic acid elastomer, both in pellet form, were added to the reactor to achieve a 15 weight percent elastomer dispersion. Agitation was initiated at 120 rpm. Neutralizing agent was added to the reactor. Heat was initiated at a set point temperature of 100° C. and the reactor was operated under reflux. Once the batch temperature reached 100° C. the contents of the reactor was maintained under continuous agitation at 100° C. for 2.5 hours. The resulting dispersion was filtered through a 200 μm sock filter (Pall Corp., Port Washington, NY) and transferred to clear glass jar. The process conditions along with characterization results are detailed in Table 11. The pH of the resulting dispersion was 10.0. Particle size analysis indicated a unimodal dispersed phase size of 30.29 nm. The dispersion was turbid with a haze of 7.2%. Similar values of dried weights of unfiltered and filtered dispersions give an indication that the two elastomers are fully dispersed.

Example D35

Example D35 illustrates preparation of an ionic elastomer blend dispersion in an open (atmospheric) reactor. The mass of each component is shown in Table 10. Deionized water was placed in a two liter cylindrical clear glass reactor (Ace Glass, Vineland, NJ). Two pre-neutralized (meth)acrylic acid elastomers, both in pellet form, were added to the reactor to achieve a 15 weight percent elastomer dispersion. Agitation was initiated at 120 rpm. Neutralizing agent was added to the reactor. Heat was initiated at a set point temperature of 100° C. and the reactor was operated under reflux. Once the batch temperature reached 100° C. the contents of the reactor was maintained under continuous agitation at 100° C. for 2.5 hours. The resulting dispersion was filtered through a 200 μm sock filter (Pall Corp., Port Washington, NY) and transferred to clear glass jar. The process conditions along with characterization results are detailed in Table 11. The pH of the resulting dispersion was 10.5. Particle size analysis indicated a unimodal dispersed phase size of 44.30 nm. The dispersion was turbid with a haze of 9.9%. Similar values of dried weights of unfiltered and filtered dispersions give an indication that the two elastomers are fully dispersed.

Example D36

Example D36 illustrates preparation of an ionic elastomer blend dispersion in an open (atmospheric) reactor. The mass of each component is shown in Table 10. Deionized water was placed in a two liter cylindrical clear glass reactor (Ace Glass, Vineland, NJ). Two pre-neutralized (meth)acrylic acid elastomers, both in pellet form, were added to the reactor to achieve a 15 weight percent elastomer dispersion. Agitation was initiated at 120 rpm. Neutralizing agent was added to the reactor. Heat was initiated at a set point temperature of 100° C. and the reactor was operated under reflux. Once the batch temperature reached 100° C. the contents of the reactor was maintained under continuous agitation at 100° C. for 2.5 hours. The resulting dispersion was filtered through a 200 μm sock filter (Pall Corp., Port Washington, NY) and transferred to clear glass jar. The process conditions along with characterization results are detailed in Table 11. The pH of the resulting dispersion was 10.5. Particle size analysis indicated a bimodal dispersed phase size of 99.35 nm and 5037 nm. The dispersion was turbid with a haze of 43.8%. Similar values of dried weights of unfiltered and filtered dispersions give an indication that the two elastomers are fully dispersed.

TABLE 10

Ionic Elastomer Blend Dispersion

| Ex | | D25 | D26 | D27 | D28 | D29 | D30 | D31 | D32 | D33 | D34 | D35 | D36 |
|---|---|---|---|---|---|---|---|---|---|---|---|---|---|
| ELASTOMER | | | | | | | | | | | | | |
| SURLYN 9120 | (g) | | 2900 | 2900 | 4600 | 4600 | | | | | | | |
| SURLYN 8150 | (g) | | | | | | 112 | 112 | 112 | 112 | 112 | | |
| SURLYN PC-350 | (g) | | | | | | 112 | 112 | 112 | 112 | | 112 | 112 |
| SURLYN 1707 | (g) | | | | | | | | | | | 112 | 112 |
| PRIMACOR 5980i | (g) | 99 | 2270 | 2270 | 520 | | | | | | 112 | | |
| NUCREL 960 | (g) | 126 | | | | 520 | | | | | | | |
| WATER | | | | | | | | | | | | | |
| DI H$_2$O | (g) | 1198 | 27580 | 27580 | 27670 | 27710 | 1249 | 1239 | 1245 | 1259 | 1237 | 1249 | 1264 |
| NEUTRALIZING AGENT | | | | | | | | | | | | | |
| NaOH Solution | (g) | 43 | 1530 | 1530 | 1240 | 1180 | 26 | | | | | | |
| KOH Solution | (g) | | | | | | | 36 | | | | | |
| DMEA | (g) | 33 | | | | | | | 30 | 16 | 38 | 26 | 11 |
| Reactor | | open | closed | closed | closed | closed | open | open | open | open | open | open | open |
| Reactor Temperature (° C.) | | 100 | 150 | 150 | 150 | 140 | 100 | 100 | 100 | 100 | 100 | 100 | 100 |
| Time (hr) | | 2.5 | 2.5 | 2.5 | 2.5 | 2.5 | 2.5 | 2.5 | 2.5 | 2.5 | 2.5 | 2.5 | 2.5 |

TABLE 11

Ionic Elastomer Blend Dispersion

| EX | Elastomer Blend[1] | Elastomer (w %) | Blend (w %) | Acid (w %) | Δ[1] (w %) | Ion | Neutralization (%) | Dispersion Appearance |
|---|---|---|---|---|---|---|---|---|
| D25 | PRIMACOR 5980i<br>NUCREL 960 | 15 | 44<br>56 | 20.5<br>15 | 5.5 | Na$^+$, DMEA$^+$ | 134 | hazy |
| D26 | PRIMACOR 5980i<br>SURLYN 9120 | 15 | 44<br>56 | 20.5<br>19 | 1.9 | Na$^+$, Zn$^{++}$ | 102 | milky white |
| D27 | PRIMACOR 5980i<br>SURLYN 9120 | 15 | 44<br>56 | 20.5<br>19 | 1.5 | Na$^+$, Zn$^{++}$ | 102 | milky white |
| D28 | PRIMACOR 5980i<br>SURLYN 9120 | 15 | 10<br>90 | 20.5<br>19 | 1.5 | Na$^+$, Zn$^{++}$ | 108 | milky white |
| D29 | NUCREL 960<br>SURLYN 9120 | 15 | 10<br>90 | 15<br>19 | 4 | Na$^+$, Zn$^{++}$ | 111 | milky white |
| D30 | SURLYN 8150<br>SURLYN PC-350 | 15 | 50<br>50 | 19<br>15 | 4 | Na$^+$ | 90 | turbid |
| D31 | SURLYN 8150<br>SURLYN PC-350 | 15 | 50<br>50 | 19<br>15 | 4 | Na$^+$, K$^+$ | 90 | turbid |
| D32 | SURLYN 8150<br>SURLYN PC-350 | 15 | 50<br>50 | 19<br>15 | 4 | Na$^+$, DMEA$^+$ | 125 | hazy |
| D33 | SURLYN 8150<br>SURLYN PC-350 | 15 | 50<br>50 | 19<br>15 | 4 | Na$^+$, DMEA$^+$ | 90 | turbid |
| D34 | PRIMACOR 5980i<br>SURLYN 8150 | 15 | 50<br>50 | 20.5<br>19 | 1.5 | Na$^+$, DMEA$^+$ | 101 | hazy |
| D35 | SURLYN PC-350<br>SURLYN 1707 | 15 | 50<br>50 | 15<br>15 | 0 | Na$^+$, DMEA$^+$ | 132 | hazy |
| D36 | SURLYN PC-350<br>SURLYN 1707 | 15 | 50<br>50 | 15<br>15 | 0 | Na$^+$, DMEA$^+$ | 90 | turbid |

[1]Δ designates difference in acid content of polymers of blend

TABLE 12

Characterization of Ionic Elastomer Blend Dispersion

| EX | Elastomer Blend | Elastomer (w %) | Blend (w %) | Acid (w %) | Δ[1] (w %) | Ion | Neutralization (%) | pH | unfiltered (w %) | filtered (w %) | Particle Size[2] (nm) | H (%) |
|---|---|---|---|---|---|---|---|---|---|---|---|---|
| D25 | PRIMACOR 5980i<br>NUCREL 960 | 15 | 44<br>56 | 20.5<br>15 | 5.5 | Na$^+$, DMEA | 134 | 10.5 | 16.23 | 16.22 | 47.06 5,350<br>(99.1) (0.9) | 22.6 |
| D26 | PRIMACOR 5980i<br>SURLYN 9120 | 15 | 44<br>56 | 20.5<br>19 | 1.9 | Na$^+$, Zn$^{++}$ | 102 | 11.0 | 15.77 | 15.83 | 24.75 150.8<br>(21.9) (78.1) | 61.2 |
| D27 | PRIMACOR 5980i<br>SURLYN 9120 | 15 | 44<br>56 | 20.5<br>19 | 1.5 | Na$^+$, Zn$^{++}$ | 102 | 10.5 | 15.81 | 15.87 | 23.47 148.6<br>(24.5) (75.5) | 48.0 |
| D28 | PRIMACOR 5980i<br>SURLYN 9120 | 15 | 10<br>90 | 20.5<br>19 | 1.5 | Na$^+$, Zn$^{++}$ | 108 | 11.5 | 15.53 | 15.47 | 12.26 194.0<br>(2.2) (97.8) | 88.1 |
| D29 | NUCREL 960<br>SURLYN 9120 | 15 | 10<br>90 | 15<br>19 | 4 | Na$^+$, Zn$^{++}$ | 111 | 11.5 | 15.60 | 15.59 | 26.21 290.0<br>(13.9) (86.1) | 70.2 |
| D30 | SURLYN PC-350<br>SURLYN 8150 | 15 | 50<br>50 | 15<br>19 | 4 | Na$^+$ | 90 | 11.0 | 15.69 | 15.67 | 50.65 | 10.1 |
| D31 | SURLYN PC-350<br>SURLYN 8150 | 15 | 50<br>50 | 15<br>19 | 4 | Na$^+$, K$^+$ | 90 | 11.0 | 15.78 | 15.82 | 34.07 | 6.4 |
| D32 | SURLYN PC-350<br>SURLYN 8150 | 15 | 50<br>50 | 15<br>19 | 4 | Na$^+$, DMEA | 125 | 10.5 | 15.56 | 15.61 | 49.00 | 16.4 |
| D33 | SURLYN PC-350<br>SURLYN 8150 | 15 | 50<br>50 | 15<br>19 | 4 | Na$^+$, DMEA | 90 | 10.5 | 15.37 | 15.31 | 25.11 121.0<br>(3.8) (96.2) | 55.7 |
| D34 | PRIMACOR 5980i<br>SURLYN 8150 | 15 | 50<br>50 | 20.5<br>19 | 1.5 | Na$^+$, DMEA | 101 | 10.0 | 15.82 | 15.84 | 30.29 | 7.2 |
| D35 | SURLYN PC-350<br>SURLYN 1707 | 15 | 50<br>50 | 15<br>15 | 0 | Na$^+$, DMEA | 132 | 10.5 | 15.47 | 15.53 | 44.30 | 9.9 |
| D36 | SURLYN PC-350<br>SURLYN 1707 | 15 | 50<br>50 | 15<br>15 | 0 | Na$^+$, DMEA | 90 | 10.5 | 15.63 | 15.51 | 99.35 5,037<br>(99.0) (1.0) | 43.8 |

[1]Δ designattes difference in acid content of polymers of blend;
[2]Number is parentheses is percentage of particle size population

Examples D37-D40

Examples D37-D40 illustrate preparation of ionic elastomer blend dispersions by mixing two (meth)acrylic acid elastomer dispersions. 100 grams of two dispersions shown in Table 13 were mixed for 20 minutes on a stir plate at room temperature to form the ionic elastomer blend dispersion. Characterization results are shown in Tables 14 and 15. Table 14 shows all four dispersions were milky white which is consistent with one or both unblended dispersions. The pH of the resulting dispersions ranged from 10.5 to 11.0. Particle size analysis indicated blend dispersions with either unimodal or bimodal dispersed phase size. The milky white appearance of the blend dispersions correlates with the high haze ranging from 67.8 to 99.2%. Similar values of dried weights of unfiltered and filtered dispersions give an indication that the two elastomers are fully dispersed.

TABLE 13

Ionic Elastomer Blend Dispersion

| EX | SURLYN 9120 Dispersion D22 (g) | SURLYN 7940 Dispersion D21 (g) | SURLYN 8150 Dispersion D16 (g) | SURLYN PC-350 Dispersion D20 (g) | SURLYN 1707 Dispersion D24 (g) |
|---|---|---|---|---|---|
| D37 | 100 | 100 | | | |
| D38 | 100 | | 100 | | |
| D39 | | 100 | | 100 | |
| D40 | 100 | | | | 100 |

TABLE 14

Ionic Elastomer Blend Dispersion

| EX | Elastomer Blend | Elastomer (w %) | Blend (w %) | Acid (w %) | Δ[1] (w %) | Ion | Neutralization (%) | Reactor | Temp (° C.) | Dispersion Appearance |
|---|---|---|---|---|---|---|---|---|---|---|
| D37 | SURLYN 9120 | 15 | 50 | 19 | 4 | $Na^+$, $Li^+$, $Zn^{++}$ | 133 | n/a | 25 | milky white |
| | SURLYN 7940 | | 50 | 15 | | | | | | |
| D38 | SURLYN 9120 | 15 | 50 | 19 | 0 | $Na^+$, $Zn^{++}$ | 98 | n/a | 25 | milky white |
| | SURLYN 8150 | | 50 | 19 | | | | | | |
| D39 | SURLYN PC-350 | 15 | 50 | 15 | 0 | $Na^+$, $Li^+$ | 100 | n/a | 25 | milky white |
| | SURLYN 7940 | | 50 | 15 | | | | | | |
| D40 | SURLYN 9120 | 15 | 50 | 19 | 4 | $Na^+$, $Zn^{++}$ | 120 | n/a | 25 | milky white |
| | SURLYN 1707 | | 50 | 15 | | | | | | |

[1]Δ designates difference in acid content of polymers of blend

TABLE 15

Characterization of Ionic Elastomer Blend Dispersion

| EX | Elastomer Blend | Elastomer (w %) | Blend (w %) | Ion | Neutralization (%) | pH | unfiltered (w %) | filtered (w %) | Particle Size[1] (nm) | H (%) |
|---|---|---|---|---|---|---|---|---|---|---|
| D37 | SURLYN 9120 | 15 | 50 | $Na^+$, $Li^+$, $Zn^{++}$, | 133 | 10.5 | 15.68 | 15.69 | 206.2 | 99.2 |
| | SURLYN 7940 | | 50 | DMEA | | | | | | |
| D38 | SURLYN 9120 | 15 | 50 | $Na^+$, $Zn^{++}$ | 98 | 11.0 | 15.62 | 15.66 | 68.66  3,921 | 67.8 |
| | SURLYN 8150 | | 50 | | | | | | (97.3)  (2.7) | |
| D39 | SURLYN PC-350 | 15 | 50 | $Na^+$, $Li^+$ | 100 | 10.5 | 15.55 | 15.48 | 167.0 | 99.2 |
| | SURLYN 7940 | | 50 | DMEA | | | | | | |
| D40 | SURLYN 9120 | 15 | 50 | $Na^+$, $Zn^+$, | 120 | 10.5 | 15.54 | 15.47 | 102.5  4,979 | 74.8 |
| | SURLYN 1707 | | 50 | DMEA | | | | | (99.6)  (0.4) | |

[1]Number is parenthesis is percentage of particle size population

Ionic Elastomer Coating

Examples C1-C12

Examples C1-C12 illustrate formulation of transparent ionic elastomer coatings. Each dispersion was coated onto an unprimed PET substrate film in a continuous roll-to-roll process where the dispersion was metered through a slot die onto a moving web. The ionic elastomer dispersion was metered by a metering pump and a mass flow meter. Volumetric flowrate for each coating formulation is given in Table 16. The volatile components of the coating formulation (i.e. ionic elastomer dispersion) were removed in a three zone air floatation oven. The temperatures of each zone were 65.6° C., 79.4° C., and 135° C., respectively, from entrance to exit of the oven with each oven section nominally 3.05 m in length. Table 17 shows characterization results including coating thickness of 10 micrometers nominally, and visible transmission of greater than 93% and haze less than 1%. It is noted that that the optical characterization includes the PET substrate as well as the coating. The 75 μm PET substrate for all coating examples (C1-C78) had a transmission of 91.9%, Haze of 00.65%, and Clarity of 99.9%.

TABLE 16

Ionic Elastomer Coating

| Material | Elastomer (w %) | EX | | C1 | C2 | C3 | C4 | C5 | C6 | C7 | C8 | C9 | C10 | C11 | C12 |
|---|---|---|---|---|---|---|---|---|---|---|---|---|---|---|---|
| ELASTOMER DISPERSION | | | | | | | | | | | | | | | |
| SURLYN 9120 | 15 | D22 | (g) | 750 | | | | | | | | | | | |
| SURLYN 8150 | 15 | D14 | (g) | | 750 | | | | | | | | | | |
| | 15 | D15 | (g) | | | 750 | | | | | | | | | |
| | 15 | D13 | (g) | | | | 750 | | | | | | | | |
| | 15 | D16 | (g) | | | | | 750 | | | | | | | |
| SURLYN PC-350 | 15 | D18 | (g) | | | | | | 750 | | | | | | |
| | 15 | D17 | (g) | | | | | | | 750 | | | | | |
| | 15 | D19 | (g) | | | | | | | | 750 | | | | |
| | 15 | D20 | (g) | | | | | | | | | 750 | | | |
| SURLYN 1707 | 15 | D23 | (g) | | | | | | | | | | 750 | | |
| | 15 | D24 | (g) | | | | | | | | | | | 750 | |
| SURLYN 7940 | 15 | D21 | (g) | | | | | | | | | | | | 750 |
| Flowrate (cc/min) | | | | 77.8 | 69.6 | 75.8 | 80.1 | 80.7 | 79.4 | 78.9 | 71.1 | 76.2 | 70.6 | 75.5 | 70.0 |

TABLE 17

Characterization of Ionic Elastomer Coating

| EX | Elastomer | Acid (w %) | Ion | Neutralization (%) | Thickness (μm) | T (%) | H (%) | C (%) |
|---|---|---|---|---|---|---|---|---|
| C1 | SURLYN 9120 | 19 | Na$^+$, Zn$^{++}$ | 113 | 10.4 | 93.0 | 0.82 | 99.9 |
| C2 | SURLYN 8150 | 19 | Na$^+$ | 118 | 9.4 | 93.2 | 0.52 | 99.9 |
| C3 | | | | 75 | 11.2 | 93.0 | 0.51 | 99.9 |
| C4 | | | | 60 | 10.6 | 93.3 | 0.57 | 99.9 |
| C5 | | | | 45 | 10.3 | 93.2 | 0.81 | 99.7 |
| C6 | SURLYN PC-350 | 15 | Na$^+$, K$^+$ | 90 | 11.3 | 93.1 | 0.53 | 99.8 |
| C7 | | | Na$^+$ | 90 | 11.0 | 93.0 | 0.60 | 99.9 |
| C8 | | | | 128 | 9.7 | 93.1 | 0.54 | 99.9 |
| C9 | | | | 85 | 10.0 | 93.1 | 0.58 | 99.8 |
| C10 | SURLYN 1707 | 15 | Na$^+$ | 128 | 9.6 | 93.0 | 0.54 | 99.9 |
| C11 | | | | 90 | 10.4 | 93.0 | 0.75 | 97.1 |
| C12 | SURLYN 7940 | 15 | Li$^+$ | 115 | 9.3 | 93.0 | 0.82 | 99.9 |

Examples C13-C22

Examples C13-C22 further illustrate formulation of transparent Ionic elastomer coatings. Examples C13-C22 were coated in the same manner as Examples C1-C12. Table 17A shows characterization results including coating thickness of 10 μm nominally, and visible transmission of greater than 93% and haze less than 100. It is noted that that the optical characterization includes the PET substrate as well as the coating.

TABLE 17A

Ionic Elastomer Coating

| Material | Elastomer (w %) | EX | | C13 | C14 | C15 | C16 | C17 | C18 | C19 | C20 | C21 | C22 |
|---|---|---|---|---|---|---|---|---|---|---|---|---|---|
| | | | | ELASTOMER DISPERSION | | | | | | | | | |
| PRIMACOR 5980i | 15 | D11 | (g) | 750 | | | | | | | | | |
| | 15 | D11 | (g) | | 565 | | | | | | | | |
| | 15 | D1 | (2) | | | 485 | | | | | | | |
| | 15 | D4 | (g) | | | | 414 | | | | | | |
| | 15 | D5 | (g) | | | | | 389 | | | | | |
| | 15 | D7 | (g) | | | | | | 443 | | | | |
| | 15 | D9 | (g) | | | | | | | 593 | | | |
| | 15 | DS | (g) | | | | | | | | 597 | | |
| | 15 | D9 | (g) | | | | | | | | | 616 | |
| NUCREL 960 | 15 | D12 | (g) | | | | | | | | | | 750 |
| Flowrate (cc/min) | | | | 77.1 | 69.1 | 76.2 | 77.0 | 78.5 | 66.4 | 63.5 | 70.9 | 62.7 | 76.4 |

TABLE 18

Characterization of Ionic Elastomer Coating

| EX | Elastomer | Acid (w %) | Ion | Neutralization (%) | Thickness (um) | T (%) | H (%) | C (%) |
|---|---|---|---|---|---|---|---|---|
| C13 | PRIMACOR 5980i | 20.5 | $NH_4^+$ | 75 | 9.5 | 93.1 | 0.60 | 99.9 |
| C14 | | | $Zn(NH_3)_4^{++}$ | | 9.2 | 93.4 | 0.56 | 99.9 |
| C15 | | | $Na^+$ | | 10.0 | 93.1 | 0.51 | 99.8 |
| C16 | | | $K^+$ | | 10.6 | 93.1 | 0.59 | 99.9 |
| C17 | | | Li+ | | 10.9 | 93.1 | 0.66 | 99.8 |
| C18 | | | $DMEA^+$ | | 8.6 | 93.1 | 0.88 | 99.8 |
| C19 | | | $AMP^+$ | | 8.4 | 93.0 | 0.68 | 99.8 |
| C20 | | | $MEA^+$ | | 9.5 | 93.0 | 0.73 | 99.8 |
| C21 | | | $TEA^+$ | | 8.3 | 92.9 | 0.64 | 99.8 |
| C22 | SURLYN 1707 | 15 | $Na^+$ | 175 | 11.3 | 93.1 | 0.55 | 99.8 |

Ionic Elastomer Blend Coating

Examples C23-C30

Examples C23-C30 illustrate formulation of transparent ionic elastomer blend coatings. Examples C23-C30 were coated in the same manner as Examples C1-C12. Table 21 shows characterization results including coating thickness of 10 μm nominally, and visible transmission of greater than 93% and haze less than 1% except for Example C28. It is noted that that the optical characterization includes the PET substrate as well as the coating.

TABLE 19

Ionic Elastomer Blend Coating

| Material | Elastomer (w %) | Blend (w %) | EX | | C23 | C24 | C25 | C26 | C27 | C28 | C29 | C30 |
|---|---|---|---|---|---|---|---|---|---|---|---|---|
| | | | ELASTOMER DISPERSION | | | | | | | | | |
| PRIMACOR 5980i | 15 | 44 | D25 | (g) | 750 | | | | | | | |
| NUCREL 960 | | 56 | | | | | | | | | | |
| SURLYN 8150 | 15 | 50 | D31 | (g) | | 750 | | | | | | |
| SURLYN PC-350 | | 50 | | | | | | | | | | |
| SURLYN 8150 | 15 | 50 | D30 | (g) | | | 750 | | | | | |
| SURLYN PC-350 | | 50 | | | | | | | | | | |
| SURLYN 8150 | 15 | 50 | D32 | (g) | | | | 750 | | | | |
| SURLYN PC-350 | | 50 | | | | | | | | | | |
| SURLYN 8150 | 15 | 50 | D33 | (g) | | | | | 750 | | | |
| SURLYN PC-350 | | 50 | | | | | | | | | | |
| SURLYN 9120 | 15 | | D22 | (g) | | | | | | 390 | 390 | 390 |
| SURLYN 1707 | 15 | | D24 | (g) | | | | | | 390 | | |
| SURLYN PC-350 | 15 | | D20 | (g) | | | | | | | 390 | |
| SURLYN 7940 | 15 | | D27 | (g) | | | | | | | | 390 |
| Flowrate (cc/min) | | | | | 66.2 | 78.1 | 78.9 | 70.3 | 74.6 | 76.4 | 76.4 | 73.4 |

TABLE 20

Ionic Elastomer Blend Coating

| Material | Elastomer (w %) | Blend (w %) | EX | | C31 | C32 | C33 | C34 | C35 | C36 | C37 | C38 |
|---|---|---|---|---|---|---|---|---|---|---|---|---|
| | | | ELASTOMER BLEND DISPERSION | | | | | | | | | |
| PRIMACOR 5980i | 15 | 50 | D42 | (g) | 750 | | | | | | | |
| SURLYN 8150 | | 50 | | | | | | | | | | |
| PRIMACOR 5980i | 15 | 10 | D36 | (g) | | 750 | | | | | | |
| SURLYN 9120 | | 90 | | | | | | | | | | |
| PRIMACOR 5980i | 15 | 44 | D35 | (g) | | | 750 | | | | | |
| SURLYN 9120 | | 56 | | | | | | | | | | |
| SURLYN PC-350 | 15 | 50 | D43 | (g) | | | | 750 | | | | |
| SURLYN 1707 | | 50 | | | | | | | | | | |
| SURLYN PC-350 | 15 | 50 | D44 | (g) | | | | | 750 | | | |
| SURLYN 1707 | | 50 | | | | | | | | | | |
| SURLYN PC-350 | 15 | 50 | D29 | (g) | | | | | | 750 | | |
| SURLYN 1707 | | 50 | | | | | | | | | | |
| SURLYN 9120 | 15 | | D22 | (g) | | | | | | | 390 | |
| SURLYN 8150 | 15 | | D19 | (g) | | | | | | | 390 | |
| SURLYN PC-350 | 15 | | D24 | (g) | | | | | | | | 390 |
| SURLYN 7940 | 15 | | D27 | (g) | | | | | | | | 390 |
| Flowrate (cc/min) | | | | | 67.9 | 77.6 | 77.4 | 71.1 | 75.3 | 77.7 | 78.9 | 73.4 |

TABLE 21

Characterization of Ionic Elastomer Blend Coating

| EX | Elastomer Blend | Blend (w %) | Acid (w %) | $\Delta^1$ (%) | Ion | Neutral-ization (%) | Thick-ness (um) | T (%) | H (%) | C (%) |
|---|---|---|---|---|---|---|---|---|---|---|
| C23 | PRIMACOR 5980i | 44 | 20.5 | 5.5 | Na$^+$ | 75 | 9.1 | 93.3 | 0.58 | 99.9 |
| | NUCREL 960 | 56 | 15 | | | | | | | |
| C24 | SURLYN8150 | 50 | 19 | 4 | Na$^+$, K$^+$ | 90 | 10.9 | 93.1 | 0.58 | 99.8 |
| | SURLYN PC-350 | 50 | 15 | | | | | | | |
| C25 | SURLYN8150 | 50 | 19 | 4 | Na$^+$ | 90 | 11.2 | 93.3 | 0.54 | 99.9 |
| | SURLYN PC-350 | 50 | 15 | | | | | | | |
| C26 | SURLYN 8150 | 50 | 19 | 4 | Na$^+$ | 125 | 9.3 | 93.2 | 0.55 | 99.9 |
| | SURLYN PC-350 | 50 | 15 | | | | | | | |
| C27 | SURLYN 8150 | 50 | 19 | 4 | Na$^+$ | 90 | 9.6 | 93.3 | 0.54 | 99.8 |
| | SURLYN PC-350 | 50 | 15 | | | | | | | |
| C28 | SURLYN 1707 | 50 | 15 | 4 | Na$^+$, Zn$^{++}$ | 100 | 9.0 | 93.3 | 1.67 | 97.7 |
| | SURLYN 9120 | 50 | 19 | | | | | | | |

TABLE 21-continued

Characterization of Ionic Elastomer Blend Coating

| EX | Elastomer Blend | Blend (w %) | Acid (w %) | Δ[1] (%) | Ion | Neutralization (%) | Thickness (um) | T (%) | H (%) | C (%) |
|---|---|---|---|---|---|---|---|---|---|---|
| C29 | SURLYN PC-350<br>SURLYN 9120 | 50<br>50 | 15<br>19 | 4 | Na$^+$, Zn$^{++}$ | 98 | 9.8 | 93.2 | 0.62 | 99.4 |
| C30 | SURLYN 7940<br>SURLYN 9120 | 50<br>50 | 15<br>19 | 4 | Na$^+$, Li$^+$, Zn$^{++}$ | 113 | 9.7 | 93.2 | 0.72 | 99.8 |
| C31 | PRIMACOR 5980i<br>SURLYN 8150 | 50<br>50 | 20.5<br>19 | 1.5 | Na$^+$ | 101 | 9.0 | 93.2 | 0.55 | 99.9 |
| C32 | PRIMACOR 5980i<br>SURLYN 9120 | 10<br>90 | 20.5<br>19 | 1.5 | Na$^+$, Zn$^{++}$ | 108 | 10.2 | 93.2 | 0.75 | 99.8 |
| C33 | PRIMACOR 5980i<br>SURLYN 9120 | 44<br>56 | 20.5<br>19 | 1.5 | Na$^+$, Zn$^{++}$ | 102 | 10.8 | 93.4 | 0.54 | 99.9 |
| C34 | SURLYN PC-350<br>SURLYN 1707 | 50<br>50 | 15<br>15 | 0 | Na$^+$ | 132 | 9.4 | 93.1 | 0.54 | 99.9 |
| C35 | SURLYN PC-350<br>SURLYN 1707 | 50<br>50 | 15<br>15 | 0 | Na$^+$ | 90 | 10.4 | 93.2 | 0.86 | 97.2 |
| C36 | NUCREL 960<br>SURLYN 9120 | 10<br>90 | 15<br>15 | 0 | Na$^+$, Zn$^{++}$ | 111 | 10.3 | 93.0 | 0.74 | 99.9 |
| C37 | SURLYN 8150<br>SURLYN 9120 | 50<br>50 | 19<br>19 | 0 | Na$^+$, Zn$^{++}$ | 78 | 10.0 | 93.1 | 0.71 | 99.8 |
| C38 | SURLYN PC-350<br>SURLYN 7940 | 50<br>50 | 15<br>15 | 0 | Na$^+$, Li$^+$ | 100 | 9.3 | 93.2 | 0.83 | 98.7 |

[1] Δ designates difference in acid content of polymers of blend

Nanoparticle Dispersion

Example D41

Example D41 illustrates preparation of a silica nanoparticle dispersion where the nanoparticle surface is modified with a carboxylic acid functionality. The carboxylic acid functionality is pursued to establish compatibility between the nanoparticle and (meth)acrylic acid elastomer. 400 grams of aqueous colloidal silica dispersion (NALCO 2327) was placed in a 0.95 liter clear glass jar. A Teflon coated sir bar was added to the jar. The jar was placed on a stir plate and agitation initiated. 317.5 grams of deionized water was added to the jar. 132.5 grams of ACID SILANE SOLUTION (PREPARATIVE EXAMPLE 5) was added to the jar. The contents of the jar were mixed for 20 minutes. The stir bar was removed from the jar and the contents placed in a preheated 80° C. oven for 24 hours. After 24 hours, the jar was removed from the oven and the nanoparticle dispersion allowed to cool to room temperature under ambient conditions. The pH of the nanoparticle dispersion was 5.5 and the nanoparticle concentration was calculated to be 19.3 w %.

Example D42

Example D42 illustrates preparation of a silica nanoparticle dispersion where the nanoparticle surface is modified with a carboxylic acid functionality. The carboxylic acid functionality is pursued to establish compatibility between the nanoparticle and (meth)acrylic acid elastomer. 49.33 kilograms of aqueous colloidal silica dispersion (NALCO 2327) was placed in a 75.71 liter stainless steel reactor. Agitation was initiated. 15.58 kilograms of ACID SILANE SOLUTION (PREPARATIVE EXAMPLE 5) was added to the reactor. The contents of the reactor were heated to 80° C. Upon reaching 80° C., the reactor was sealed, and the contents of the reactor maintained at 80° C. with continuous agitation for 24 hours. After 24 hours, the contents of the reactor were cooled and filtered with a 50 μm filter and transferred to two 18.93 liter plastic lined metal drums. The pH of the nanoparticle dispersion was 5.5 and the nanoparticle concentration was calculated to be 31.3 w %.

TABLE 22

Nanoparticle Dispersion

| EX | NALCO 2327 (g) | DI H$_2$O (g) | ACID SILANE Solution (g) | SiO$_2$ (w %) | pH |
|---|---|---|---|---|---|
| D41 | 400 | 318 | 133 | 19.3 | 5.5 |
| D42 | 49328 | — | 15581 | 31.3 | 5.5 |

Example D43

To increase the pH of the silica nanoparticle dispersion of D42, ammonium hydroxide solution was added. 3000 grams of nanoparticle dispersion D42 was placed in a 3.78 liter clear glass jar. A Teflon coated stir bar was added to the jar. The jar was placed on a stir plate and agitation initiated. 71.2 grams of aqueous ammonium hydroxide solution, nominally 28 w %, was added to the nanoparticle dispersion. The contents of the jar were mixed for 20 minutes and then the stir bar was removed from the jar. The pH of the nanoparticle dispersion was 10.0 and the nanoparticle concentration was calculated to be 30.6 w %.

TABLE 23

Nanoparticle Dispersion

| EX | SiO$_2$ Dispersion D42 (g) | NH$_4$OH Solution (g) | SiO$_2$ (w %) | PH |
|---|---|---|---|---|
| D43 | 3000 | 71.2 | 30.6 | 10.0 |

Ionic Elastomer Nanocomposite Coating

Examples C39-C48

Examples C39-C48 illustrate preparation of transparent ionic elastomer nanocomposite coatings. The mass of each dispersion used in each coating formulation is detailed in Table 24. For each coating, a mass of ionic elastomer dispersion was placed in a clear glass jar. A Teflon coated stir bar was added to the jar. The jar was placed on a stir plate and agitation initiated. The desired mass of nanoparticle dispersion was added to the ionic elastomer dispersion. The ionomer/nanoparticle dispersion was mixed for 20 minutes.

Each ionomer/nanoparticle dispersion was coated onto an unprimed PET substrate film in the same manner as Examples C1-C12. Table 25 shows characterization results including coating thickness of 10 μm nominally, and visible transmission of greater than 93% and haze less than 1% with exception of Example C44 which contains 60 w % nanoparticles. Examples C39-C43 illustrate minimal effect of nanoparticle concentration on coating optics from 10 to 50 w % nanoparticles. Examples C39-C48 further illustrate good optical performance for a variety of ionic elastomer with high nanoparticle loadings, 40 w %. It is noted that that the optical characterization includes the PET substrate as well as the coating.

TABLE 24

Ionic Elastomer Nanocomposite Coating

| Material | SiO$_2$ (w %) | Elastomer (w %) | EX | | C39 | C40 | C41 | C42 | C43 | C44 | C45 | C46 | C47 | C48 |
|---|---|---|---|---|---|---|---|---|---|---|---|---|---|---|
| ELASTOMER DISPERSION |
| SURLYN 9120 | | 15 | D22 | (g) | 711 | 668 | 620 | 565 | 503 | 432 | 1319 | | | |
| SURLYN 8150 | | 15 | D18 | (g) | | | | | | | | 1319 | | |
| SURLYN 1707 | | 15 | D24 | (g) | | | | | | | | | 1319 | |
| SURLYN 7940 | | 15 | D21 | (g) | | | | | | | | | | 1319 |
| NANOPARTICLE DISPERSION |
| SiO$_2$ | 30.6 | | D51 | (g) | 39 | 82 | 130 | 185 | 247 | 318 | 431 | 431 | 431 | 431 |
| | Flowrate (cc/min) | | | | 77.0 | 76.0 | 75.0 | 73.8 | 72.4 | 70.9 | 73.8 | 81.1 | 80.5 | 80.7 |

TABLE 25

Characterization of Ionic Elastomer Nanocomposite Coating

| EX | Elastomer | SiO$_2$ (w %) | Acid (w %) | Ion | Neutralization (%) | Thickness (um) | T (%) | H (%) | C (%) |
|---|---|---|---|---|---|---|---|---|---|
| C39 | SURLYN 9120 | 10 | 19 | Na$^+$, Zn$^{++}$ | 113 | 10.7 | 92.8 | 0.77 | 99.9 |
| C40 | | 20 | | Na$^+$, Zn$^{++}$ | 113 | 10.0 | 92.7 | 0.63 | 99.9 |
| C41 | | 30 | | Na$^+$, Zn$^{++}$ | 113 | 10.1 | 92.9 | 0.60 | 99.9 |
| C42 | | 40 | | Na$^+$, Zn$^{++}$ | 113 | 10.0 | 92.8 | 0.54 | 99.9 |
| C43 | | 50 | | Na$^+$, Zn$^{++}$ | 113 | 10.1 | 92.7 | 0.65 | 99.9 |
| C44 | | 60 | | Na$^+$, Zn$^{++}$ | 113 | 10.3 | 93.0 | 1.09 | 99.8 |
| C45 | | 40 | | Na$^+$, Zn$^{++}$ | 113 | 9.0 | 93.0 | 0.66 | 99.9 |
| C46 | SURLYN 8150 | 40 | 19 | Na$^+$ | 45 | 10.0 | 93.0 | 0.59 | 99.9 |
| C47 | SURLYN 1707 | 40 | 15 | Na$^+$ | 60 | 10.0 | 92.9 | 0.70 | 98.9 |
| C48 | SURLYN 7940 | 40 | 15 | Li$^+$ | 40 | 10.6 | 92.9 | 0.66 | 99.8 |

Examples C49-C59

Examples C49-C59 further illustrate preparation of transparent ionic elastomer nanocomposite coatings. The ionomer/nanoparticle coating formulations were prepared in the same manner as described in Examples C39-C48. Each ionomer/nanoparticle dispersion was coated onto an unprimed PET substrate film in the same manner as Examples C1-C12. Formulation and coating details are given in Table 26. Table 27 shows characterization results including coating thickness of 10 μm nominally, and visible transmission of greater than 92-93% and haze less than 1%. Examples C49-C59 illustrate minimal effect of nanoparticle concentration on coating optics from 10 to 60 w % nanoparticles. Examples C39-C48 further illustrate good optical performance for a variety of ionic elastomers with high nanoparticle loadings, 40 w %. Example C58 was intentionally coated with a volatile neutralizing agent that would be removed during the coating process by vaporization. It is noted that that the optical characterization includes the PET substrate as well as the coating.

TABLE 26

Ionic Elastomer Nanocomposite Coating

| Material | $SiO_2$ (w %) | Elastomer (w %) | EX | | C49 | C50 | C51 | C52 | C53 | C54 | C55 | C56 | C57 | C58 | C59 |
|---|---|---|---|---|---|---|---|---|---|---|---|---|---|---|---|
| ELASTOMER DISPERSION ||||||||||||||||
| PRIMACOR 5980i | | 15 | D3 | (g) | 711 | 668 | 620 | 565 | 503 | 432 | | | 1319 | | |
| | | 15 | D11 | (g) | | | | | | | | | | 1319 | |
| | | 15 | D2 | (g) | | | | | | | 494 | 494 | | | |
| NUCREL 960 | | 15 | D12 | (g) | | | | | | | | | | | 1319 |
| NANOPARTICLE DISPERSION ||||||||||||||||
| $SiO_2$ | 30.6 | | D51 | (g) | 39 | 82 | 130 | 185 | 247 | 318 | | | 431 | 369 | 431 |
| | 19.3 | | D49 | (g) | | | | | | | 256 | 256 | | | |
| | Flowrate (cc/min) | | | | 76.2 | 75.4 | 74.4 | 73.2 | 72.0 | 70.6 | 75.2 | 75.2 | 73.2 | 80.5 | 79.6 |

TABLE 27

Characterization of Ionic Elastomer Nanocomposite Coating

| EX | Elastomer | $SiO_2$ (w %) | Acid (w %) | Ion | Neutralization (%) | Thickness (um) | T (%) | H (%) | C (%) |
|---|---|---|---|---|---|---|---|---|---|
| C49 | PRIMACOR 5980i | 10 | 20.5 | $Na^+$ | 75 | 10.1 | 92.8 | 0.60 | 99.8 |
| C50 | | 20 | | $Na^+$ | 75 | 10.3 | 92.9 | 0.61 | 99.9 |
| C51 | | 30 | | $Na^+$ | 75 | 10.1 | 92.7 | 0.63 | 99.8 |
| C52 | | 40 | | $Na^+$ | 75 | 10.4 | 92.9 | 0.64 | 99.8 |
| C53 | | 50 | | $Na^+$ | 75 | 10.3 | 92.7 | 0.77 | 99.7 |
| C54 | | 60 | | $Na^+$ | 75 | 10.2 | 92.9 | 0.90 | 99.9 |
| C55 | | 40 | | $Na^+$ | 75 | 5.7 | 91.3 | 0.52 | 99.9 |
| C56 | | 40 | | $Na^+$ | 75 | 9.6 | 93.2 | 0.57 | 99.7 |
| C57 | | 40 | | $Na^+$ | 75 | 10.4 | 92.9 | 0.54 | 99.9 |
| C58 | | 40 | | | 0 | 10.0 | 93.2 | 1.92 | 99.9 |
| C59 | NUCREL 960 | 40 | 15 | $Na^+$ | 75 | 10.2 | 92.7 | 0.54 | 99.9 |

Ionic Elastomer Nanocomposite Blend Coating

Examples C60-C68

Examples C60-C68 illustrate preparation of transparent ionic elastomer nanocomposite blend coatings. Formulation and coating details are given in Table 29. Preparation of the ionomer blend dispersions for Examples C63-C66 is described in Examples D52-D54 and Table 29. For each coating, a mass of ionic elastomer blend dispersion was placed in a clear glass jar. A Teflon coated stir bar was added to the jar. The jar was placed on a stir plate and agitation initiated. The desired mass of nanoparticle dispersion was added to the ionic elastomer blend dispersion. The ionomer/nanoparticle dispersion was mixed for 20 minutes. Each ionomer blend/nanoparticle dispersion was coated onto an unprimed PET substrate film in the same manner as Examples C1-C12. Table 32 shows characterization results including coating thickness of 10 μm nominally, and visible transmission of greater than 92-93% and haze less than 1% for nanocomposite coatings with up to 40 w % nanoparticles. It is noted that that the optical characterization includes the PET substrate as well as the coating.

bining Dispersions D22 and D24. Likewise, the ionic elastomer blend D53 was formed by mixing Dispersions D22 and D27, and D54 was formed by combining D24 and D19 as detailed in Table 30.

TABLE 30

| | Ionic Elastomer Blend Dispersion | | | |
|---|---|---|---|---|
| EX | SURLYN 9120 Dispersion D22 (g) | SURLYN 1707 Dispersion D24 (g) | SURLYN 7940 Dispersion D27 (g) | SURLYN 8150 Dispersion D19 (g) |
| D52 | 300 | 300 | | |
| D53 | 300 | | 300 | |
| D54 | | 300 | | 300 |

Examples C69-C78

Examples C69-C78 further illustrate preparation of ionic elastomer nanocomposite blend coatings. Formulation and coating details are given in Table 31. Each ionomer blend/

TABLE 29

Ionic Elastomer Nanocomposite Blend Coating

| Material | SiO₂ (w %) | Elastomer (w %) | Blend (w %) | EX | | C60 | C61 | C62 | C63 | C64 | C65 | C66 | C67 | C68 |
|---|---|---|---|---|---|---|---|---|---|---|---|---|---|---|
| | | | | ELASTOMER BLEND DISPERSION | | | | | | | | | | |
| SURLYN 9120 | | 15 | 50 | D52 | (g) | 565 | | | | | | | | |
| SURLYN 1707 | | | 50 | | | | | | | | | | | |
| SURLYN 9120 | | 15 | 50 | D53 | (g) | | 565 | | | | | | | |
| SURLYN 7940 | | | 50 | | | | | | | | | | | |
| SURLYN 9120 | | 15 | 50 | D54 | (g) | | | 565 | | | | | | |
| SURLYN 8150 | | | 50 | | | | | | | | | | | |
| SURLYN 9120 | | 15 | | D22 | (g) | | | | 1131 | | 660 | | | |
| SURLYN 8150 | | 15 | | D16 | (g) | | | | 1131 | 660 | | | | |
| PRIMACOR 5980i | | 15 | | D3 | (g) | | | | | 660 | | | | |
| NUCREL 960 | | 15 | | D12 | (g) | | | | | | 660 | | | |
| SURLYN PC-350 | | 15 | 50 | D35 | (g) | | | | | | | 1319 | | |
| SURLYN 1707 | | | 50 | | | | | | | | | | | |
| SURLYN PC-350 | | 15 | 50 | D32 | (g) | | | | | | | | 1319 | |
| SURLYN 8150 | | | 50 | | | | | | | | | | | |
| NUCREL 960 | | 15 | 10 | D29 | (g) | | | | | | | | | 1319 |
| SURLYN 9120 | | | 90 | | | | | | | | | | | |
| | | | | NANOPARTICLE DISPERSION | | | | | | | | | | |
| SiO₂ | 30.6 | | | D51 | (g) | 185 | 185 | 185 | 739 | 431 | 431 | 431 | 431 | 431 |
| | Flowrate (cc/min) | | | | | 74.3 | 74.3 | 74.8 | 74.8 | 81.6 | 80.6 | 82.7 | 83.3 | 81.0 |

Examples D52-D54

Examples D52-D54 illustrate preparation of ionic elastomer blend dispersions for use in ionic elastomer nanocomposite coatings C60-C62. 300 grams of Example D22 was placed in a 0.95 liter clear glass jar. A Teflon coated stir bar was added to the jar. The jar was placed on a stir plate and agitation initiated. 300 grams of D24 ionic elastomer dispersion was added to D22 to form the ionic elastomer blend dispersion D52. D52 was mixed for 20 minutes after combining Dispersions D22 and D24. Likewise, the ionic elastomer blend D53 was formed by mixing Dispersions D22 and D27, and D54 was formed by combining D24 and D19 as detailed in Table 30.

nanocomposite dispersion was prepared in the same manner as Examples C60-C68. Each ionomer blend/nanoparticle dispersion was coated onto an unprimed PET substrate film in the same manner as Examples C1-C12. Table 32 shows characterization results for Examples C69-C78 including coating thickness of 10 m nominally, and visible transmission of greater than 92-93% and haze less than 1% for nanocomposite coatings with up to 40 w % nanoparticles. It is noted that that the optical characterization includes the PET substrate as well as the coating.

TABLE 31

Ionic Elastomer Nanocomposite Blend Coating

| material | SiO₂ (w %) | Elastomer (w %) | Blend (w %) | EX | | C69 | C70 | C71 | C72 | C73 | C74 | C75 | C76 | C77 | C78 |
|---|---|---|---|---|---|---|---|---|---|---|---|---|---|---|---|
| ELASTOMER BLEND DISPERSION | | | | | | | | | | | | | | | |
| PRIMACOR 5980i | | 15 | 44 | D34 | (g) | 690 | 628 | 563 | 494 | 494 | 494 | 565 | 2261 | | |
| SURLYN 9120 | | | 56 | D35 | (g) | | | | | | | | | 1319 | |
| PRIMACOR 5980i | | 15 | 10 | D36 | (g) | | | | | | | | | | 1319 |
| SURLYN 9120 | | | 90 | | | | | | | | | | | | |
| NANOPARTICLE DISPERSION | | | | | | | | | | | | | | | |
| SiO₂ | 19.3 | | | D41 | (g) | 60 | 122 | 187 | 256 | 256 | 256 | | | | |
| | 30.6 | | | D43 | (g) | | | | | | | 185 | 739 | 431 | 431 |
| | Flowrate (cc/min) | | | | | 79.1 | 78.0 | 76.9 | 75.5 | 75.5 | 75.5 | 72.6 | 72.6 | 79.9 | 80.5 |

TABLE 32

Characterization of Ionic Elastomer Nanocomposite Blend Coating

| EX | Blend | SiO₂ (w %) | Blend (w %) | Acid (w %) | Δ¹ (w %) | Ion | Neutralization (%) | Thickness (um) | T (%) | H (%) | C (%) |
|---|---|---|---|---|---|---|---|---|---|---|---|
| C60 | SURLYN 9120 | 40 | 30 | 19 | 4 | Na⁺, Zn⁺⁺ | 87 | 10.3 | 92.9 | 0.74 | 98.8 |
| | SURLYN 1707 | | 30 | 15 | | | | | | | |
| C61 | SURLYN 9120 | 40 | 30 | 19 | 4 | Na⁺, Li⁺, Zn⁺⁺ | 77 | 10.2 | 92.9 | 0.94 | 99.8 |
| | SURLYN 7940 | | 30 | 15 | | | | | | | |
| C62 | SURLYN 9120 | 40 | 30 | 19 | 0 | Na⁺, Zn⁺⁺ | 79 | 9.8 | 92.8 | 0.61 | 99.9 |
| | SURLYN 8150 | | 30 | 19 | | | | | | | |
| C63 | SURLYN 9120 | 40 | 30 | 19 | 4 | Na⁺, Zn⁺⁺ | 79 | 9.0 | 93.2 | 0.64 | 99.9 |
| | SURLYN 8150 | | 30 | 15 | | | | | | | |
| C64 | SURLYN 8150 | 40 | 30 | 19 | 1.5 | Na⁺ | 60 | 10.3 | 92.8 | 0.57 | 99.9 |
| | PRIMACOR 5980i | | 30 | 20.5 | | | | | | | |
| C65 | SURLYN 9120 | 40 | 30 | 19 | 4 | Na⁺, Zn⁺⁺ | 94 | 10.0 | 93.1 | 0.54 | 99.9 |
| | NUCREL 960 | | 30 | 15 | | | | | | | |
| C66 | SURLYN PC-350 | 40 | 30 | 15 | 0 | Na⁺ | 57 | 10.6 | 93.2 | 0.52 | 99.9 |
| | SURLYN 1707 | | 30 | 15 | | | | | | | |
| C67 | SURLYN PC-350 | 40 | 30 | 15 | 4 | Na⁺ | 50 | 10.6 | 93.0 | 0.54 | 99.9 |
| | SURLYN 8150 | | 30 | 19 | | | | | | | |
| C68 | NUCREL 960 | 40 | 6 | 15 | 4 | Na⁺, Zn⁺⁺ | 109 | 9.8 | 92.7 | 0.62 | 99.9 |
| | SURLYN 9120 | | 54 | 19 | | | | | | | |
| C69 | PRIMACOR 5980i | 10 | 40 | 20.5 | 1.5 | Na⁺, Zn⁺⁺ | 87 | 10.3 | 93.4 | 0.58 | 99.9 |
| | SURLYN 9120 | | 50 | 19 | | | | | | | |
| C70 | PRIMACOR 5980i | 20 | 35 | 20.5 | 1.5 | Na⁺, Zn⁺⁺ | 77 | 10.9 | 93.3 | 0.53 | 99.9 |
| | SURLYN 9120 | | 45 | 19 | | | | | | | |
| C71 | PRIMACOR 5980i | 30 | 31 | 20.5 | 1.5 | Na⁺, Zn⁺ | 67 | 9.1 | 93.1 | 0.61 | 99.9 |
| | SURLYN 9120 | | 39 | 19 | | | | | | | |
| C72 | PRIMACOR 5980i | 40 | 26 | 20.5 | 1.5 | Na⁺, Zn⁺⁺ | 58 | 11.0 | 93.1 | 0.63 | 99.3 |
| | SURLYN 9120 | | 34 | 19 | | | | | | | |
| C73 | PRIMACOR 5980i | 40 | 26 | 20.5 | 1.5 | Na⁺, Zn⁺⁺ | 58 | 10.8 | 93.1 | 0.69 | 98.7 |
| | SURLYN 9120 | | 34 | 19 | | | | | | | |
| C74 | PRIMACOR 5980i | 40 | 26 | 20.5 | 1.5 | Na⁺, Zn⁺⁺ | 58 | 10.1 | 93.1 | 0.68 | 99.1 |
| | SURLYN 9120 | | 34 | 19 | | | | | | | |
| C75 | PRIMACOR 5980i | 40 | 26 | 20.5 | 1.5 | Na⁺, Zn⁺⁺ | 58 | 10.3 | 92.8 | 0.61 | 99.9 |
| | SURLYN 9120 | | 34 | 19 | | | | | | | |
| C76 | PRIMACOR 5980i | 40 | 26 | 20.5 | 1.5 | Na⁺, Zn⁺⁺ | 58 | 8.7 | 93.0 | 0.60 | 99.9 |
| | SURLYN 9120 | | 34 | 19 | | | | | | | |
| C77 | PRIMACOR 5980i | 40 | 26 | 20.5 | 1.5 | Na⁺, Zn⁺⁺ | 58 | 10.4 | 92.9 | 0.53 | 99.9 |
| | SURLYN 9120 | | 34 | 19 | | | | | | | |
| C78 | PRIMACOR 5980i | 40 | 6 | 20.5 | 1.5 | Na⁺, Zn⁺⁺ | 111 | 10.1 | 92.7 | 0.58 | 99.9 |
| | SURLYN 9120 | | 54 | 19 | | | | | | | |

¹Δ designates difference in acid content of polymers of blend

Ionic Elastomer Nanocomposite Film

Examples F1-F10

Examples F1-F10 illustrate ionic elastomer nanocomposite films prepared by a melt-process. The composition details of Examples F1-F11 are given in Table 33. Nanocomposite coatings of the previous examples were separated from the PET substrate and used as the ionic elastomer nanocomposite in melt processing. For Examples F1-F3 and F7-F10, pure (meth)acrylic acid elastomer was melt processed with the nanocomposite coating to decrease the nanoparticle concentration. For Examples F4-F6, only the nanocomposite coating was melt-processed. For Example F8, neutralizing agent was added during the melt process. The ionic elastomer nanocomposites were melt-processed using a Plasticorder (C.W. Brabender Instruments, Inc., South Hackensack, NJ). All nanocomposite formulations were compounded for 15 minutes at 150° C. and 75 rpm. After compounding, the nanocomposite was pressed into a film using an Auto Series Hot Press (Carver Inc., Wabash, IN). For the hot press process, a portion of the compounded material was placed between polyimide sheets which, in turn, was placed between polished aluminum plates. The nanocomposite was pressed into film using a two-stage hot press process. First, the nanocomposite was pressed with 900 kg force at the selected press temperature and held for 5 minutes. Most nanocomposites were pressed at 125° C. Higher press temperatures were required for nanocomposites with higher nanoparticle loadings. Hot press temperatures are detailed in the accompanying tables. In a second stage, the press automatically increased pressure to 10900 kg force at the same temperature which was held for 0.1 minute after which the press automatically opened. The pressed film was removed from between the aluminum sheets and cooled to room temperature before removal of the polyimide sheets. Characterization of the pressed films included thickness and optical characterization are detailed in Table 34. With the exception of the nanocomposite film with 60 w % nanoparticles, the nanocomposite films exhibit visible transmission greater than 90%. With exception of Examples F6 and F9, the remaining eight nanocomposite films exhibit haze of 2.7-4.0%. Thermal gravimetric analysis (TGA) was performed on Examples F1-F4 to determine nanoparticle concentration. As shown in Table 34, the solids content of Examples F1-F4 correlate well with expected nanoparticle concentration. It is expected that the presence of the metal ions in the nanocomposite will increase the percent solids determined by the TGA.

TABLE 33

Ionic Elastomer Nanocomposite Film

| material | $SiO_2$ (w %) | Elastomer (w %) | EX | | F1 | F2 | F3 | F4 | F5 | F6 | F7 | F8 | F9 | F10 |
|---|---|---|---|---|---|---|---|---|---|---|---|---|---|---|
| ELASTOMER NANOCOMPOSITE | | | | | | | | | | | | | | |
| SURLYN 9120 | 40 | 60 | C45 | (g) | 12.5 | 25.0 | 37.5 | 50.0 | | | | | | |
| | 50 | 50 | C43 | (g) | | | | | 50.0 | | | | | |
| | 60 | 40 | C44 | (g) | | | | | | 50.0 | | | | |
| SURLYN 8150 | 40 | 60 | C46 | (g) | | | | | | | 12.5 | 25.0 | | |
| SURLYN 7940 | 40 | 60 | C48 | (g) | | | | | | | | | 12.5 | |
| SURLYN 1707 | | 60 | C47 | (g) | | | | | | | | | | 25.0 |
| ELASTOMER | | | | | | | | | | | | | | |
| SURLYN 9120 | | 100 | | (g) | 37.5 | 25.0 | 12.5 | | | | | | | |
| SURLYN 8150 | | 100 | | (g) | | | | | | | 37.5 | 25.0 | | |
| SURLYN 7940 | | 100 | | (g) | | | | | | | | | 37.5 | |
| SURLYN 1707 | | 100 | | (g) | | | | | | | | | | 25.0 |
| NEUTRALIZING AGENT | | | | | | | | | | | | | | |
| ZnAc | | | | (g) | | | | | | | | 3.0 | | |
| Press Temperature (° C.) | | | | | 125 | 125 | 175 | 175 | 225 | 225 | 125 | 125 | 125 | 125 |

TABLE 34

Characterization of Ionic Elastomer Nanocomposite Film

| EX | Ionomer | $SiO_2$ (w %) | Acid (w %) | Ion | Neutralization (%) | $SiO_2$ (w %) TGA[1] | Thickness (mil) | T (%) | H (%) | C (%) |
|---|---|---|---|---|---|---|---|---|---|---|
| F1 | SURLYN 9120 | 10 | 19 | $Na^+$, $Zn^{++}$ | 38 | 13.43 | 6.3 | 93.4 | 3.2 | 91.5 |
| F2 | | 20 | | | 38 | 22.86 | 8.7 | 92.8 | 3.8 | 93.7 |
| F3 | | 30 | | | 38 | 32.55 | 5.8 | 91.6 | 3.8 | 95.7 |
| F4 | | 40 | | | 38 | 42.94 | 9.4 | 90.0 | 3.9 | 96.4 |
| F5 | | 50 | | | 38 | $NM^2$ | 10.3 | 90.9 | 4.0 | 95.8 |
| F6 | | 60 | | | 38 | $NM^2$ | 10.9 | 85.7 | 5.4 | 92.9 |
| F7 | SURLYN 8150 | 10 | 15 | $Na^+$ | 45 | $NM^2$ | 6.3 | 93.9 | 3.1 | 94.2 |
| F8 | | 20 | | $Na^+$, $Zn^{++}$ | 120 | $NM^2$ | 5.6 | 93.8 | 2.7 | 94.4 |
| F9 | SURLYN 7940 | 10 | 15 | $Li^+$ | 60 | $NM^2$ | 6.5 | 93.1 | 5.0 | 94.2 |
| F10 | SURLYN 1707 | 20 | 15 | $Na^+$ | 60 | $NM^2$ | 7.8 | 93.2 | 3.5 | 94.7 |

[1]TGA designates $SiO_2$ content of nanocomposite measured by TGA;
[2]NM designates "not measured"

Examples F12-F21

Examples F12-F21 further illustrate ionic elastomer nanocomposite films produced by a melt-process. Examples F12-F21 were processed in the same manner as Examples F1-F11. That is, the ionic elastomer nanocomposite of the coated films were removed from the PET substrate and melt-processed. The composition details for Examples F12-F21 are given in Table 35 along with the temperature at which the nanocomposite was pressed into film. Examples F12-F21 further illustrate melt-processed ionic elastomer nanocomposite films with nanoparticle loadings from 10 to 40 w %. Example F17 illustrates an ionic elastomer nanocomposite film where the neutralization agent was intentionally removed during the process. Example F16 illustrates an illustrates an ionic elastomer nanocomposite film with neutralization during melt processing. Example 17 illustrates use of a different neutralizing agent in the dispersion and melt processed film.

TABLE 35

Ionic Elastomer Nanocomposite Film

| material | $SiO_2$ (w %) | Elastomer (w %) | EX | | F12 | F13 | F14 | F15 | F16 | F17 | F18 | F19 | F20 | F21 |
|---|---|---|---|---|---|---|---|---|---|---|---|---|---|---|
| ELASTOMER NANOCOMPOSITE |||||||||||||||
| PRIMACOR 5980i | 40 | 60 | C57 | (g) | 12.5 | 25.0 | 37.5 | 50.0 | | | | | | |
| | | | C58 | (g) | | | | | 25.0 | 25.0 | | | | |
| NUCREL 960 | 40 | 60 | C59 | (g) | | | | | | | 12.5 | 25.0 | 37.5 | 50.0 |
| ELASTOMER |||||||||||||||
| PRIMACOR 5980i | | 100 | | (g) | 37.5 | 25.0 | 12.5 | | 25.0 | 25.0 | | | | |
| NUCREL 960 | | 100 | | (g) | | | | | | | 37.5 | 25.0 | 12.5 | |
| NEUTRALIZING AGENT |||||||||||||||
| KOH | | | | (g) | | | | | | 4.8 | | | | |
| Press Temperature (° C.) | | | | | 125 | 125 | 175 | 125 | 125 | 125 | 125 | 125 | 125 | 125 |

TABLE 36

Characterization of Ionic Elastomer Nanocomposite Film

| EX | Copolymer | $SiO_2$ (w %) | Acid (w %) | Ion | Neutralization (%) | Thickness (mil) | T (%) | H (%) | C (%) |
|---|---|---|---|---|---|---|---|---|---|
| F12 | PRIMACOR 5980i | 10 | 20.5 | $Na^+$ | 75 | 4.2 | 93.7 | 3.2 | 93.2 |
| F13 | | 20 | | | 75 | 4.9 | 93.6 | 3.2 | 95.1 |
| F14 | | 30 | | | 75 | 7.7 | 93.0 | 3.4 | 93.8 |
| F15 | | 40 | | | 75 | 4.2 | 92.4 | 3.8 | 93.9 |
| F16 | | 20 | | $K^+$ | 75 | 7.7 | 93.0 | 3.5 | 95.4 |
| F17 | | 20 | | — | 0 | 4.2 | 93.0 | 6.9 | 94.9 |
| F18 | NUCREL 960 | 10 | 15 | $Na^+$ | 75 | 10.3 | 93.3 | 2.9 | 96.3 |
| F19 | | 20 | | | 75 | 4.8 | 93.9 | 2.7 | 96.8 |
| F20 | | 30 | | | 75 | 7.8 | 93.8 | 3.1 | 95.0 |
| F21 | | 40 | | | 75 | 16.3 | 91.0 | 3.8 | 96.5 |

Ionic Elastomer Nanocomposite Blend Film

Examples F22-F43

Examples F22-F43 illustrate preparation of ionic elastomer nanocomposite blend films by a melt-process. Examples F22-F43 were processed in the same manner as Examples F1-F11. That is, an ionic elastomer nanocomposite coating was separated from the PET substrate film and melt-processed. For Examples F22-F43, the nanocomposite coating was melt-processed with a second (meth)acrylic acid elastomer different from that of the coating to form an ionic elastomer nanocomposite blend film. Composition details and hot press temperatures are given in Tables 37 and 38. Characterization results in Table 39 show visible transmission greater than 91% and a range of haze values from 2.9 to 26.6%. The high haze values 10.1-26.6% correlate with higher acid difference between the (meth)acrylic elastomers of the blend. Optical characterization showed that transparent ionic elastomer nanocomposites may be achieved with higher acid difference by melt processing than is accessible by dispersing and coating alone. TGA results on Examples F38-F41 correlate well with calculated nanoparticle loading. The TGA results provide technical support not only for the melt-processed nanocomposite blend films but also for the coated nanocomposite films from which they were derived.

TABLE 37

Ionic Elastomer Nanocomposite Blend Film

| material | SiO₂ (w %) | Elastomer (w %) | EX | | F22 | F23 | F24 | F25 | F26 | F27 | F28 | F29 | F30 | F31 | F32 |
|---|---|---|---|---|---|---|---|---|---|---|---|---|---|---|---|
| ELASTOMER NANOCOMPOSITE | | | | | | | | | | | | | | | |
| PRIMACOR 5980i | 40 | 60 | C55 | (g) | 10.0 | | 25.0 | | | | | | 25.0 | | |
| | | | C56 | (g) | 15.0 | 10.0 | | | | | | | | | 25.0 |
| | | | C57 | (g) | | 15.0 | | | | 25.0 | | | | 25.0 | |
| SURLYN 9120 | 40 | 60 | C45 | (g) | | | | 25.0 | 25.0 | | 25.0 | | | | |
| SURLYN 8150 | 40 | 60 | C46 | (g) | | | | | | | | 25.0 | | | |
| ELASTOMER | | | | | | | | | | | | | | | |
| PRIMACOR 1410 | | 100 | | (g) | 20.0 | | | 20.0 | | | | | | | |
| SURLYN 1601 | | 100 | | (g) | | 20.0 | | | 20.0 | | | | | | |
| NUCREL 699 | | 100 | | (g) | | | 20.0 | | | 20.0 | | | | | |
| SURLYN 1650 | | 100 | | (g) | | | | | | 20.0 | 20.0 | | | | |
| NUCREL 960 | | 100 | | (g) | | | | | | | | 20.0 | | | |
| SURLYN 1706 | | 100 | | (g) | | | | | | | | | 20.0 | | |
| SURLYN 1707 | | 100 | | (g) | | | | | | | | | | | 20.0 |
| PRIMACOR 5980i | | 100 | | (g) | 5.0 | 5.0 | 5.0 | | | 5.0 | | | 5.0 | 5.0 | 5.0 |
| SURLYN 9120 | | 100 | | (g) | | | | 5.0 | 5.0 | | 5.0 | | | | |
| SURLYN 8150 | | 100 | | (g) | | | | | | | | 5.0 | | | |
| Press Temperature (° C.) | | | | | 125 | 125 | 125 | 125 | 125 | 125 | 125 | 125 | 125 | 125 | 125 |

TABLE 38

Ionic Elastomer Nanocomposite Blend Film

| material | SiO₂ (w %) | Elastomer (w %) | Blend (w %) | EX | | F33 | F34 | F35 | F36 | F37 | F38 | F39 | F40 | F41 | F42 | F43 |
|---|---|---|---|---|---|---|---|---|---|---|---|---|---|---|---|---|
| ELASTOMER NANOCOMPOSITE | | | | | | | | | | | | | | | | |
| PRIMACOR 5980i | 40 | 60 | | C55 | (g) | | | | | | | | | | | |
| | | | | C56 | (g) | 25.0 | 25.0 | | | 25.0 | | | | | | |
| | | | | C73 | (g) | | | | | | 37.5 | 25.0 | 16.8 | | | |
| | | | | C74 | (g) | | | | | | | | 20.7 | 50.0 | | |
| SURLYN 9120 | 40 | 60 | | C45 | (g) | | | 25.0 | | | | | | | | |
| SURLYN PC-350 | 40 | 60 | 30 | C67 | (g) | | | | 25.0 | | | | | | | |
| SURLYN 8150 | | | 30 | | | | | | | | | | | | | |
| SURLYN 9120 | 40 | 60 | 30 | C63 | (g) | | | | | | | | | | 25.0 | |
| SURLYN 8150 | | | 30 | | | | | | | | | | | | | |
| SURLYN 1707 | 40 | 60 | | C47 | (g) | | | | | | | | | | | 25.0 |
| ELASTOMER | | | | | | | | | | | | | | | | |
| NUCREL 960 | | 100 | | | (g) | | | | | 20.0 | | | | | | |
| SURLYN 1706 | | 100 | | | (g) | | | | | | | | | | | 25.0 |
| SURLYN 7940 | | 100 | | | (g) | 20.0 | | | | | | | | | | |
| SURLYN PC-350 | | 100 | | | (g) | | 20.0 | 12.5 | | | | | | | | |
| PRIMACOR 5980i | | 100 | | | (g) | 5.0 | 5.0 | | | 5.0 | 12.5 | | | | | |
| SURLYN 9120 | | 100 | | | (g) | | | 5.0 | | | | 25.0 | 12.5 | | 12.5 | |
| SURLYN 8150 | | 100 | | | (g) | | | 12.5 | 20.0 | | | | | | 12.5 | |
| Press Temperature (° C.) | | | | | | 125 | 125 | 125 | 125 | 125 | 125 | 175 | 175 | 125 | 125 | |

TABLE 39

Characterization of Ionic Elastomer Nanocomposite Blend Film

| EX | Elastomer Blend | SiO$_2$ (w %) | Blend (w %) | Acid (w %) | Δ[1] (w %) | Ion | Neutralization (%) | SiO$_2$ (w %) TGA[2] | Thickness (mil) | T (%) | H (%) | C (%) |
|---|---|---|---|---|---|---|---|---|---|---|---|---|
| F22 | PRIMACOR 5980i | 20 | 40 | 20.5 | 10.8 | Na$^+$ | 28 | NM[3] | 5.7 | 91.1 | 10.1 | 96.7 |
|  | PRIMACOR 1410 |  | 40 | 9.7 |  |  |  |  |  |  |  |  |
| F23 | PRIMACOR 5980i | 20 | 40 | 20.5 | 10.5 | Na$^+$ | 55 | NM[3] | 6.9 | 91.6 | 10.4 | 95.0 |
|  | SURLYN 1601 |  | 40 | 10 |  |  |  |  |  |  |  |  |
| F24 | PRIMACOR 5980i | 20 | 40 | 20.5 | 9.5 | Na$^+$ | 28 | NM[3] | 3.5 | 93.6 | 26.6 | 94.5 |
|  | NUCREL 699 |  | 40 | 11 |  |  |  |  |  |  |  |  |
| F25 | SURLYN 9120 | 20 | 40 | 20.5 | 9.3 | Na$^+$, Zn$^{++}$ | 28 | NM[3] | 11.3 | 91.2 | 3.6 | 96.1 |
|  | SURLYN 1410 |  | 40 | 9.7 |  |  |  |  |  |  |  |  |
| F26 | SURLYN 9120 | 20 | 40 | 19 | 9 | Na$^+$, Zn$^{++}$ | 74 | NM[3] | 11.8 | 91.5 | 3.6 | 96.0 |
|  | SURLYN 1601 |  | 40 | 10 |  |  |  |  |  |  |  |  |
| F27 | PRIMACOR 5980i | 20 | 40 | 20.5 | 8.5 | Na$^+$, Zn$^{++}$ | 47 | NM[3] | 5.4 | 92.4 | 4.8 | 95.7 |
|  | SURLYN 1650 |  | 40 | 12 |  |  |  |  |  |  |  |  |
| F28 | SURLYN 9120 | 20 | 40 | 19 | 8 | Na$^+$, Zn$^{++}$ | 47 | NM[3] | 7.7 | 93.0 | 3.4 | 94.3 |
|  | NUCREL 699 |  | 40 | 11 |  |  |  |  |  |  |  |  |
| F29 | SURLYN 8150 | 20 | 40 | 19 | 7 | Na$^+$, Zn$^{++}$ | 42 | NM[3] | 6.3 | 92.6 | 4.0 | 93.4 |
|  | SURLYN 1650 |  | 40 | 12 |  |  |  |  |  |  |  |  |
| F30 | PRIMACOR 5980i | 20 | 40 | 20.5 | 5.5 | Na$^+$ | 28 | NM[3] | 4.1 | 93.1 | 5.3 | 95.0 |
|  | NUCREL 960 |  | 40 | 15 |  |  |  |  |  |  |  |  |
| F31 | PRIMACOR 5980i | 20 | 40 | 20.5 | 5.5 | Na$^+$, Zn$^{++}$ | 58 | NM[3] | 8.2 | 93.1 | 2.9 | 95.8 |
|  | SURLYN 1706 |  | 40 | 15 |  |  |  |  |  |  |  |  |
| F32 | PRIMACOR 5980i | 20 | 40 | 20.5 | 5.5 | Na$^+$ | 58 | NM[3] | 9.3 | 91.8 | 3.4 | 95.5 |
|  | SURLYN 1707 |  | 40 | 15 |  |  |  |  |  |  |  |  |
| F33 | PRIMACOR 5980i | 20 | 40 | 20.5 | 5.5 | Na$^+$, Li$^+$ | 48 | NM[3] | 8.0 | 92.9 | 3.1 | 96.7 |
|  | SURLYN 7940 |  | 40 | 15 |  |  |  |  |  |  |  |  |
| F34 | PRIMACOR 5980i | 20 | 40 | 20.5 | 5.5 | Na$^+$ | 56 | NM[3] | 6.1 | 93.4 | 3.3 | 94.6 |
|  | SURLYN PC-350 |  | 40 | 15 |  |  |  |  |  |  |  |  |
| F35 | SURLYN 8150 | 20 | 40 | 19 | 4 | Na$^+$ | 78 | NM[3] | 6.2 | 93.1 | 6.1 | 95.6 |
|  | SURLYN PC-350 |  | 40 | 15 |  |  |  |  |  |  |  |  |
| F36 | SURLYN 9120 | 20 | 40 | 19 | 4 | Na$^+$, Zn$^{++}$ | 47 | NM[3] | 8.5 | 93.3 | 3.1 | 94.6 |
|  | NUCREL 960 |  | 40 | 15 |  |  |  |  |  |  |  |  |
| F37 | PRIMACOR 5980i | 20 | 40 | 20.5 | 1.5 | Na$^+$ | 51 | NM[3] | 7.6 | 93.9 | 2.9 | 94.2 |
|  | SURLYN 8150 |  | 40 | 19 |  |  |  |  |  |  |  |  |
| F38 | PRIMACOR 5980i | 10 | 40 | 20.5 | 1.5 | Na$^+$, Zn$^{++}$ | 44 | 12.60 | 6.9 | 92.8 | 3.6 | 93.6 |
|  | SURLYN 9120 |  | 50 | 19 |  |  |  |  |  |  |  |  |
| F39 | PRIMACOR 5980i | 20 | 35 | 20.5 | 1.5 | Na$^+$, Zn$^{++}$ | 52 | 22.55 | 6.5 | 93.8 | 3.2 | 92.0 |
|  | SURLYN 9120 |  | 45 | 19 |  |  |  |  |  |  |  |  |
| F40 | PRIMACOR 5980i | 30 | 31 | 20.5 | 1.5 | Na$^+$, Zn$^{++}$ | 62 | 32.33 | 7.8 | 91.9 | 3.7 | 95.5 |
|  | SURLYN 9120 |  | 39 | 19 |  |  |  |  |  |  |  |  |
| F41 | PRIMACOR 5980i | 40 | 26 | 20.5 | 1.5 | Na$^+$, Zn$^{++}$ | 75 | 42.53 | 6.8 | 93.3 | 4.0 | 95.4 |
|  | SURLYN 9120 |  | 34 | 19 |  |  |  |  |  |  |  |  |
| F42 | SURLYN 9120 | 20 | 40 | 19 | 0 | Na$^+$, Zn$^{++}$ | 43 | NM3 | 7.6 | 93.2 | 3.0 | 95.2 |
|  | SURLYN 8150 |  | 40 | 19 |  |  |  |  |  |  |  |  |
| F43 | SURLYN 1707 | 20 | 40 | 15 | 0 | Na$^+$, Zn$^{++}$ | 62 | NM3 | 9.6 | 92.5 | 3.8 | 94.5 |
|  | SURLYN 1706 |  | 40 | 15 |  |  |  |  |  |  |  |  |

[1] Δ designates difference in acid content of polymers of blend;
[2] TGA designates SiO$_2$ content of nanocomposite measured by TGA;
[3] NM designates "not measured"

Examples F44-F48

Examples F744-F748 further illustrate ionic elastomer nanocomposite blend films by a melt-process. Examples F744-F748 were processed in the same manner as Examples F723-F743. That is, an ionic elastomer nanocomposite coating was separated from the PET substrate film and melt-processed with a second (meth)acrylic acid elastomer to form an ionic elastomer nanocomposite blend. For Examples F44-F48, the second ionic elastomer is a neutralized terpolymer which was found not to be dispersible in water but may be readily melt-processed. Composition details are given in Table 40 along with hot press temperatures. Characterization results in Table 41 show that the ionic elastomer nanocomposite blend films exhibit visible transmission greater than 93% and haze less than 4%.

TABLE 40

Ionic Elastomer Nanocomposite Blend Film

| material | SiO$_2$ (w %) | Elastomer (w %) | EX | | F44 | F45 | F46 | F47 | F48 |
|---|---|---|---|---|---|---|---|---|---|
| ELASTOMER NANOCOMPOSITE | | | | | | | | | |
| PRIMACOR 5980i | 40 | 60 | C55 | (g) | 25.0 | 25.0 | | | |
| SURLYN 8150 | 40 | 60 | C46 | (g) | | | 25.0 | 25.0 | |
| NUCREL 960 | 40 | 60 | C59 | (g) | | | | | 25.0 |

TABLE 40-continued

Ionic Elastomer Nanocomposite Blend Film

| material | SiO$_2$ (w %) | Elastomer (w %) | EX | F44 | F45 | F46 | F47 | F48 |
|---|---|---|---|---|---|---|---|---|
| ELASTOMER | | | | | | | | |
| HPF 1000 | | 100 | (g) | 20.0 | | 20.0 | | 20.0 |
| SURLYN 9020 | | 100 | (g) | | 20.0 | | 20.0 | |
| PRIMACOR 5980i | | 100 | (g) | 5.0 | 5.0 | | | |
| SURLYN 8150 | | 100 | (g) | | | 5.0 | 5.0 | |
| NUCREL 960 | | 100 | (g) | | | | | 5.0 |
| Press Temperature (° C.) | | | | 125 | 125 | 150 | 150 | 125 |

TABLE 41

Characterization of Ionic Elastomer Nanocomposite Blend Film

| EX | Elastomer | SiO$_2$ (w %) | Blend (w %) | Acid (w %) | $\Delta^1$ (w %) | Ion | Neutralization (%) | Thickness (mil) | T (%) | H (%) | C (%) |
|---|---|---|---|---|---|---|---|---|---|---|---|
| F44 | PRIMACOR 5980i | 20 | 40 | 20.5 | 12 | Na$^+$, Mg$^{++}$ | 78 | 3.9 | 93.1 | 3.9 | 93.3 |
| | HPF 1000 | | 40 | 8.5 | | | | | | | |
| F45 | PRIMACOR 5980i | 20 | 40 | 20.5 | 10.5 | Na$^+$, Zn$^{++}$ | 43 | 5.3 | 93.3 | 3.6 | 96.9 |
| | SURLYN 9020 | | 40 | 10 | | | | | | | |
| F46 | SURLYN 8150 | 20 | 40 | 19 | 10.5 | Na$^+$, Mg$^{++}$ | 73 | 3.1 | 93.4 | 3.5 | 93.5 |
| | HPF 1000 | | 40 | 8.5 | | | | | | | |
| F47 | SURLYN 8150 | 20 | 40 | 19 | 9 | Na$^+$, Zn$^{++}$ | 38 | 3.5 | 93.7 | 3.6 | 94.7 |
| | SURLYN 9020 | | 40 | 10 | | | | | | | |
| F48 | NUCREL 960 | 20 | 40 | 15 | 6.5 | Na$^+$, Mg$^{++}$ | 78 | 5.7 | 93.3 | 3.7 | 95.2 |
| | HPF 1000 | | 40 | 8.5 | | | | | | | |

[1] $\Delta$ designates difference in acid content of polymers of blend

Test Methods pH The pH of the ionomer aqueous dispersions was measured with pH test strips (Ricca Chemical Co., Arlington, TX).

Weight Percent Solids The weight percent solids was measured on both filtered and unfiltered dispersions. For an unfiltered dispersion, a nominal 3 gram sample of dispersion was placed in a small Pyrex Petri Dish (Corning Inc. Corning, NY). The sample was placed in a 120° C. preheated oven for 12 hours after which time the sample was removed from the oven and allowed to cool. The mass of dried dispersion and dish was measured. The weight percent solids was calculated from the mass of the dish, mass of dish+dispersion, and mass of dish+dried dispersion according to the equation below. For a filtered dispersion, a nominal 3 gram sample of dispersion was filtered into a small Pyrex Petri Dish via a one micron glass fiber filter (Pall Corp., Port Washington, NY) connected to a disposal syringe (Becton, Dickinson and co., Franklin Lakes, NJ). The sample was placed in a 120° C. preheated oven for 12 hours after which time the sample was removed from the oven and allowed to cool. The mass of dried dispersion and dish was measured. The weight percent solids was calculated from the mass of the dish, mass of dish+dispersion, and mass of dish+dried dispersion according to the equation below. All weight percent solids measurements were performed in duplicate.

$$\text{weight percent solids} = ((\text{mass}_{dish+dried\ dispersion} - \text{mass}_{dish})/(\text{mass}_{dish+undried\ dispersion} - \text{mass}_{dish})) \times 100$$

Particle Size Particle size was measured with a Zetasizer NS (Malvern Instruments Ltd., Worcestershire, UK). The dispersions were diluted 1:10, 1:100, 1:1,000 and sometimes 1:10,000 using a NaOH solution that matched the pH of the dispersion. Three measurements were performed at each dilution and averaged. The particle size was selected once there was no significant change with dilution.

Transmission, Haze, Clarity (THC) Luminous transmission, haze, and clarity were measured according to ASTM D1003-00 using a model 4725 Gardner Haze-Guard Plus (BYK-Gardner, Columbia, MD).

Haze Haze of the liquid dispersions was measured with an Ultrascan PRO Spectrophotometer (HunterLab, Reston, VA).

Film Thickness Film thickness was measured using a digital indicator model H0530E (Mitutoyo America Corporation, Aurora, IL).

Coating Thickness Coating thickness was measured using white interferometry and FTM-ProVis Lite software.

Thermal Gravimetric Analysis (TGA) Nanoparticle concentration in the melt-processed nanocomposite films was measured by TGA. A Model TGA Q500 (TA Instruments, New Castle, DE) was used. Approximately, a 5 milligram sample of nanocomposite film or nanocomposite blend film was placed on a platinum pan that was previously tared by the instrument. The nanoparticle concentration was determined as the final weight in the sample after heating from 35° C. to 700° C. at 20° C./min.

Nuclear Magnetic Resonance (NMR) Synthesized carboxylic acid silane chemistry was confirmed using a Bruker Avance 600 MHz NMR spectrometer equipped with a cryogenically cooled probe head (Bruker Corporation, Billerica, MA). The carboxylic acid silane/DMF solution was mixed with deuterated DMF. One dimensional (1D) $^1$H and $^{13}$C NMR data were collected at 25° C. One of the residual proto-solvent resonances was used as a secondary chemical shift reference in the proton dimension (δ=8.03 ppm).

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

What is claimed is:

1. A nanocomposite comprising:
    at least one polymer, each polymer having a number average molecular weight of at least 10000 grams/mole; the at least one polymer of the nanocomposite comprising a first polymer comprising (meth)acrylic acid monomer units; and
    metal oxide nanoparticles dispersed in the at least one polymer of the nanocomposite, the metal oxide nanoparticles being surface modified with a surface modifying agent comprising a carboxylic acid silane,
    wherein the nanocomposite has an optical haze of 10% or less, and
    wherein the first polymer further comprises ethylene monomer units, the at least one polymer further comprising a second polymer different from the first polymer, the second polymer comprising (meth)acrylic acid monomer units, ethylene monomer units, and at least one monomer unit selected from the group consisting of n-butyl acrylate, isobutyl acrylate, isopropyl acrylate, n-propyl acrylate, ethyl acrylate, methyl acrylate, 2-ethylhexyl acrylate, iso-octyl acrylate and methyl methacrylate.

2. The nanocomposite of claim 1, wherein the first polymer is at least partially neutralized with metal cations, alkylammonium cations, or a combination thereof.

3. The nanocomposite of claim 1, wherein the first polymer further comprises at least one monomer unit selected from the group consisting of propylene, alkyl(meth)acrylates, aryl(meth)acrylates, alkaryl(meth) acrylates, acrylonitrile, and carbon monoxide.

4. The nanocomposite of claim 1, wherein the first polymer comprises (meth)acrylic acid monomer units in an amount of greater than 12% by weight.

5. The nanocomposite of claim 1, wherein the first polymer comprises (meth)acrylic acid monomer units at a first weight percent w1, and the second polymer comprises (meth)acrylic acid monomer units at a second weight percent w2, at least one of w1 and w2 being greater than 12 weight percent, wherein |w1−w2| is less than 10 weight percent.

6. The nanocomposite of claim 1, wherein the first polymer comprises (meth)acrylic acid monomer units at a first weight percent w1, and the second polymer comprises (meth)acrylic acid monomer units at a second weight percent w2, at least one of w1 and w2 being greater than 12 weight percent, wherein |w1−w2| is less than 12 weight percent.

7. The nanocomposite of claim 1, wherein the metal oxide nanoparticles comprise metal oxides of silicon, titanium, aluminum, hafnium, zinc, tin, cerium, yttrium, indium, antimony, or mixed metal oxides thereof.

8. The nanocomposite of claim 1 being in the form of at least one of a film, a coating, a sheet, a filament, particles, pellets, flakes, or a formed article.

9. An optical film comprising at least one layer comprising the nanocomposite of claim 1.

10. The optical film of claim 9 having an optical haze of less than 10%.

11. The optical film of claim 9 having a visible light transmission of greater than 80%.

12. An optical film comprising a nanocomposite layer disposed on a flexible glass layer, the nanocomposite layer comprising the nanocomposite of claim 1.

13. The optical film of claim 12 having a thickness of less than 200 micrometers.

14. The optical film of claim 12, wherein the optical film can be bent around a cylindrical mandrel having a diameter of 10 mm without cracking.

15. The optical film of claim 14, wherein the optical film can be bent around a cylindrical mandrel having a diameter of 6 mm without cracking.

16. A display comprising a display surface and the optical film of claim 12 disposed on the display surface.

17. A display comprising a display surface and a nanocomposite layer disposed on the display surface, the nanocomposite layer comprising the nanocomposite of claim 1.

18. An optical film comprising a nanocomposite layer disposed on a nominally colorless polyimide layer, the nanocomposite layer comprising the nanocomposite of claim 1.

19. An optical film comprising a nanocomposite layer disposed on a substrate, the substrate comprising a flexible glass layer or a nominally colorless polyimide layer, the nanocomposite layer comprising a nanocomposite comprising:
    at least one polymer, each polymer having a number average molecular weight of at least 10000 grams/mole; the at least one polymer of the nanocomposite comprising a first polymer comprising (meth)acrylic acid monomer units; and
    metal oxide nanoparticles dispersed in the at least one polymer of the nanocomposite, the metal oxide nanoparticles being surface modified with a surface modifying agent comprising a carboxylic acid silane,
    wherein the optical film has an optical haze of 10% or less.

20. A display comprising a display surface and the optical film of claim 19 disposed on the display surface.

21. An optical film comprising at least one layer comprising a nanocomposite, the optical film having an optical haze of less than 10%, the nanocomposite comprising:
- at least one polymer, each polymer having a number average molecular weight of at least 10000 grams/mole; the at least one polymer of the nanocomposite comprising a first polymer comprising (meth)acrylic acid monomer units; and
- metal oxide nanoparticles dispersed in the at least one polymer of the nanocomposite, the metal oxide nanoparticles being surface modified with a surface modifying agent comprising a carboxylic acid silane.

22. The optical film of claim 21, wherein the optical haze is 5% or less.

23. A display comprising a display surface and the optical film of claim 21 disposed on the display surface.

* * * * *